(12) United States Patent
Agarwal et al.

(10) Patent No.: US 12,250,119 B2
(45) Date of Patent: Mar. 11, 2025

(54) METHODS AND SYSTEMS THAT AUTOMATICALLY GENERATE PARAMETERIZED CLOUD-INFRASTRUCTURE TEMPLATES

(71) Applicant: VMware LLC, Palo Alto, CA (US)

(72) Inventors: Priyank Agarwal, Bangalore (IN); Praveen Kumar, Bangalore (IN); Valentina Leonidovna Reutova, London (GB); Thomas Hatch, Lehi, UT (US); Charles McMarrow, Rockford, IL (US); Murali Sampangiramaiah, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/380,661

(22) Filed: Oct. 17, 2023

(65) Prior Publication Data

US 2025/0023778 A1    Jan. 16, 2025

(30) Foreign Application Priority Data

Jul. 12, 2023  (IN) .............................. 202341046773

(51) Int. Cl.
*G06F 15/177* (2006.01)
*H04L 41/0823* (2022.01)
*H04L 41/084* (2022.01)

(52) U.S. Cl.
CPC ........ *H04L 41/084* (2013.01); *H04L 41/0823* (2013.01)

(58) Field of Classification Search
None
See application file for complete search history.

(56) References Cited

U.S. PATENT DOCUMENTS

2021/0359920 A1* 11/2021 Welch ..................... H04L 67/10
2023/0259390 A1*  8/2023 Howley ................ G06F 9/5072
                                                      718/102

* cited by examiner

*Primary Examiner* — Wing F Chan
*Assistant Examiner* — Andrew Woo
(74) *Attorney, Agent, or Firm* — Quarles & Brady LLP

(57) ABSTRACT

The current document is directed to an infrastructure-as-code ("IaC") cloud-infrastructure-management service or system that automatically generates parameterized cloud templates that represent already deployed cloud-based infrastructure, including virtual networks, virtual machines, load balancers, and connection topologies. The IaC cloud-infrastructure manager provides an infrastructure-discovery service that accesses a cloud-computing facility to obtain information about already deployed cloud infrastructure and that generates a textual description of the deployed infrastructure, which the IaC cloud-infrastructure-manager then transforms into a set of parameterized cloud-infrastructure-specification-and-configuration files, a resource_ids file, and a parameters file that together comprise a parameterized cloud template.

18 Claims, 53 Drawing Sheets

```
enum BoxType {                ⎫
    CARDBOARD                 ⎪
    METAL                     ⎬ 1302
    SOFT_PLASTIC              ⎪
    RIGID_PLASTIC             ⎪
}                             ⎭ enum ProductType {            ⎫
    PENCIL_SET                ⎪
    ERASER_SET                ⎪
    INK_SET                   ⎪
    PEN_SET                   ⎬ 1304
    INDIVIDUAL_PENCIL         ⎪
    INDIVIDUAL_ERASER         ⎪
    INDIVIDUAL_INK            ⎪
    INDIVIDUAL_PEN            ⎪
}                             ⎭ enum SubjectType {            ⎫
    PERSON                    ⎪
    BUILDING                  ⎬ 1306
    ANIMAL                    ⎪
    UNKNOWN                   ⎪
}                             ⎭
```

1309 ── interface Labeled {        ⎫
            id: ID!               ⎬ 1308
            name: String          ⎪
        }                         ⎭ union Item = Box | Product  ── 1312

```
type Box implements Labeled {  ── 1315   ⎫
1316 ⎰  id: ID!                          ⎪
     ⎱  name: String  ── 1317            ⎪
        length:Float  ── 1318            ⎪
        height:Float  ── 1319            ⎬ 1314
        width:Float   ── 1319            ⎪
        weight: Float ── 1320            ⎪
        boxType: BoxType! ── 1321        ⎪
        contents: [Item!] ── 1322        ⎪
        numItems: Int     ── 1323        ⎪
}                                        ⎭
```

FIG. 13A

```
type Product implements Labeled {          ⎫
    id: ID!                                 ⎪
    name: String                            ⎬ 1326
    pType: ProductType!  ── 1327            ⎪
}                                          ⎭ scalar ImageURL @specifiedBy (url:"httpe://images.org/hyml/ref')  ── 1328 type Photo {                ⎫
    name: String!           ⎪
    imageSize: Int          ⎬ 1330
    subject: SubjectType    ⎪
    url: ImageURL!          ⎪
}                          ⎭ type Query {                          ╱── 1334
    getBox(id: ID!): Box             ╱          ⎫
    getBoxes: [Box!]  ── 1335                   ⎬ 1332
    getPhoto(name: String): Photo              ⎭
}                                    ╲── 1336 type Mutation {
    addProduct(boxId: ID, pType: ProductType!): Product  ── 1338
} type Subscription {
    getBoxUpdates(id: [ID!]): [Box!]  ── 1340
} fragment boxFields on Box {   ⎫
    name                       ⎬ 1342
}                             ⎭ fragment productFields on Product {  ⎫
    pType                             ⎬ 1344
}                                    ⎭
```

FIG. 13B

```
query getBoxes {
    getBoxes {                    ⎫
        id                        ⎪
        name                      ⎬ 1410  ⎫
        contents {                ⎪       ⎪
            ...boxFields  ⎫ 1412  ⎪       ⎬ 1408
            ...productFields ⎭    ⎭       ⎪
        }                                 ⎪
    }                                     ⎭
}
```

```
{
    "data" : {              ╱— 1415
        "getBoxes" : [
1418 ——— {
            "id" : "S2130",
            "name" : "Shipment to Mary Johnson",
            "contents" : [ —— 1420
                    {
        1424 {      "name" : "Sub-shipment 1",
                    }
                    {
        1425 {      "pType" : "PENCIL_SET"
                    },
                    {
        1426 {      "pType" : "ERASERSET"
                    }
1419 ——— },  ]—— 1422
            ⋮  } 1417                                ⎬ 1414
            {
            "id" : "G7133",
            "name" : "Shipment to Zelda Zabinovich",
            "contents" : [
                    {
                        "pType" : " INK_SET "
                    }
            ]
            }
        ] —— 1416
    }
}
```

FIG. 14B

```
mutation {
    addProduct(boxId:"12345", pType: INK_SET) {
        id
        pType
        name
    }
}
```
} 1430

```
{
    "data": {
        " addProduct": {
            "id": "12345", .
            "pType": INK_SET,
            "name": "Shipment to Jean Buffet"
        }
    }
}
```
} 1432

FIG. 14C

```
subscription {
    getBoxUpdates (["F3266", "H89000"]) {
        name
        id
        boxType
        numItems
    }
}
```
⎫
⎬ 1434
⎭

```
{
    "data" : {
        "getBoxeUpdates" : [
            {
                "name" : "Shipment to Dawn Blaine",
                "id" : "F3266",
                "boxType : "SOFT PLASTIC ",
                "numItems" : 4
            },
            {
                "name" : "Shipment to Jerry Feldman",
                "id" : "H89000",
                "boxType : "METAL",
                "numItems" : 12
            }
        ]
    }
}
```
⎫
⎬ 1436
⎭

FIG. 14D

```
type Price {
    dollars: Int         } 1440
    cents: Int
} extend type Box {
    price: Price!        } 1442
} extend type Query {
    getFee(length: Float!, height: Float!, width: Float, weight: Float): Price!    ─── 1444
}
```

FIG. 14E

--- ← 1602
Mapping a scalar to a scalar ← 1604
x: 35 ← 1605
chairman: Bill Johnson ——— 1606

Scalars

```
n1 : 1234      # n1 is mapped to an integer 1234          ← 1608
n2 : 0x4d2     # n2 is mapped to the integer 1234         ← 1609
n3 : 02322     # n3 is mapped to the integer 1234         ← 1610      ← 1611
n4 : 1.234e+03 # n4 is mapped to the floating-point number 1234.0
n5 : Yes       # n5 is mapped to Boolean value 1 or true  ← 1612
n6 : No        # n6 is mapped to Boolean value 0 or false ← 1613
n7 : true      # n7 is mapped to Boolean value 1 or true  ← 1614
n8 : false     # n8 is mapped to Boolean value 0 or false ← 1615
n9 : On        # n9 is mapped to Boolean value 1 or true  } 1616
n10 : Off      # n10 is mapped to Boolean value 0 or false
n11: .inf      # n11 is mapped to the value infinity      ← 1617
n12: .NaN      # n12 is mapped to the value "not a number" ← 1618
```
} 1607 text_stuff : |
  this text preserves the newline characters   } 1619
  as they are written
text_stuff contains the string "this text preserves the newline characters\n as they are written"

f_text_stuff : >
  this text folds the two lines               } 1620
  to produce a single line of text
f_text_stuff contains the string "this text folds the two lines to produce a single line of text"

ne_text_stuff_1 : the cost is 2
ne_text_stuff_1 contains the string "the cost is 2"

ne_text_stuff_2 : the cost is 2\n
ne_text_stuff_2 contains the string "the cost is 2\n"      } 1621 ne_text_stuff_3 : "the cost is 2\n"
ne_text_stuff_3 contains the string "the cost is 2" with a terminal newline character explicit data types string_value: !!str 17
string_value contains the string "17"
                                                  } 1622
int_value: !!int 17
int_value contains the integer 17

FIG. 16A

```
sequences sequence of animals

- frog        ⎫
    - squirrel    ⎬ 1623
    - fish        ⎪
    - bear        ⎭ sequence of vehicles

[ automobile, train, airplane, steamship ]  ⟵ 1624 mapping scalars to lists animals:
    - frog        ⎫
    - squirrel    ⎬ 1625
    - fish        ⎪
    - bear        ⎭ mapping scalars to lists of blocks members:          ⟵ 1630
       - name: Jerry Winkle
         address:                    ⎫        ⎫
           3361 Cherry Lane          ⎬ 1631   ⎪
           Pottersville, Iowa  50666 ⎭        ⎬ 1627
1632 ⟶   age: 47                              ⎪
         phone: (319) 476-7705 ⟵ 1633         ⎭
       - name: Linda Evers                    ⎫
         address:                             ⎪
           921 Fairlow Street                 ⎬ 1628       ⎬ 1626
           Rabbitsfoot, Iowa  50465           ⎪
         age: 54                              ⎪
         phone: (319) 521-9087                ⎭
       - name: Brenda Nix                     ⎫
         address:                             ⎪
           1101 Hamplebuckle Road             ⎪
           Pottersville, Iowa  50666          ⎬ 1629
         age: 61                              ⎪
         phone: (319) 476-1144                ⎭ mapping scalars to lists of blocks with anchor chapter: &chapter          ⎫         ⎫
    chapter: Pottersville    ⎬ 1636    ⎪
    region: central          ⎭         ⎬ 1634
                                       ⎪
  members:                             ⎭
```

FIG. 16B

```
- name: Jerry Winkle
  address: |
     3361 Cherry Lane
     Pottersville, Iowa  50666
  age: 47
  phone: (319) 476-7705
  <<: *chapter                    ─── 1637
- name: Linda Evers
  address: |
     921 Fairlow Street
     Rabbitsfoot, Iowa  50465
  age: 54
  phone: (319) 521-9087
  <<: *chapter                    ─── 1638
- name: Brenda Nix
  address: |
     1101 Hamplebuckle Road
     Pottersville, Iowa  50666
  age: 61
  phone: (319) 476-1144
  <<: *chapter                    ─── 1639
```
} 1635

\# the above mapping of "members" to the list of blocks if equivalent to the following
\# mapping

```
members:
- name: Jerry Winkle
  address: |
     3361 Cherry Lane
     Pottersville, Iowa  50666
  age: 47
  phone: (319) 476-7705
  chapter: Pottersville
  region: central
- name: Linda Evers
  address: |
     921 Fairlow Street
     Rabbitsfoot, Iowa  50465
  age: 54
  phone: (319) 521-9087
  chapter: Pottersville
  region: central
- name: Brenda Nix
  address: |
     1101 Hamplebuckle Road
     Pottersville, Iowa  50666
  age: 61
  phone: (319) 476-1144
  chapter: Pottersville
  region: central
```
} 1640

FIG. 16C complex mapping

? [ small, medium, large ] : [ 0, 1, 2 ]   ⸺ 1641 map sequence

{ small: 0, medium: 1, large: 2 }   ⸺ 1642

Idem State File: ~ 1808
vpc-idem-test:  ~ 1810
  aws.ec2.vpc.present:
    - cidr_block_association_set:
      - CidrBlock: '172.32.0.0/16'  } 1812
    - instance_tenancy: 'default'
    - tags:
      Name: 'vpc-idem-demo'  } 1814
      Environment: 'Development'

} 1804 subnet-idem-test:
  aws.ec2.subnet.present:
    - cidr_block: '172.32.16.0/20'
    - vpc_id: ${aws.ec2.vpc:vpc-idem-test:resource_id}
    - availability_zone: us-west-2b
    - tags:
      Name: 'subnet-idem-demo'
      Description: 'Subnet created for VPC ${aws.ec2.vpc:vpc-idem-test:name}.
        VPC CIDR ${aws.ec2.vpc:vpc-idem-
test:cidr_block_association_set[0]:CidrBlock}
        association ID is ${aws.ec2.vpc:vpc-idem-
test:cidr_block_association_set[0]:CidrBlock}'

} 1806 test_ami:
  exec.run:
    - path: aws.ec2.ami.get
    - kwargs:
      name: test_ami
      most_recent: true
      owners:
        - amazon
      filters:
        - name: 'description'
          values: ["{{ params['ami_desc'] }}"]
        - name: 'architecture'
          values: ["x86_64"]

instance-idem-test:
  aws.ec2.instance.present:
    - image_id: ${exec:test_ami:resource_id}
    - instance_type: 't1.micro'
    - subnet_id: ${aws.ec2.subnet:subnet-idem-test:resource_id}
    - tags:
      Name: 'instance-idem-demo'

} 1802

Credential File:
environment_1:
  default_profile:
    key_1: value_1  } 1820
    key_2: value_2
    ⋮
  profile_2:
    key_1: value_1  } 1822
    key_2: value_2

```
                    ⎫
                  . ⎪
                  . ⎬ 1822 ⎫
                  . ⎪      ⎪
                    ⎭      ⎪
environment_2:             ⎪
    default_profile:       ⎪
        key_1: value_1     ⎬ 1818
        key_2: value_2     ⎪
            .              ⎪
            .              ⎪
            .              ⎪
    profile_2:             ⎪
        key_1: value_1     ⎪
        key_2: value_2     ⎪
            .              ⎪
            .              ⎪
            .              ⎭
```

Idem Describe Command:

idem describe aws.ec2.instance

```
i-0f2e6b9b642beaf91:                              ⎫
  aws.ec2.instance.present:                       ⎪
  - name: i-0f2e6b9b642beaf91                     ⎪
  - resource_id: i-0f2e6b9b642beaf91              ⎪
  - image_id: ami-094125af156557ca2               ⎪
  - instance_type: t1.micro                       ⎪
  - volume_attachments:                           ⎪
      /dev/xvda: vol-03724e0febe4632e7            ⎪
  - block_device_mappings:                        ⎪
    - DeviceName: /dev/xvda                       ⎪
      Ebs:                                        ⎪
        DeleteOnTermination: true                 ⎪
        Encrypted: false                          ⎪
        Iops: 100                                 ⎪
        SnapshotId: snap-078839db345bfeece        ⎬ 1824
        VolumeSize: 8                             ⎪
        VolumeType: gp2                           ⎪
  - ebs_optimized: false                          ⎪
  - subnet_id: subnet-0120b61d6c1313e1f           ⎪
  - network_interfaces:                           ⎪
    - AssociatePublicIpAddress: false             ⎪
      DeleteOnTermination: true                   ⎪
      Description: ''                             ⎪
      DeviceIndex: 0                              ⎪
      Groups:                                     ⎪
      - sg-43d8c830                               ⎪
      InterfaceType: interface                    ⎪
      Ipv6Addresses: [ ]                          ⎪
      NetworkCardIndex: 0                         ⎪
      PrivateIpAddresses:                         ⎪
      - Primary: true                             ⎪
        PrivateIpAddress: 172.31.17.39            ⎭
```

FIG. 18B

```
        SubnetId: subnet-0120b61d6c1313e1f
- monitoring_enabled: false
- root_device_name: /dev/xvda
- client_token: eef2732c-95cf-4f05-abdd-2ff04fb4e802
- product_codes: [ ]
- source_dest_check: true
- running: true
- private_ip_address: 172.31.17.39
- reservation_id: r-0282215c32f0d943e
- owner_id: '840258433862'
- availability_zone: us-west-2c
- group_name: "
- tenancy: default
- disable_api_termination: false
- tags:
    Name: instance-idem-1
    Salutation: Hello World
- iam_profile_arn: { }
- instance_initiated_shutdown_behavior: stop
- auto_recovery_enabled: true
- sriov_net_support: simple
- nitro_enclave_enabled: false
- license_arns: [ ]
- hibernation_enabled: false
- valid_until: "
- http_tokens: optional
- http_put_response_hop_limit: 1
- http_endpoint_enabled: true
- http_protocol_ipv6_enabled: false
- metadata_tags_enabled: false
- hostname_type: ip-name
- enable_resource_name_dns_a_record: false
- enable_resource_name_dns_aaaa_record: false
- capacity_reservation_preference: open
- bootstrap: [ ]
```
} 1826

Argument Binding:

```
State_A:
  cloud.instance.present:
    - name: "Instance A"
    - state_B_id: "${cloud:State_B:ID}"     1830
State_B:
  cloud.instance.present:
    - name: "Instance B"
```
} 1828

FIG. 18C

METHODS AND SYSTEMS THAT AUTOMATICALLY GENERATE PARAMETERIZED CLOUD-INFRASTRUCTURE TEMPLATES

RELATED APPLICATIONS

Benefit is claimed under 35 U.S.C. 119 (a)-(d) to Foreign application No. 202341046773 filed in India entitled "METHODS AND SYSTEMS THAT AUTOMATICALLY GENERATE PARAMETERIZED CLOUD-INFRASTRUCTURE TEMPLATES", on Jul. 12, 2023, by VMware, Inc., which is herein incorporated in its entirety by reference for all purposes.

TECHNICAL FIELD

The current document is directed to distributed-computer-systems and, in particular, to an infrastructure-as-code ("IaC") cloud-infrastructure-management service or system that automatically generates parameterized cloud templates that represent already deployed cloud-based infrastructure, including virtual networks, virtual machines, load balancers, and connection topologies.

BACKGROUND

During the past seven decades, electronic computing has evolved from primitive, vacuum-tube-based computer systems, initially developed during the 1940s, to modern electronic computing systems, including distributed cloud-computing systems, in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. The advent of distributed computer systems has provided a computational platform for increasingly complex distributed applications, including distributed service-oriented applications. Distributed applications, including distributed service-oriented applications and distributed microservices-based applications, provide many advantages, including efficient scaling to respond to changes in workload, efficient functionality compartmentalization that, in turn, provides development and management efficiencies, flexible response to system component failures, straightforward incorporation of existing functionalities, and straightforward expansion of functionalities and interfaces with minimal interdependencies between different types of distributed-application instances. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems and applications have, in turn, become increasingly complex, involving greater computational overheads and significant inefficiencies and deficiencies. In fact, many desired management-and-administration functionalities are becoming sufficiently complex to render traditional approaches to the design and implementation of automated and semi-automated management and administration subsystems impractical, from a time and cost standpoint. Therefore, designers and developers of distributed computer systems and applications continue to seek new approaches to implementing automated and semi-automated management-and-administration facilities and functionalities.

SUMMARY

The current document is directed to an infrastructure-as-code ("IaC") cloud-infrastructure-management service or system that automatically generates parameterized cloud templates that represent already deployed cloud-based infrastructure, including virtual networks, virtual machines, load balancers, and connection topologies. The IaC cloud-infrastructure manager provides an infrastructure-discovery service that accesses a cloud-computing facility to obtain information about already deployed cloud infrastructure and that generates a textual description of the deployed infrastructure, which the IaC cloud-infrastructure-manager then transforms into a set of parameterized cloud-infrastructure-specification-and-configuration files, a resource_ids file, and a parameters file that together comprise a parameterized cloud template.

BRIEF DESCRIPTION OF THE DRAWINGS

FIGS. 13A-14E illustrate an example schema, an extension to that example schema, and queries, a mutation, and a subscription to illustrate the GraphQL data query language.

FIGS. 16A-D illustrate the YAML Ain't Markup Language ("YAML") data serialization language.

FIGS. 18A-C illustrate a structured labor state ("SLS") data file and credential file as well as the output from an Idem describe command.

DETAILED DESCRIPTION

Figure 1:
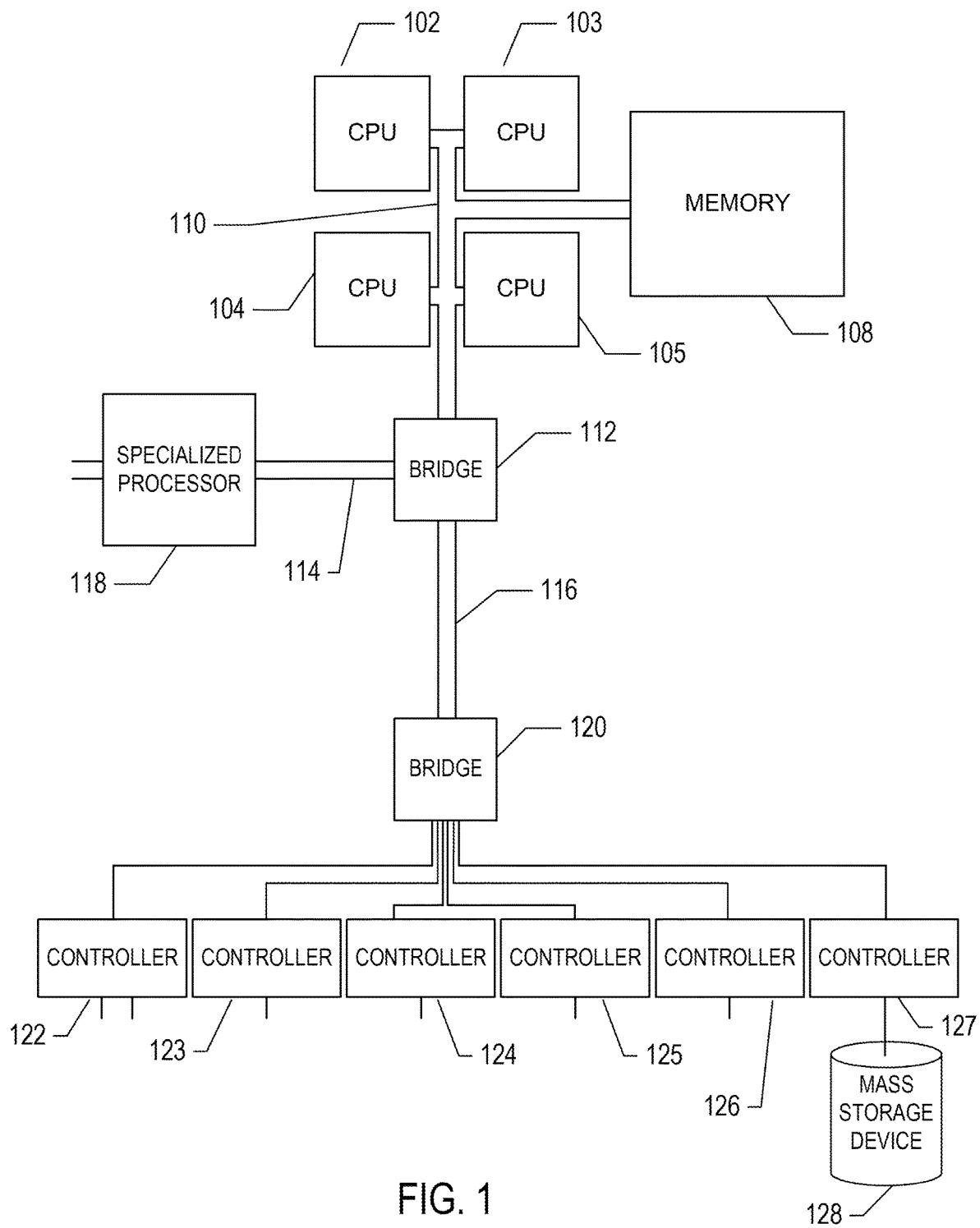
FIG. 1 provides a general architectural diagram for various types of computers.

The current application is directed to an IaC cloud-infrastructure-management service or system that automatically generates parameterized cloud templates that represent already deployed cloud-based infrastructure. In a first subsection, below, a detailed description of computer hardware, complex computational systems, and virtualization is provided with reference to FIGS. 1-7. In a second subsection, an overview of the currently disclosed IaC cloud-infrastructure-management service is provided, with reference to FIGS. 8-11. A third subsection provides an overview of the GraphQL API interface with reference to FIGS. 12-15. A fourth subsection provides an overview of YAML, JINJA, and SLS documents with reference to FIGS. 16-18C. Finally, in a fifth subsection, the currently disclosed methods and systems are discussed with reference to FIGS. 19-30B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software." and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
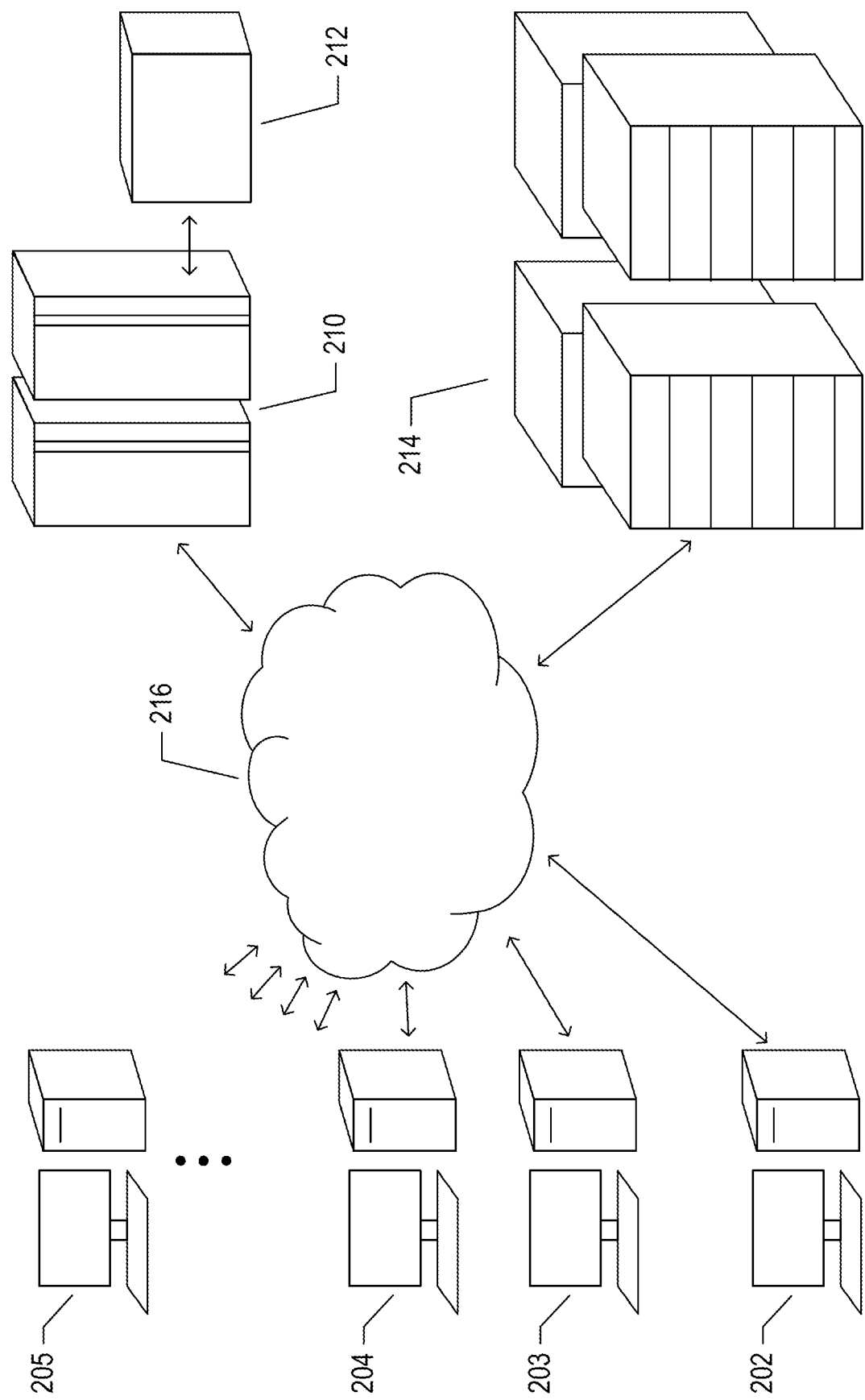
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
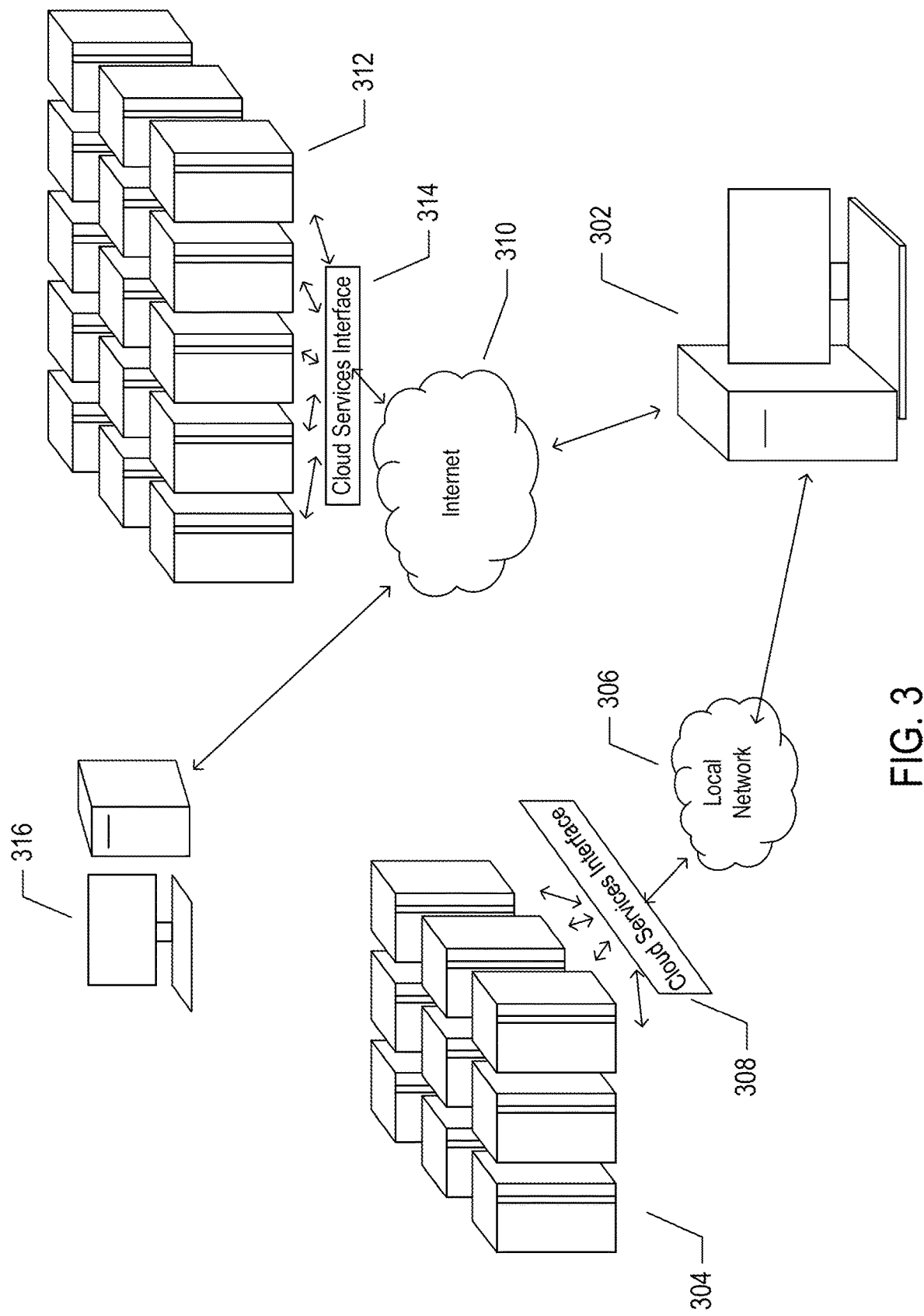
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
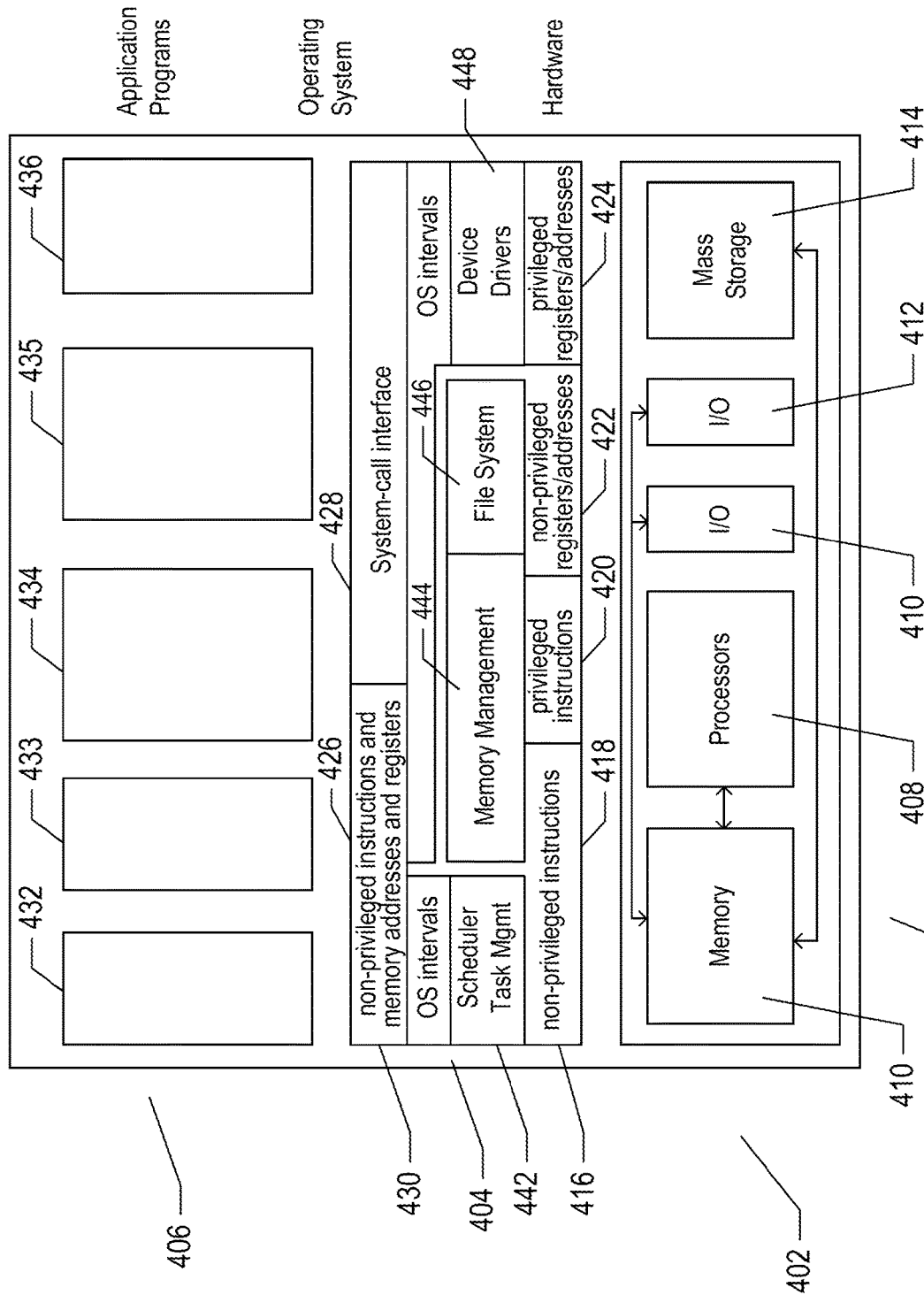
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
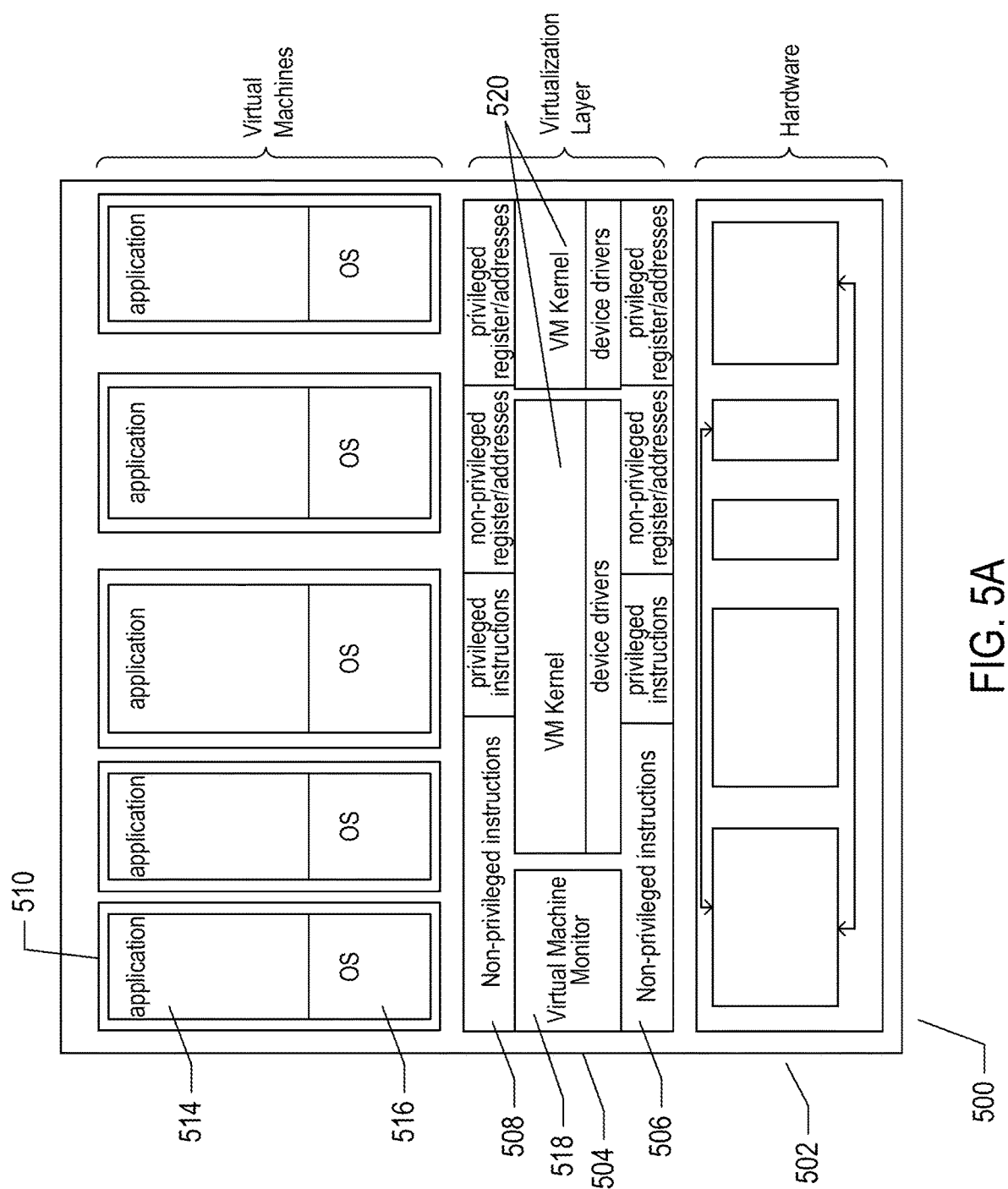
FIGS. 5A-D illustrate two types of virtual machine and virtual-machine execution environments.
Figure 5B:
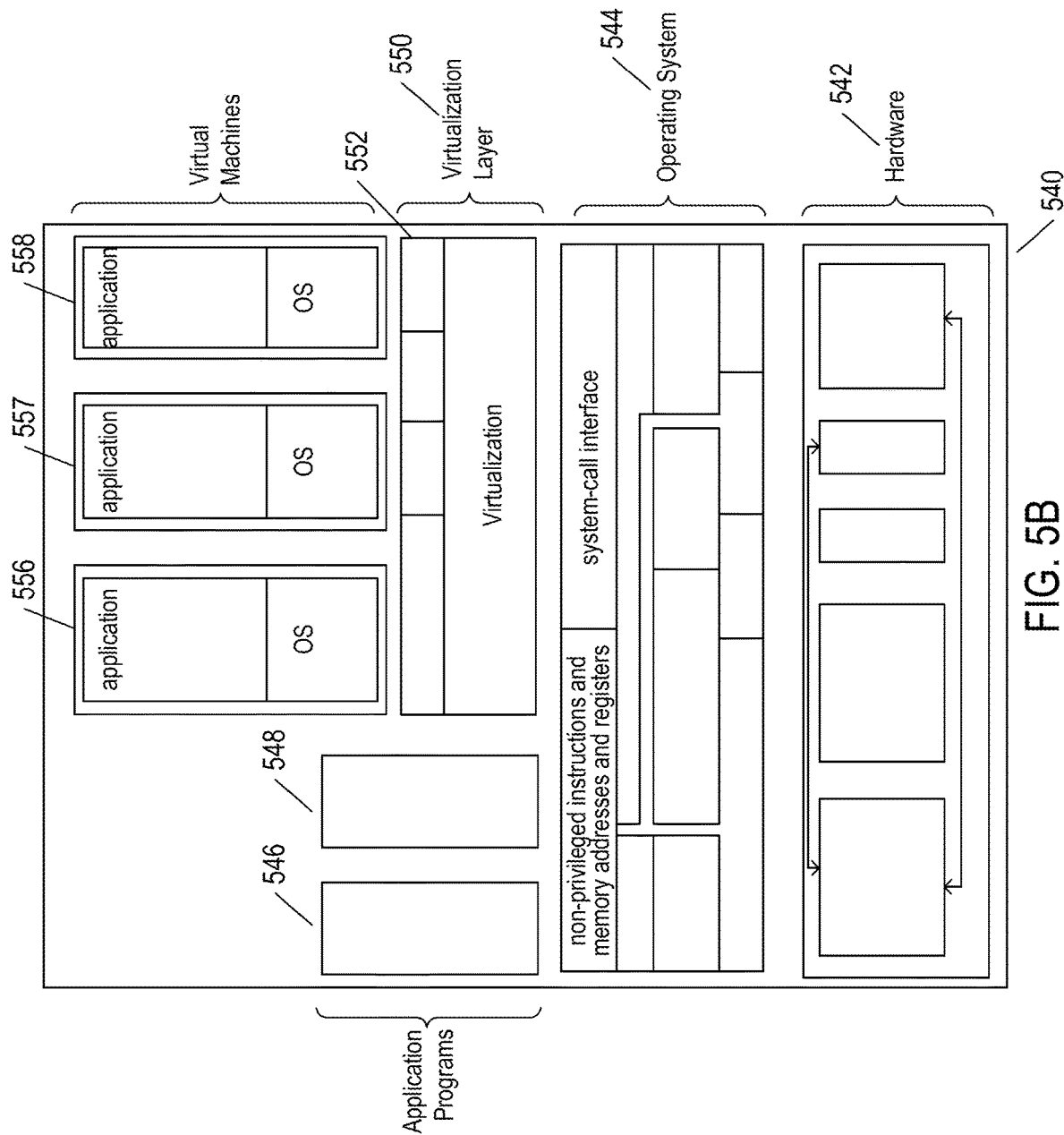

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
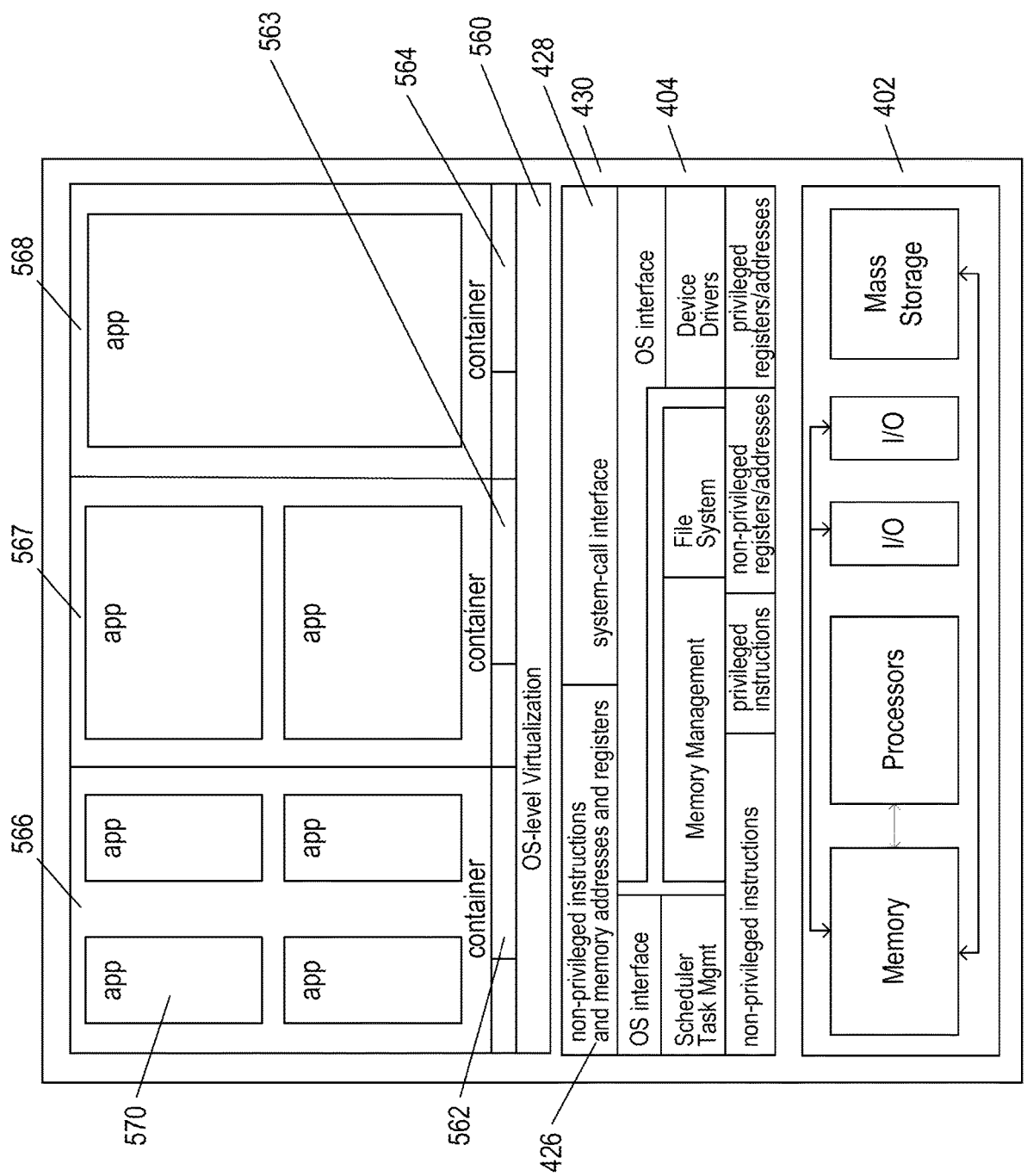

While the traditional virtual-machine-based virtualization layers, described with reference to FIGS. 5A-B, have enjoyed widespread adoption and use in a variety of different environments, from personal computers to enormous, distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
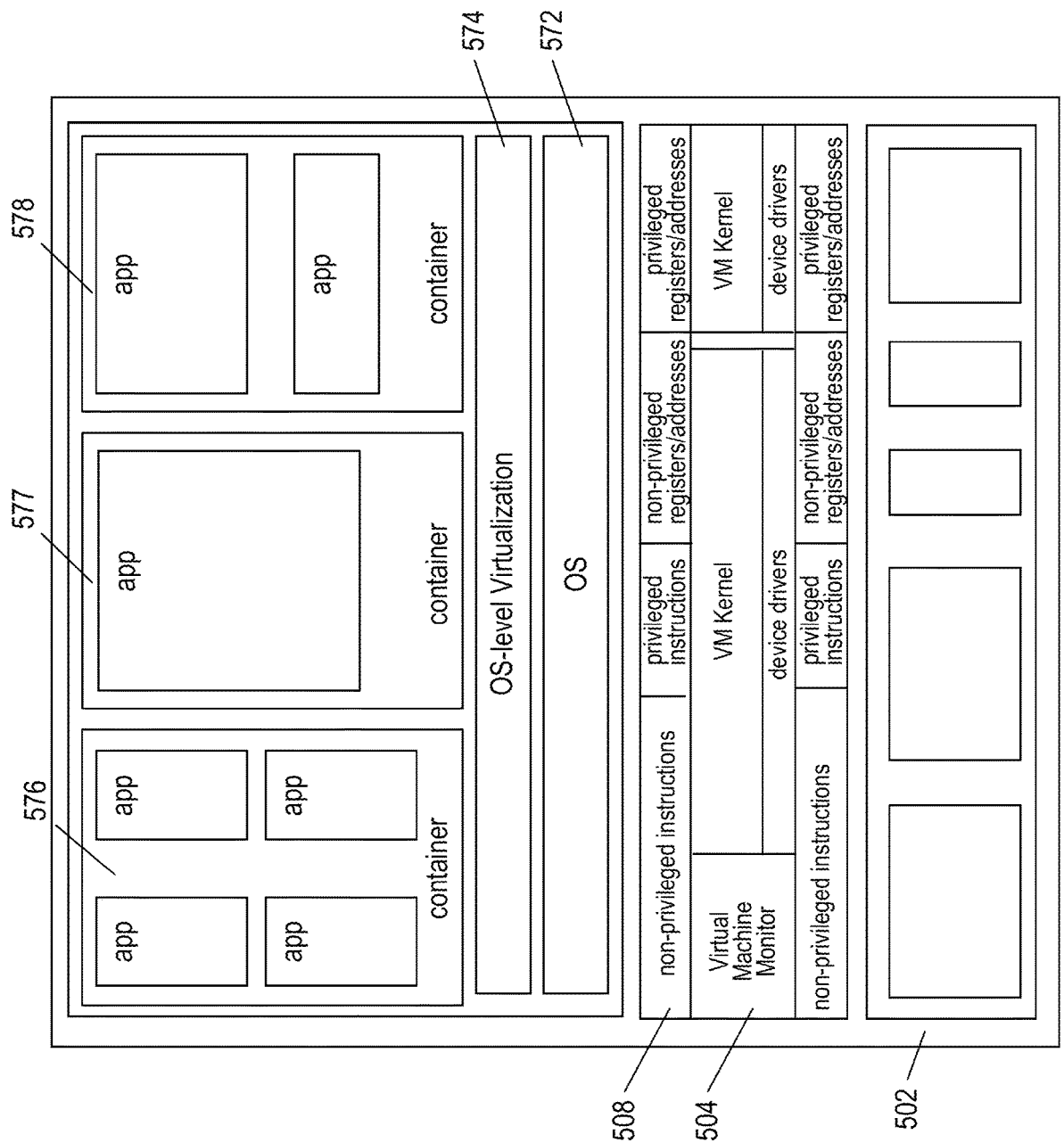

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

A virtual machine or virtual application, described below, is encapsulated within a data package for transmission, distribution, and loading into a virtual-execution environment. One public standard for virtual-machine encapsulation is referred to as the "open virtualization format" ("OVF").

Figure 6:
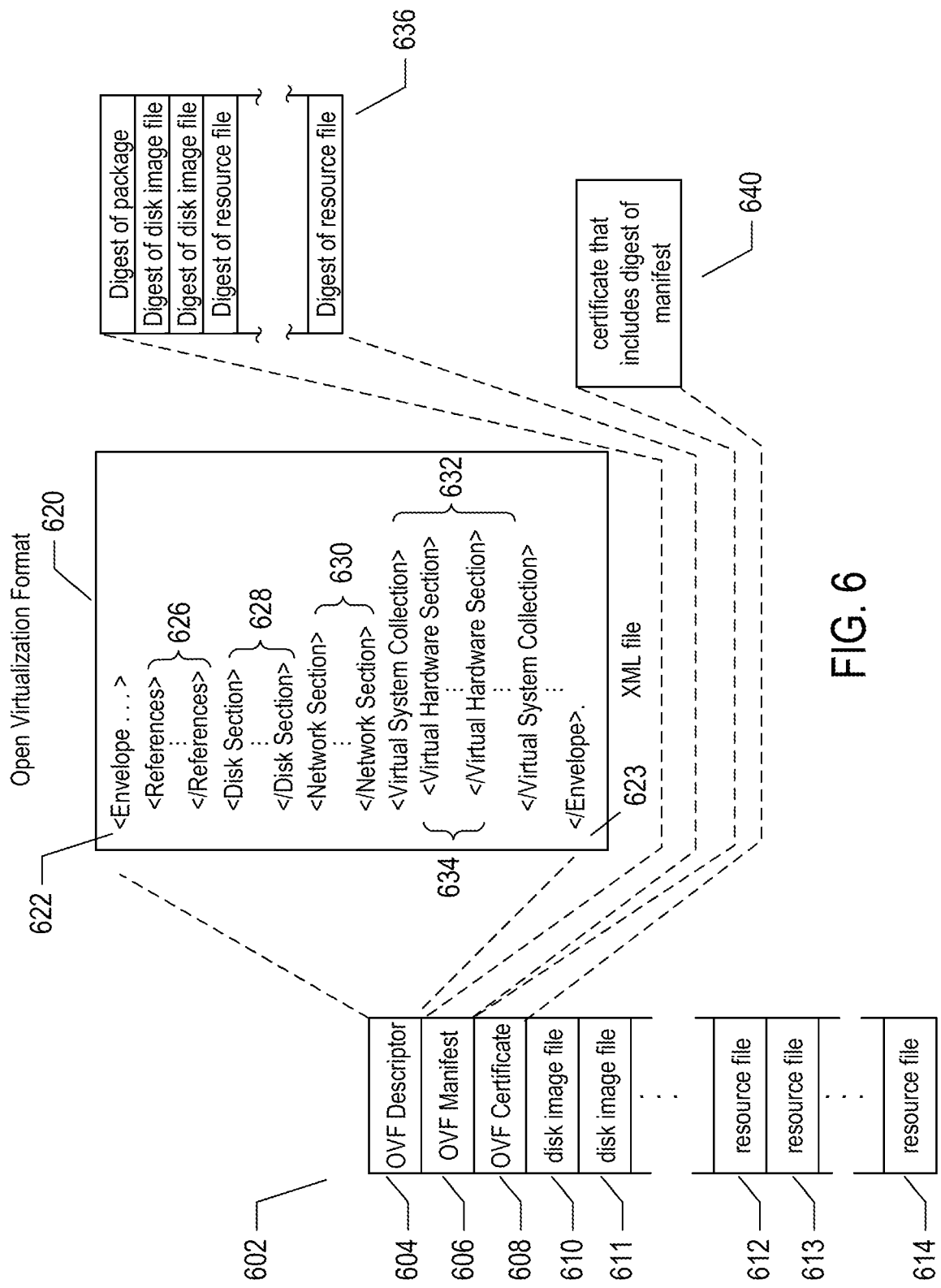
FIG. 6 illustrates an OVF package.

The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
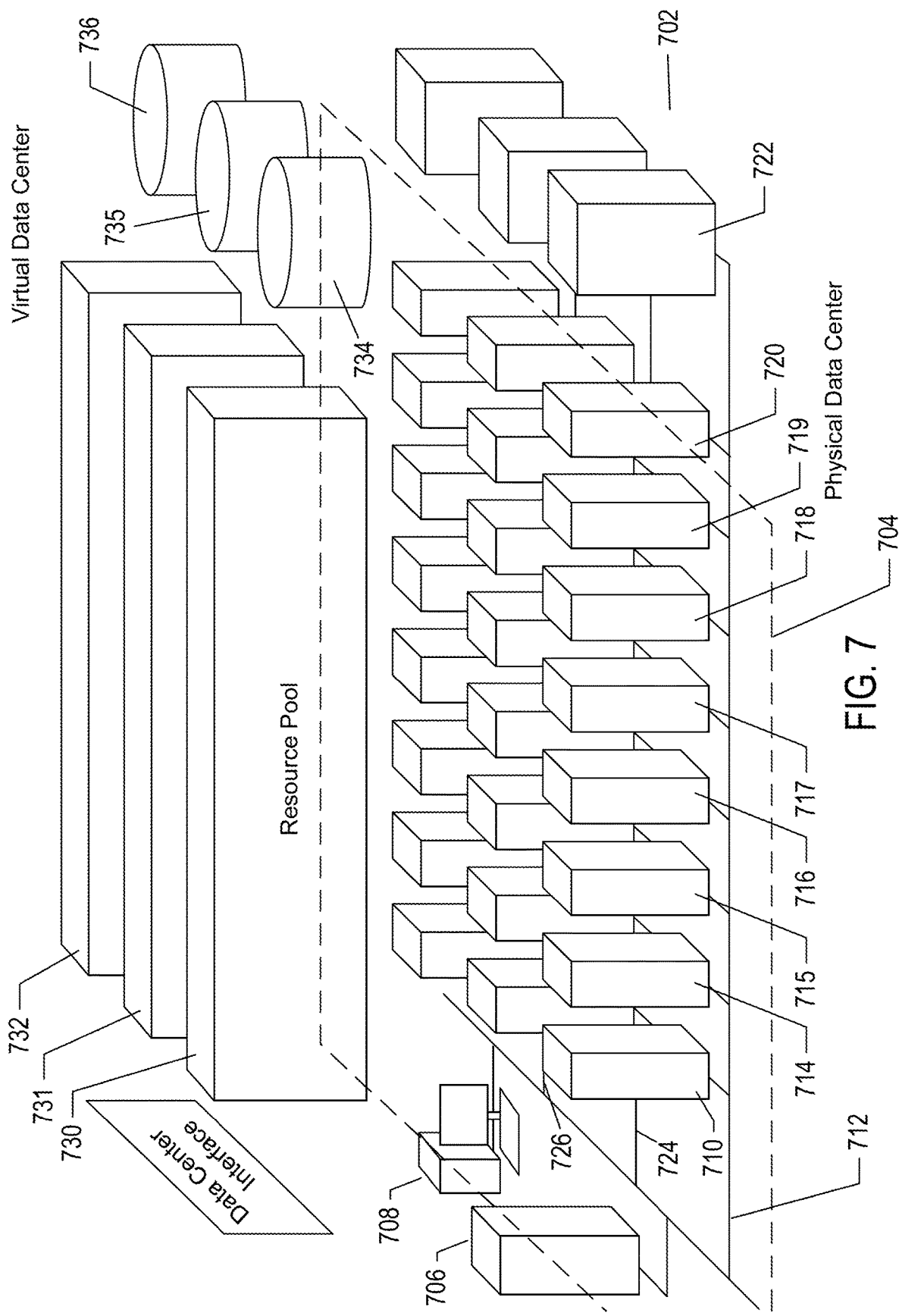
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Overview of the Currently Disclosed IaC Cloud-Infrastructure-Management Service

Figure 8:
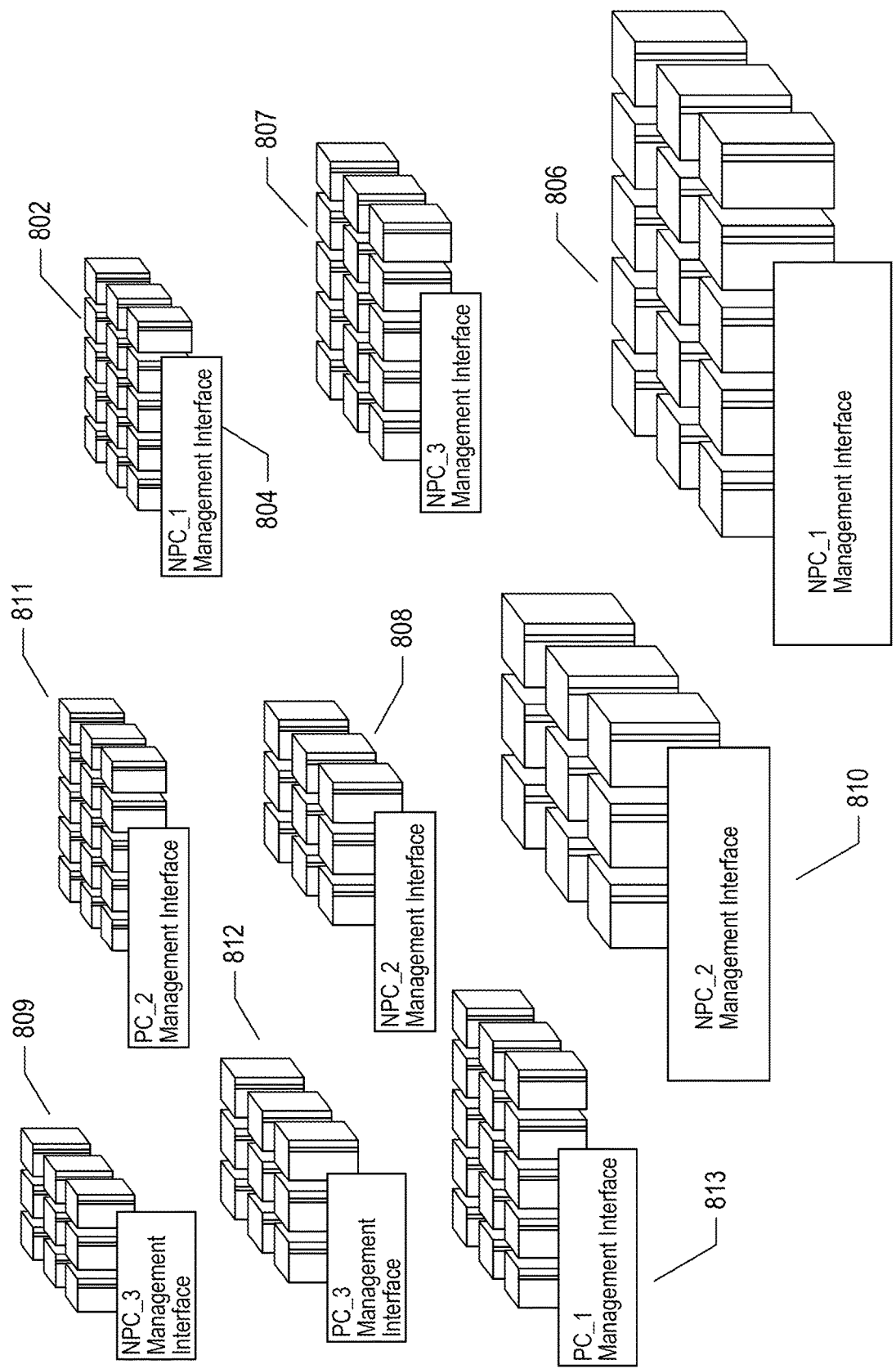
FIG. 8 illustrates a number of different cloud-computing facilities that provide computational infrastructure to an organization for supporting the organization's distributed applications and services.

FIG. 8 illustrates a number of different cloud-computing facilities that provide computational infrastructure to an organization for supporting the organization's distributed applications and services. The cloud-computing facilities are each represented by an array of cabinets containing servers, data-storage appliances, communications hardware, and other computational resources, such as the array of cabinets 802. Each cloud-computing facility provides a management interface, such as management interface 804 associated with cloud-computing facility 802. The organization leases computational resources from a number of native-public-cloud cloud-computing facilities 802 and 806-810 and also obtains computational resources from multiple private-cloud cloud-computing facilities 811-813. The organization may wish to move distributed-application and distributed-service instances among the cloud-computing facilities to take advantage of favorable leasing rates, lower communications latencies, and desirable features and policies provided by particular cloud-computing facilities. In addition, the organization may wish to scale-up or scale-down the computational resources leased from different cloud-computing facilities in order to efficiently handle dynamic workloads. All of these types of operations involve issuing commands and requests through the management interfaces associated with the cloud-computing facilities. In the example shown in FIG. 8, cloud-computing facilities 802 and 806 are accessed through a first type of management interface, cloud-computing facilities 808 in 810 are accessed through a second type of management interface, and cloud-computing facilities 807 and 809 are accessed through a third type of management interface. The management interfaces associated with private-cloud cloud-computing facilities 811-813 are different from one another and from the native-public-cloud management interfaces.

The many different management interfaces represent a challenge to management and administration personnel within the organization. The management personnel need to be familiar with a variety of different management interfaces that may involve different command sets, different command-set syntaxes, and different features, In addition, the different management interfaces may accept different types of blueprints or cloud templates that specify the infrastructure and infrastructure configuration desired by the organization. It may be difficult for management personnel to determine whether certain desired features and functionalities easily accessed and obtained through certain types of management interfaces are even provided by cloud-computing facilities associated with other types of management interfaces. Different management interfaces may require different types of authentication and authorization credentials which further complicates management operations performed by management and administration personnel. These problems may even be of greater significance when computational resources are leased from cloud-computing facilities and configured and managed by automated management systems.

Figure 9:
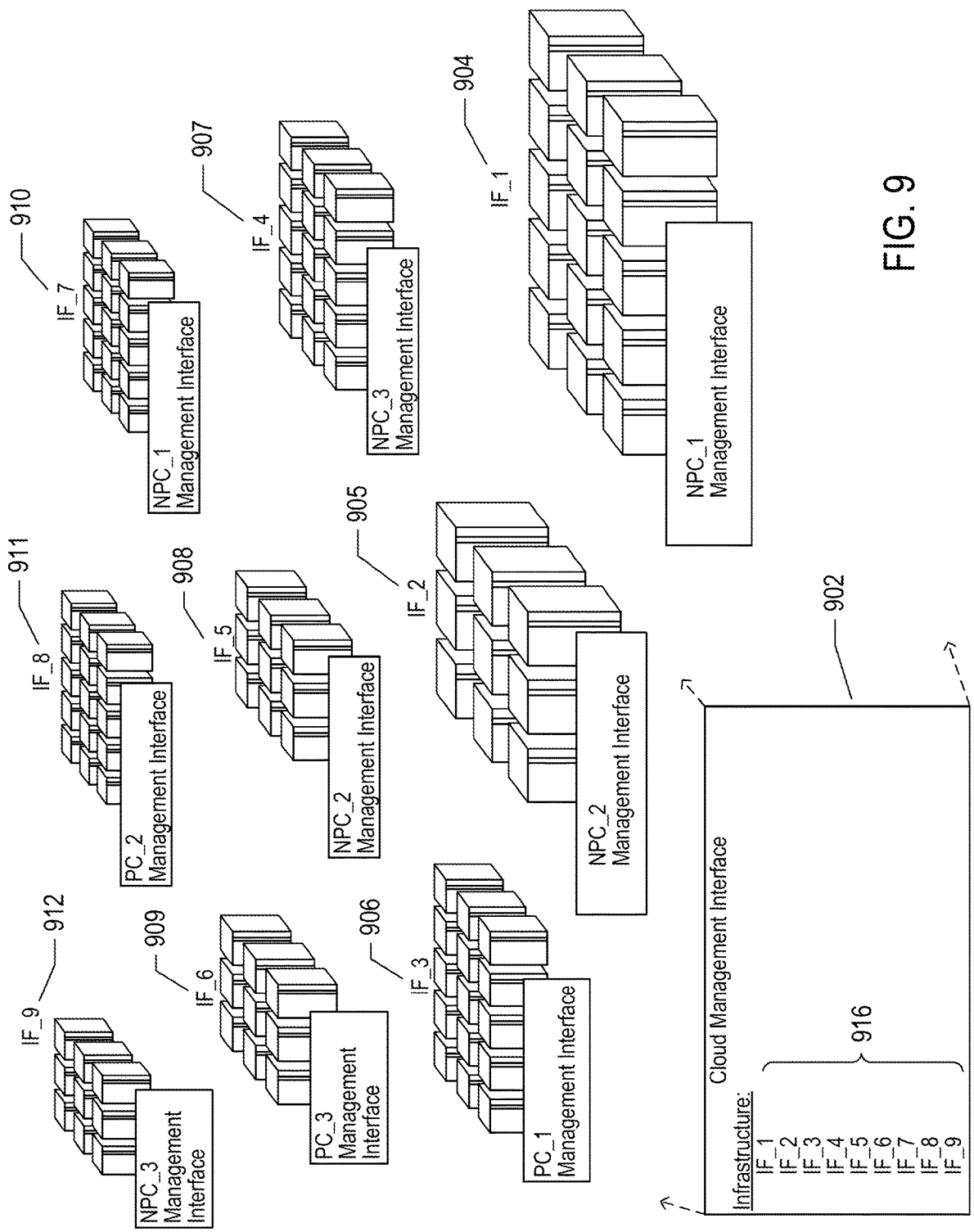
FIG. 9 illustrates a universal-management-interface provided by the currently disclosed IaC cloud-infrastructure-management service.

To address the problems associated with multiple different management interfaces to multiple different cloud-computing facilities, discussed in the preceding paragraph, the currently disclosed IaC cloud-infrastructure-management service provides a single, universal management interface through which management and administration personnel as well as automated management systems define and deploy cloud-based infrastructure within many different types of cloud-computing facilities. FIG. 9 illustrates a universal-management-interface provided by the currently disclosed IaC cloud-infrastructure-management service. The currently disclosed IaC cloud-infrastructure-management service provides a cloud-management interface 902 through which both human management personnel and automated management systems can manage computational infrastructure provided by many different types of underlying cloud-computing facilities associated with various different types of management interfaces. The infrastructure deployed and configured within the various cloud-computing facilities is represented in FIG. 9 by the labels "IF_1" 904, "IF_2" 905, "IF_3" 906, "IF_4" 907, "IF_5" 908, "IF_6" 909, "IF_7" 910, "IF_8" 9011, and "IF_9" 912. The currently disclosed IaC cloud-infrastructure-management service maintains the required authentication and authorization credentials for the different underlying cloud-computing facilities on behalf of human management personnel and automated management systems and automatically provides the required authentication and authorization credentials when accessing management interfaces provided by the different underlying cloud-computing facilities. One or more common types of cloud templates or blueprints are used to specify desired infrastructure and desired infrastructure configuration within the underlying cloud-computing facilities. Each different set of computational resources that together constitute an infrastructure within each of the cloud-computing facilities is visible, and can be managed, through the cloud-management interface 902, as indicated by the infrastructure labels 916 shown within the cloud-management interface.

Figure 10:
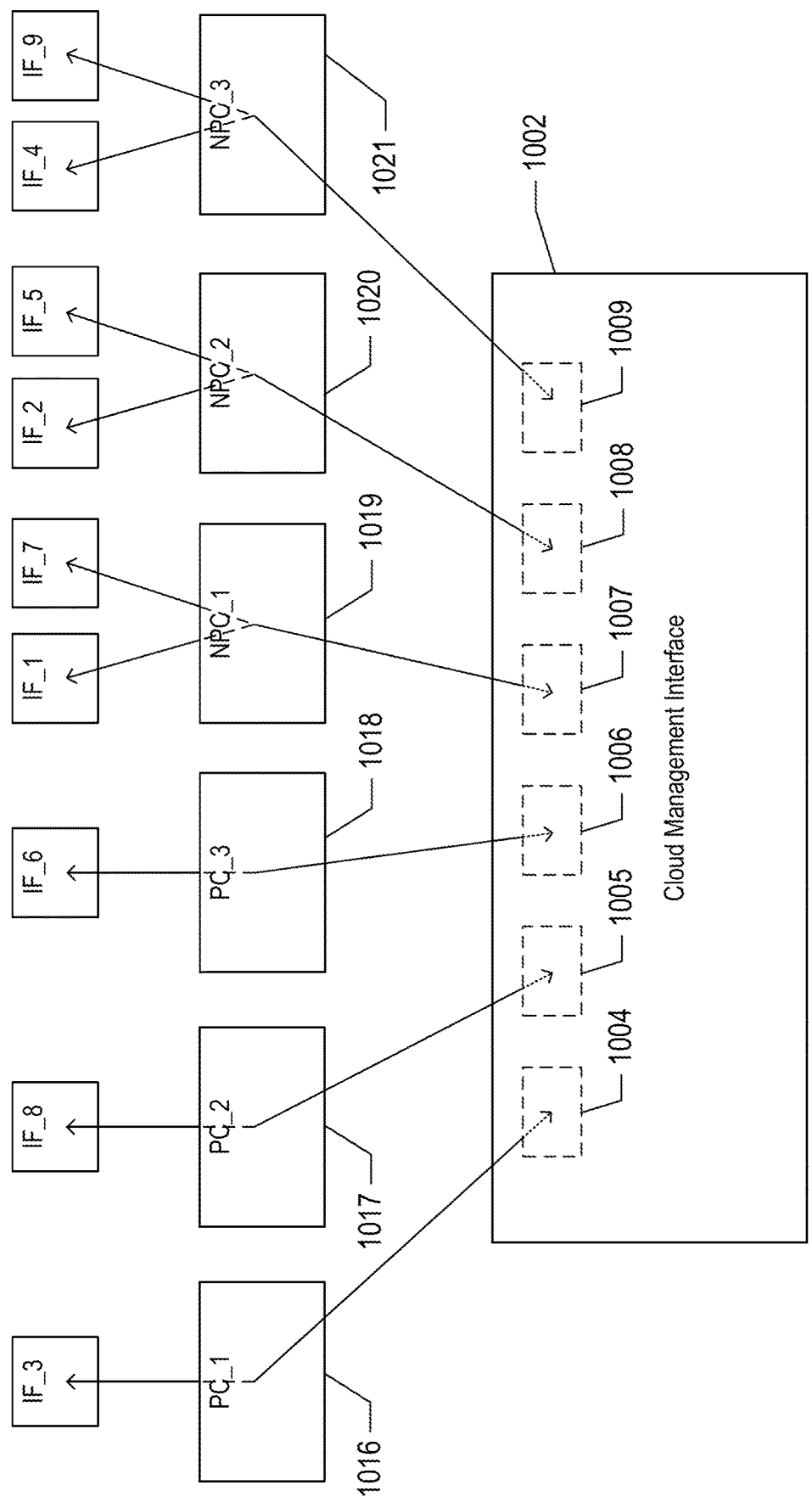
FIG. 10 illustrates the architecture of the currently disclosed IaC cloud-infrastructure-management service.

FIG. 10 illustrates the architecture of the currently disclosed IaC cloud-infrastructure-management service. The IaC cloud-infrastructure-management service provides a cloud-management interface 1002 that includes a common or universal set of commands that can be used to deploy and configure infrastructure in many different types of private-cloud and native-public-cloud cloud-computing facilities that provide various types of cloud-management interfaces, allowing management and administration personnel and upstream automated infrastructure-management systems to deploy and configure infrastructure across the many different types of cloud-computing facilities through a common cloud-management interface 1002. The cloud-management interface 1002 is implemented by the IaC cloud-infrastructure-management service, discussed below. The IaC cloud-infrastructure-management service includes cloud-computing-facility-specific plug-ins, represented by dashed-line rectangles 1004-1009, that implement, together with control logic within the IaC cloud-infrastructure-management service, translation of the commands and features of the cloud-management interface 1002 to the commands and features of the underlying cloud-facility-specific management interfaces 1016-1021.

Figure 11:
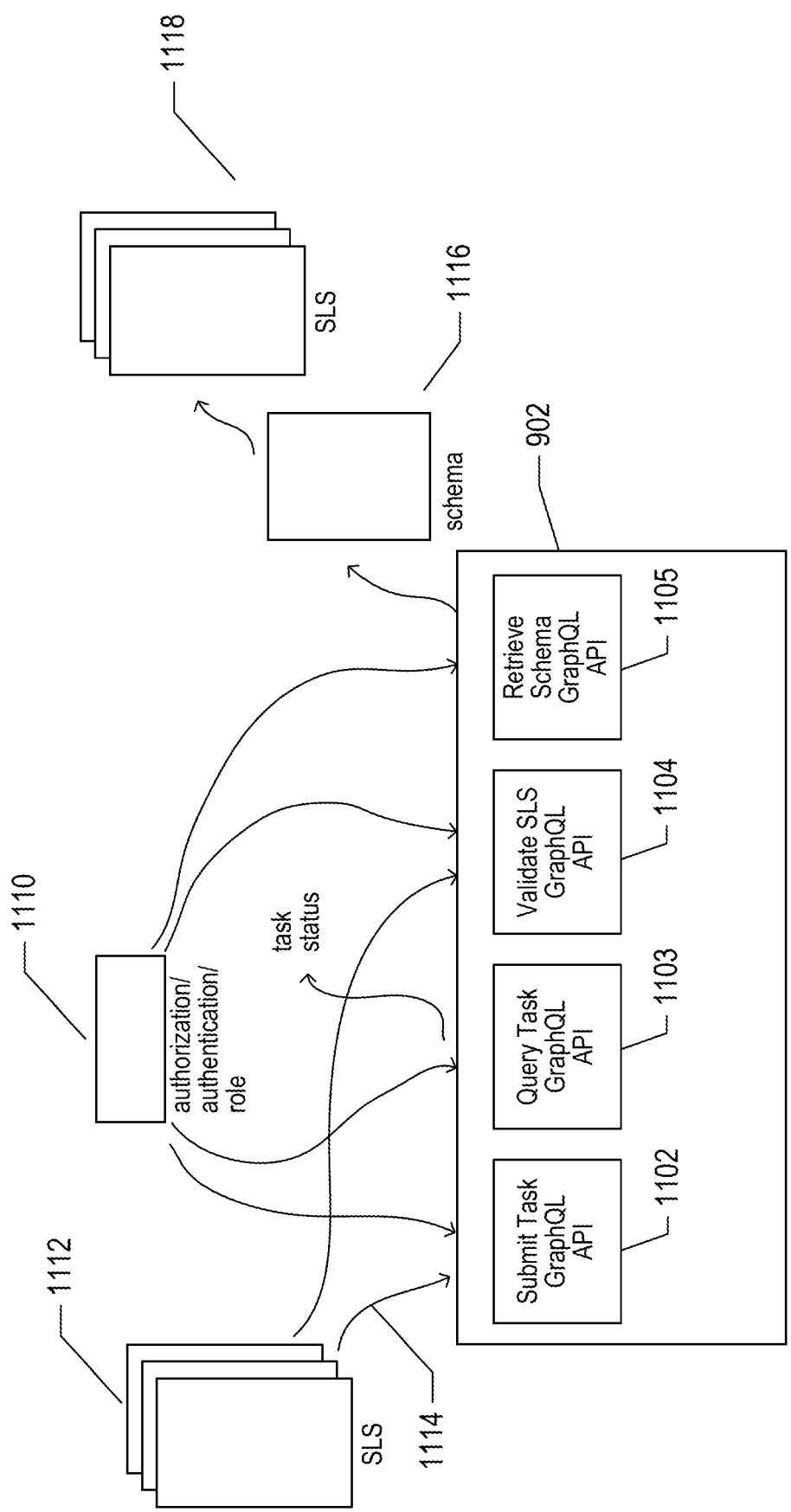
FIG. 11 illustrates the cloud-management interface provided by the currently disclosed IaC cloud-infrastructure-management service.

FIG. 11 illustrates the cloud-management interface provided by the currently disclosed IaC cloud-infrastructure-management service. The cloud-management interface 902 includes four different GraphQL application programming interfaces ("APIs"): (1) Submit Task 1102, through which deployment-and-configuration commands are input to the IaC cloud-infrastructure-management service; (2) Query Task 1103, through which status queries for previously submitted deployment-and-configuration commands and requests are input to the IaC cloud-infrastructure-management service; (3) Validate SLS 1104, through which requests to validate SLS data are input to the IaC cloud-infrastructure-management service; and (4) Retrieved Schema 1105, through which the schemas for infrastructures within underlying computing-facilities can be requested from the IaC cloud-infrastructure-management service. Requests and commands input to the IaC cloud-infrastructure-management service are generally accompanied with an authorization/authentication/role certificate or token 1110, deployment-and-configuration tasks submitted to the Submit Task API are generally accompanied with SLS data 1112 (described below), and requests for validation of SLS data are accompanied with the SLS data to be validated, as indicated by curved arrows, such as curved arrow 1114, in FIG. 11. The schema 1116 returned when a command input to the Retrieve Schema API is executed is convertible into an SLS-data specification 1118 which can be input to the Submit Task API and/or modified and input to the Submit Task API.

There are, however, many different types of IaC cloud-infrastructure-management service or system implementations. For example, an IaC cloud-infrastructure-management service or system may be alternatively implemented as a collection of plug-ins that together comprise a cloud-infrastructure-management engine and a command-line interface ("CLI"). It is, for this reason, that the current document uses the phrase "service or system" to indicate that the currently disclosed IaC cloud-infrastructure-management service is but one implementation approach to implementing cloud-infrastructure-management. To avoid repeating this phrase, the phrase "cloud-infrastructure manager" is used to refer to the various possible implementations of the currently disclosed IaC cloud-infrastructure-management service or system.

GraphQL Interface

Figure 12:
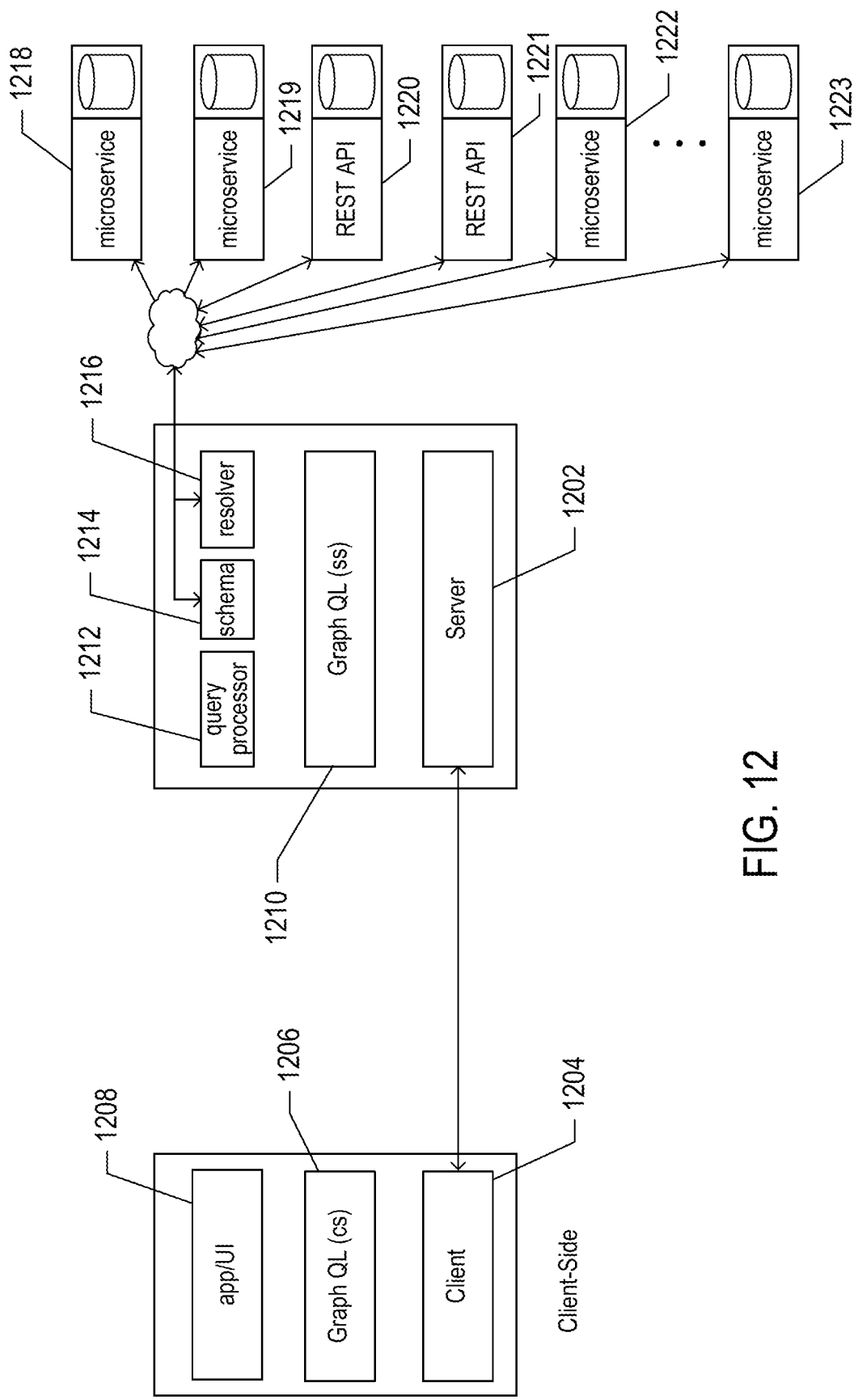
FIG. 12 illustrates components of a GraphQL API interface.

FIG. 12 illustrates components of a GraphQL interface. The GraphQL interface is used as an API interface by various types of services and distributed applications. For example, as shown in FIG. 12, a server 1202 provides a service that communicates with a service client 1204 through a GraphQL API provided by the server. The service client 1204 can be viewed as a computational process that uses client-side GraphQL functionality 1206 to allow an application or user interface 1208 to access services and information provided by the server 1202. The server uses server-side GraphQL functionality 1210, components of which include a query processor 1212, a storage schema 1214, and a resolver component 1216 that accesses various different microservices 1218-1223 to execute the GraphQL-encoded service requests made by the client to the server. Of course, a GraphQL API may be provided by multiple server processes in a distributed application and may be accessed by many different clients of the services provided by the distributed application. GraphQL provides numerous advantages with respect to the Representational State Transfer ("REST") interface technology, including increased specificity and precision with which clients can request information from servers and a potential for increased data-transfer efficiencies.

FIGS. 13A-E illustrate an example schema, an extension to that example schema, and queries, a mutation, and a subscription to illustrate the GraphQL query language. The example shown in FIGS. 13A-E does not illustrate all of the different GraphQL features and constructs, but a comprehensive specification for the GraphQL query language is provided by the GraphQL Foundation. A GraphQL schema can be thought of as the specification for an API for a service, distributed application, or other server-side entity. The example schema provided in FIGS. 13A-B is a portion of a very simple interface to a service that provides information about shipments of drafting products from a drafting-product retailer.

Three initial enumeration datatypes are specified in a first portion of FIG. 13A. The enumeration BoxType 1302 specifies an enumeration datatype with four possible values: "CARDBOARD," "METAL," "SOFT_PLASTIC," and "RIGID_PLASTIC." In the example schema, a box represents a shipment and the box type indicates the type of container in which the shipment is packaged. The enumeration ProductType 1304 specifies an enumeration datatype with eight possible values: "PENCIL_SET," "ERASER_SET," "INK_SET," "PEN_SET," "INDIVIDUAL_PENCIL," "INDIVIDUAL_ERASER," and "INDIVIDUAL_INK," "INDIVIDUAL_PEN." In the example schema, a shipment, or box, can contain products including sets of pencils, erasers, ink, and pens as well as individual pencils, erasers, ink, and pens. In addition, as discussed later, a shipment, or box, can also contain one or more boxes, or sub-shipments. The enumeration SubjectType 1306 specifies an enumeration datatype with four possible values: "PERSON," "BUILDING," "ANIMAL," and "UNKNOWN." In the example schema, the subject of a photograph is represented by one of the values of the enumeration SubjectType.

The interface datatype Labeled 1308 is next specified in the example schema. An interface datatype specifies a number of fields that are necessarily included in any object datatype that implements the interface. An example of such an object datatype is discussed below. The two fields required to be included in any object datatype that implements the interface Labeled include: (1) the field id 1309, of fundamental datatype ID; and (2) the field name 1310, of fundamental datatype String. The symbol "!" following the type specifier "ID" is a wrapping type that requires the field id to have a non-null value. The fundamental scalar datatypes in GraphQL include: (1) integers, Int; (2) floating-point values, Float; (3) Boolean values, Boolean; (4) string values, String; and (5) identifiers, ID. All of the more complex datatypes in GraphQL must ultimately comprise scalar datatypes, which can be thought of as the leaf nodes of a parse tree generated from parsing GraphQL queries, mutations, and subscriptions, discussed below. Wrapping datatypes include the non-null wrapping datatype discussed above and the list wrapping datatype indicated by bracketing a datatype, such as "[Int]," which specifies a list, or single-dimensional array, of integers or "[[Int]]," which specifies a list of lists or a two-dimensional matrix of integers.

The union Item 1312 is next specified in the example schema. A union datatype indicates that a field in an output data object can have one of the multiple datatypes indicated by the union specification. In this case, the datatype Item can be either a Box data object or a Product data object.

The Box object datatype 1314 is next specified in the example schema. An object datatype is a collection of fields that can have scalar-data-type values, wrapping-data-type values, or object data-type values. Because an object datatype may include one or more fields with object data-type values, object datatypes can describe hierarchical aggregations of data. The language "implements Labeled" 1315 indicates that the Box object datatype necessarily includes the interface Labeled fields id and name, discussed above, and those fields occur as the first two fields 1316 of the Box object datatype. The fields id and name represent a unique identifier and a name for the shipment represented by an instance of the Box object datatype. The additional fields in the Box object datatype include: (1) length 1317, of type Float, representing the length of the shipment container; (2) height 1318, of type Float, representing the height of the shipment container; (3) width 1319, of type Float, representing the width of the shipment container; (4) weight 1320, of type Float, representing the weight of the shipment container; (5) boxType 1321, of non-null enumeration type boxType, representing the type of shipment container; (6) contents 1322, an array of non-null Item data objects, representing the contents of the shipment; and (7) numItems 1323, of type Int, representing the number of items in the array contents. Since the field contents is an array of Item data objects, a box, or shipment, can contain one or more additional boxes, or sub-shipments. This illustrates how the GraphQL query language supports arbitrarily hierarchically nested data aggregations.

Turning to FIG. 13B, the example schema next specifies a Product 1326 object datatype that, like the Box object datatype, implements the interface Labeled and that additionally includes a field pType 1327 of enumeration type ProductType. An instance of the Product object datatype represents one of the different types of products that can be included in the shipment.

The example schema next specifies a custom scalar datatype ImageURL 1328 to store a Uniform Resource Locator ("URL") for an image. The language "@specifiedBy( )" is a directive that takes a URL argument that references a description of how a String serialization of the custom scalar datatype ImageURL needs to be composed and formatted in order to represent a URL for an image. GraphQL supports a number of built-in directives and allows for specification of custom directives. Directives are essentially specifications of run-time execution details that are carried out by a server-side query processor that processes GraphQL queries, mutations, and subscriptions, discussed below. As another example, built-in directives can control query-execution to omit or include certain fields in returned data objects based on variables evaluated at the query-execution time. It should also be noted that fields in object datatypes may also take arguments, since fields are actually functions that return the specified datatypes. Arguments supplied to fields, like arguments supplied to directives, are evaluated and used at query-execution time by query processors.

The example schema next specifies the Photo object datatype 1330, which represents a photograph or image that can be accessed through the service API specified by the schema. The Photo object datatype includes fields that represent the name of the photo, and image size, the type of subject of the photo or image, and in image URL.

The example schema next specifies three queries, a mutation, and a subscription for the root Query, Mutation, and Subscription operations. A query, like a database query, requests the server-side GraphQL entity to return information specified by the query. Thus, a query is essentially an information request, similar to a GET operation on a REST API. A mutation is a request to alter stored information and is thus similar to a PUT or PATCH operation on a REST API. In addition, a mutation returns requested information. A subscription is a request to open a connection or channel through which a GraphQL client receives specified information as the information becomes available to the GraphQL server that processes the subscription request. Thus, the various data objects specified in the schema provide the basis for constructing queries, mutations, and subscriptions that allow a client to request and receive information from a server. The example schema specifies three different types of queries 1332 that can be directed, by a client, to the server via the GraphQL interface: (1) getBox 1334, which receives an identifier for a Box data object as an argument and returns a Box data object in response; (2) getBoxes 1335, which returns a list or array of Box data objects in response; and (3) getPhoto 1336, which receives the name of a photo or image as an input argument and returns a Photo data object in response. These are three examples of the many different types of queries that might be implemented in the GraphQL interface. A single mutation addProduct 1338 is specified, which receives the identifier for a Box data object and a product type as arguments and, when executed by the server, adds a product of the specified product type to the box identified by the Box data-object identifier and returns a Product data object representing the product added to the box. A single subscription getBoxUpdates receives a list of Box data-object identifiers, as an argument, and returns a list of Box data objects in each response returned through the communications channel opened between the client and server for transmission of the requested information, over time, to the client. In this case, the client receives Box data objects corresponding to any of the boxes specified in the argument to the subscription getBoxUpdates when those Box data objects are updated, such as in response to addProduct mutations submitted to the server.

Finally, the example schema specifies two fragments: (1) boxFields 1342; and (2) productFields 1344. A fragment specifies one or more fields of an object datatype. Fragments can be used to simplify query construction by expanding a fragment, using the operator ". . . " in a selection set of a query, mutation, or subscription, as discussed below, rather than listing each field in the fragments separately in the selection set. A slightly different use of fragments is illustrated in example queries, below. In the current case, the fragment boxFields includes only the single field name of the Box data-object type and the fragment productFields includes only the single field name pType of the Product datatype.

Figure 14A:
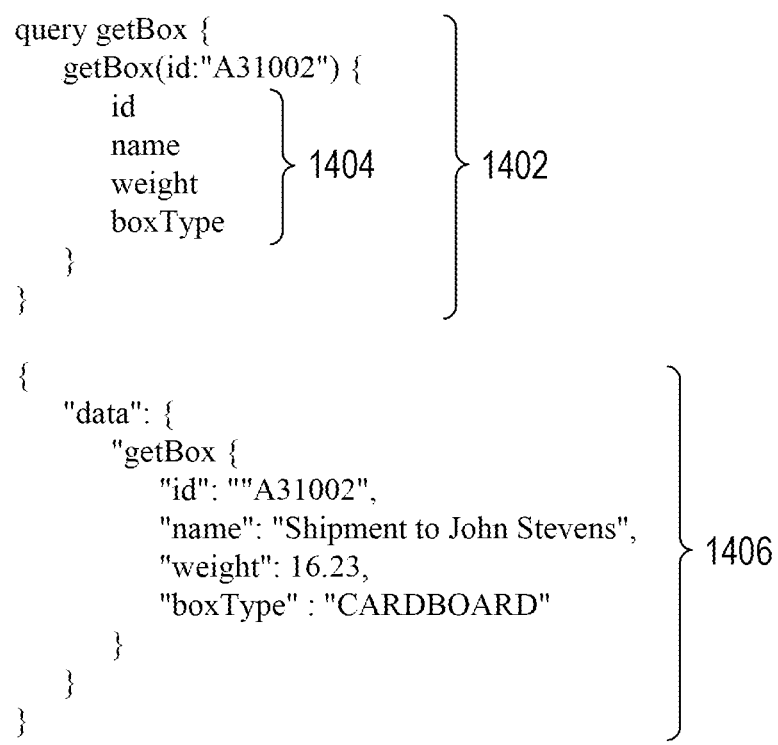

FIGS. 14A-D illustrates two example queries, an example mutation, and an example subscription based on the example schema discussed with reference to FIGS. 13A-B. FIG. 14A shows an example query 1402 submitted by a client to a server and the JavaScript Object Notation ("JSON") data object returned by the server to the client. Various different types of data representations and formats can be returned by servers implementing GraphQL interfaces, but JSON is a commonly used data representation and formatting convention. The query 1402 is of the query type 1334 specified in FIG. 13B. The argument specified for the query is "A31002," the String serialization of a Box identifier. A selection set 1404 for the query specifies that the client issuing the query wishes to receive only values for the id, name, weight, and boxType fields of the Box data object with identifier "A31002." The JSON response to the query 1406 contains the requested information. This points to one of the large advantages provided by the GraphQL query language. A client can specify exactly the information the client wishes to receive from the server, rather than receiving predefined information for predefined queries provided by a REST interface. In this case, the client is not interested in receiving values for many of the fields in the Box data object and is able to use a selection set in the query to request only those fields that the client is interested in receiving.

FIG. 14B illustrates a second example query based on the example schema discussed with reference to FIGS. 13A-B. The second example query 1408 is of the query type 1335 specified in FIG. 13B. A selection set 1410 within the query requests that, for each Box data object currently maintained by the server, values for the id, name, and contents fields of the Box data object should be returned. The contents field has a list type and specifies a list of Item data objects, where an Item may be either a Box data object or a Product data object. A selection set 1412 for the contents field uses expansion of the boxFields and productFields fragments to specify that, for each Item in the list of Item data objects represented by the contents field, if the Item is a Box data object, then the value of the name field for that Box data object should be returned while, if the Item is a Product data object, then the value of the pType field of the Product data object should be returned. The JSON response 1414 to query 1408 is shown in the lower portion of FIG. 14B. The returned data is a list of the requested fields of the Box data object currently maintained by the server. That list begins with bracket 1415 and ends with bracket 1416. Ellipsis 1417 indicates that there may be additional information in the response for additional Box data objects. The requested data for the first Box data object occurs between curly brackets 1418 and 1419. The list of items for the contents of this Box data object begin with bracket 1420 and end with bracket 1422. The first Item 1424 in the list is a Box data object and the second two Item data objects 1425 and 1426 are Product data objects. The second example query illustrates that a client can receive a large amount of arbitrarily related information in one request-response interaction with a server, rather than needing to use multiple request-response interactions. In this case, a list of portions of multiple Box data objects can be obtained in one request-response interaction. As another example, in a typical REST interface, a client may need to submit a request to separately retrieve information for each Box data object contained within an outer-level Box data object, but, using a hierarchical object datatype, that information can be requested in a single GraphQL query.

FIG. 14C illustrates an example mutation based on the example schema discussed with reference to FIGS. 13A-B. The example mutation 1430 is of the mutation type 1338 specified in FIG. 13B. The mutation requests that the server add a product of type INK_SET to the Box data object identified by Box data-object identifier "12345" and return values for the id, pType, and name fields of the updated Box data object. The JSON response 1432 to query 1430 is shown in the lower portion of FIG. 14C. FIG. 14D illustrates an example subscription based on the example schema discussed with reference to FIGS. 13A-B. The example subscription 1434 is of the subscription type 1340 specified in FIG. 13B. The subscription requests that the server return, for updated Box data objects identified by Box data-object identifiers "F3266" and "H89000," current values for the name, id, boxType, and numItems fields. One of the JSON responses 1436 to subscription 1434 returned at one point in time is shown in the lower portion of FIG. 14D.

FIG. 14E illustrates a second schema, based on the first example schema of FIGS. 13A-B and generated by extending the first example schema. The second schema may be used as an interface to a different service that returns shipment fees associated with Box data objects that represent shipments. The schema extension includes specification of a new Price data object 1440, extension of the object datatype Box to include an additional field price with a Price data-object value 1442, and extending the root Query operation type to include a getFee query 1444 that receives the length, height, width, and weight of a shipment and returns the corresponding shipment price or cost. Thus, GraphQL provides for extension of schemas to generate new extended schemas to serve as interfaces for new services, distributed applications, and other such entities.

Figure 15:
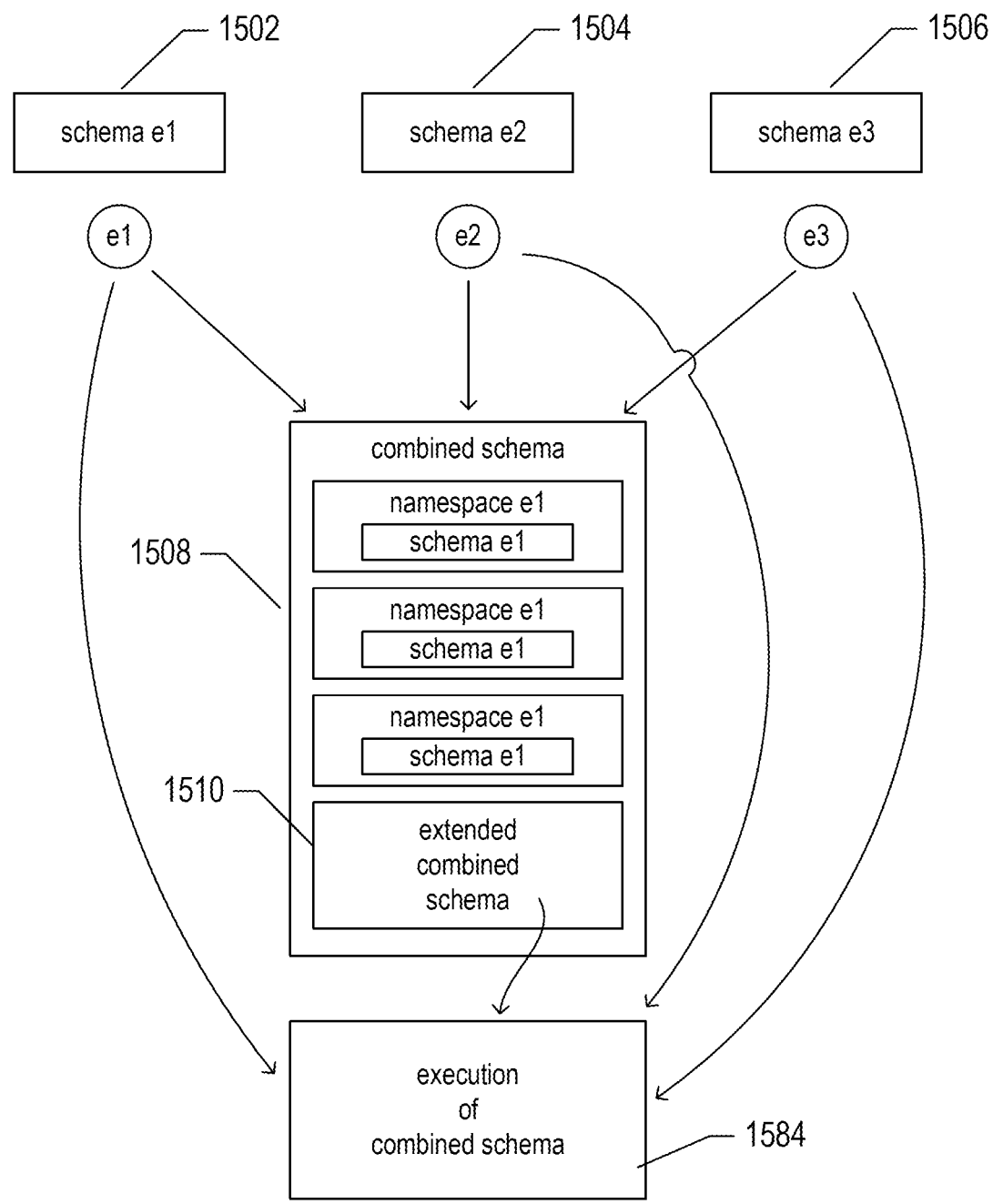
FIG. 15 illustrates a stitching process.

FIG. 15 illustrates a stitching process. Schema stitching is not formally defined by the GraphQL query-language specification. The GraphQL query-language specification specifies that a GraphQL interface is represented by a single schema. However, in many cases, it may be desirable to combine two or more schemas in order to produce a combined schema that is a superset of the two or more constituent schemas, allowing queries, mutations, and subscriptions based on the combined schema to employ object datatypes and other defined types and directives specified in two or more of the constituent schemas. There are multiple different types of implementations of schema stitching. In an example shown in FIG. 15, there are three underlying schemas 1502-1504. The stitching process combines these three schemas into a combined schema 1508. The combined schema includes the underlying schemas. In the illustrated approach to stitching, each underlying schema is embedded in a different namespace in the combined schema, which may include additional extensions 1510. The namespaces are employed in order to differentiate between identical identifiers used in two or more of the underlying schemas. Other approaches to stitching may simply add extensions to all or a portion of the type names defined in all of the underlying schemas in order to generate unique names across all of the underlying schemas. In the combined schema, queries, mutations, and subscriptions may use types from all of the underlying schemas and, in combined-schema extensions of underlying-schema types, a type defined in one underlying schema can be extended to reference a type defined in a different underlying schema. When a query, mutation, or subscription defined in the combined schema is executed, the execution 1514 may involve execution of multiple queries by multiple different services associated with the underlying schemas.

YAML/JINJA and SLS Data

FIGS. 16A-D illustrate the YAML Ain't Markup Language ("YAML") data serialization language. YAML provides for representing data in text files. Certain features of YAML are illustrated by the YAML document shown in FIGS. 16A-D. A YAML document begins with three hyphens (1602 in FIG. 16A) and ends with three periods (1603 in FIG. 16D.) Multiple YAML documents can be included in a single text file. Comments begin with a "#" symbol followed by a space, such as the comment 1604. One of the fundamental constructs in YAML is a mapping of a scalar value to a scalar string, or name, such as the mapping 1605 of the integer value 35 to the name "x" and the mapping 1606 of the string value "Bill Johnson" to the name "Chairman." YAML supports a variety of different types of scalars, as shown in the set of mappings 1607, including: integers encoded as decimal integers 1608, integers encoded as hexadecimal integers 1609, and integers encoded as octal integers 1610; floating-point numbers 1611; Boolean values "Yes" 1612 and "No" 1613, "true" 1614 and "false" 1615, and "On" and "Off" 1616; a value representing infinity 1617; and a value representing "not a number" 1618. On lines 1619, two text lines are mapped to the name "text_stuff," with the symbol "|" used to indicate that newline characters in the text should be preserved. On lines 1620, two text lines are mapped to the name "f_text_stuff," with the symbol ">" indicating that newlines should be removed in order to fold the text into a single text block. Text can be unquoted or quoted, as indicated by the examples on lines 1621. The "!!" operator can be used to explicitly assign types to values, as indicated on lines 1622.

Turning to FIG. 16B, another fundamental data structure supported by YAML is the sequence or list. Several different representations of lists are supported. In a first representation of a list 1623, the elements of the list are indicated by a preceding "-" and a space. In a second representation 1624, the elements of the list are contained within brackets and separated by commas and spaces. As indicated on lines 1625, a list can be mapped to a name. In the example of lines 1625, a list of animals is mapped to the character string, or name, "animals." Note that indentation is used, as in the Python programming language, to indicate hierarchical structure.

Lines 1626 show a mapping of a more complex type of list to the name, or character string, "members." In this example, the list is a list of blocks 1627-1629. Each block is preceded by a hyphen and a space. Each block contains a mapping of a character string to the character string "name" 1630, a mapping of two text lines to the character string "address" 1631, a mapping of an integer to the character string "age" 1632, and a mapping of an alphanumerically encoded phone number to the character string "phone" 1633. In the example of lines 1634 at the bottom of FIG. 16B and lines 1635 at the top of FIG. 16C, the mapping of the list of blocks to the character string "members" on lines 1626 of FIG. 16B is modified to include two additional lines in each block of the list. The two additional lines are specified using the anchor symbol "&" on lines 1636 at the bottom of FIG. 16B. The lines are included at the end of each block in the list using the reference prefix "<<: *" at the beginning of each of three lines referencing the anchor "chapter" 1637-1639. The modified list is equivalent to the list shown on lines 1640 of FIG. 16C. Finally, on line 1641 at the top of FIG. 16D, a more complex mapping that maps the list "[0, 1, 2]" to the list "[small, medium, large]" is shown. This mapping can alternatively be represented by the map sequence, or dictionary, shown on line 1642. The example YAML document shown in FIG. 16A-D does not, of course, provide a comprehensive description of the YAML data-representation language, but is instead intended to show some of the main features and constructs of YAML that are used in SLS documents, discussed below.

Figure 17:
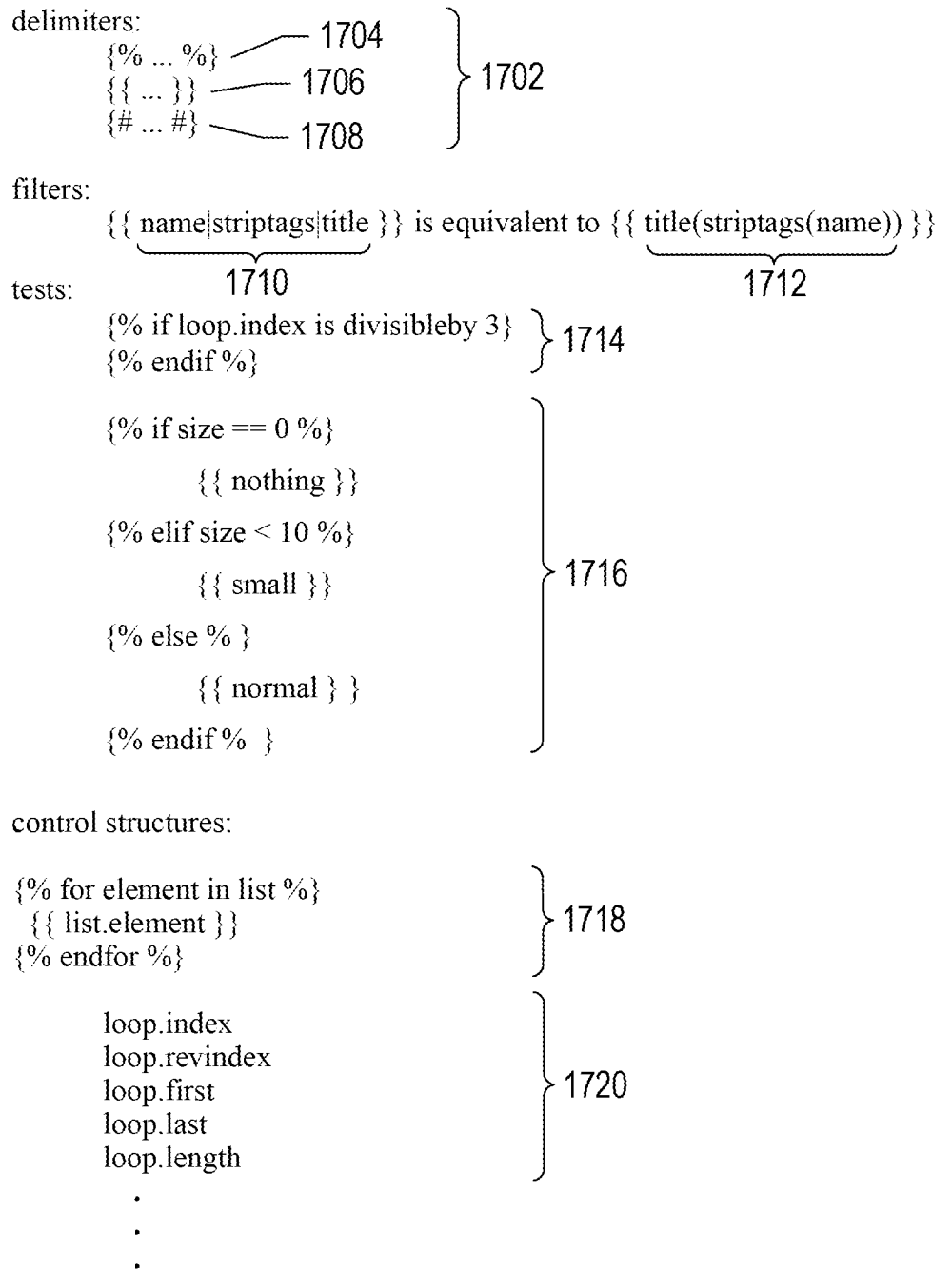
FIG. 17 illustrates certain features provided by the Jinja template engine that are used, in addition to YAML, for representing infrastructure in SLS documents.

FIG. 17 illustrates certain features provided by the Jinja template engine that are used, in addition to YAML, for representing infrastructure in SLS documents. Jinja employs several types of delimiters to encode Jinja constructs. These are shown on lines 1702 of FIG. 17, with ellipses indicating that additional text is enclosed by the delimiters. A first type of delimiter 1704 is used to encapsulate tests, control structures, and other programming-language-like constructs. A second type of delimiter 1706 is used to encapsulate variables for output. A third type of delimiter 1708 is used to enclose comments. Pipe symbols "|" can be used to indicate sequences of function calls. For example, the delimited string "name|striptags|title" 1710 is equivalent to the character string 1712, which represents calling a function "title" with an argument that represents a value returned by calling the function "striptags" with the argument "name." Jinja supports if statements, as shown by the example on lines 1714, and if-elseif-else statements, as shown by the example on lines 1716. Jinja provides a set of comparison operators used in if and if-elseif-else statements. Finally, Jinja provides various types of control structures, such as for-loops, as indicated on lines 1718. The for-loop control structure is accompanied with a number of Jinja loop variables 1720 that can be used in conditional expressions within loops. FIG. 17 does not provide a comprehensive list of examples of Jinja features and constructs, but is instead intended simply to show some of the main types of Jinja constructs that, in combination with YAML constructs and features, are used in SLS documents, described below.

The currently disclosed cloud-infrastructure-management service is referred to as the "Idem service" in the remainder of this document, for reasons discussed in a following section. The Idem service, as discussed above, receives SLS data files that describe deployment and configuration of cloud-based infrastructure. SLS data files can be represented in various different data-serialization languages, including JSON, but a combination of YAML-like and Jinja-like formatting conventions, features, and constructs are most frequently used. An Idem state file is an SLS data file that represents configuration of a cloud-based infrastructure, and Idem SLS data files serve as blueprints or cloud templates input to the Submitted Task and Validate SLS APIs of the Idem-service management interface. There are, however, many different types of Idem implementations. Idem may be considered to be a data flow programming language, for example, and an Idem system may be implemented as a collection of plug-ins that together comprise a cloud-infrastructure-management engine and a command-line interface ("CLI"). In the current document, the Idem service introduced, above with reference to FIGS. 9-11, is used as an example cloud-infrastructure-management system in which the currently disclosed automated methods for generating parameterized cloud templates corresponding to already deployed and configured cloud infrastructure can be incorporated, but the currently disclosed automated methods can alternatively be incorporated in other types of Idem implementations.

FIGS. 18A-C illustrate a structured layered state ("SLS") data file and an SLS credential file as well as the output from an Idem describe command. A simple, example Idem state file is shown in the initial portion 1802 of FIG. 18A. The example SLS state file creates a virtual private cloud ("VPC") for a virtual machine within an AWS cloud-computing facility and connects the VPC to an AWS subnet. A first portion of the example SLS state file 1804 specifies the VPC and a second portion of the example SLS state file 1806 specifies the subnet. Each resource includes a state name, such as "vpc-item-test" 1808 for the VPC, and a directive, or function, such as "aws.ec2.vpc.present" 1810. Directives include: (1) present, which indicates that, when the resource is not currently present in the infrastructure, the resource should be allocated, deployed, and configured according to the resource specification and that, when the resource is currently present in the infrastructure, the Idem service resource should ensure that the current deployment and configuration of the resource corresponds to the resource specification; (2) absent, which indicates that, when the resource is currently allocated and deployed, the resource should be removed; and (3) describe, which requests that the Idem service return information about the resource. Resources are specified using a plug-in/resource-group/resource-type tuple, such as "aws.ec2.vpc" in directive 1810. The plug-in portion of the plug-in/resource-group/resource-type tuple refers to a plug-in associated with a particular cloud-computing facility or cloud provider which provides the executables for accessing the particular cloud-computing facility and/or a set of cloud-computing facilities managed by the cloud provider. A resource specification includes a list of attribute/value pairs, generally including property/value pairs 1812 tag/value pairs 1814. Of course, real-world Idem state files may contain descriptions of hundreds or thousands of resources and, in addition, a blueprint or cloud templates may include multiple hierarchically organized SLS state files. The resource-group portion of the plug-in/resource-group/resource-type tuple refers to a group or class containing multiple types of resources and the resource-type portion of the plug-in/resource-group/resource-type tuple refers to a particular type of resource, such as a virtual machine or a subnet, which is a partition of the host-address space of a virtual-private-network-address space.

The form of an SLS credential file is shown in a lower portion 1816 of FIG. 18A and an upper portion 1818 of FIG. 18B. The SLS credential file contains a block of authentication/authorization information for one or more environments, each of which corresponds to plug-ins for different types of cloud-computing-facility management interfaces. The first portion 1816 of the example SLS credential file shown in FIG. 18A contains a block of authentication/authorization information for a first environment. Each block contains authentication/authorization information for one or more profiles, such as profiles 1820 and 1822 in the block for the first environment, including a default profile 1820. The authentication/authorization information is encoded as a set of attribute/value pairs, such as the name of a particular type of authentication/authorization information, such as an access key, and the alphanumerically encoded access key. SLS credential files are used to input authentication/authorization information to the Idem-service management interface so that the authentication/authorization information can be maintained by the Idem-service management interface and used by the Idem service to access functionality provided by the management interfaces of cloud-computing facilities via the various plug-ins.

The lower portion 1824 of FIG. 18B and the upper portion 1826 of FIG. 18C show the output of an Idem-service describe command executed with respect to the infrastructure described in the Idem state file 1802 shown in FIG. 18A. The output of the Idem-service describe command has a YAML-like format and can be used to generate a corresponding Idem state file that can be subsequently used to modify and enforce the configuration of the represented infrastructure, as discussed below. A final portion 1828 of FIG. 18C illustrates argument binding in SLS data files. The character string "${cloud: State_B: ID}" represents a reference to an attribute value of an attribute in an SLS data file generated by prior execution of a portion of an SLS data file. In the example shown in the final portion of FIG. 18C, the string "${cloud: State_B: ID}" references the name of the resource State_B once that name is obtained via an Idem-service state command. Moreover, execution of the Idem-service state command orders execution of operations related to specified resources to ensure that argument bindings refer to valid attribute values.

Currently Disclosed Methods and Systems

As discussed above, the current application discloses a cloud-infrastructure-management service referred to as the "Idem service." This name is derived from the term "idempotent." An idempotent operation is an operation that can be first applied to an object or entity and, when the object or entity is not subsequently altered by other operations, can be again applied to the object or entity without changing the object or entity. One example of an idempotent operation is the computational operation x=x mod 5, where the initial value of x is 16. The first application of the operation x=x mod 5 sets the value of x to 1. Provided that the value of x is not altered by some other operation, a second application of the operation x=x mod 5 results in the value of x remaining 1, and this is true for any number of repeated applications of the operation x=x mod 5 provided that the value of x is not altered by application of some other operation.

Figure 19:
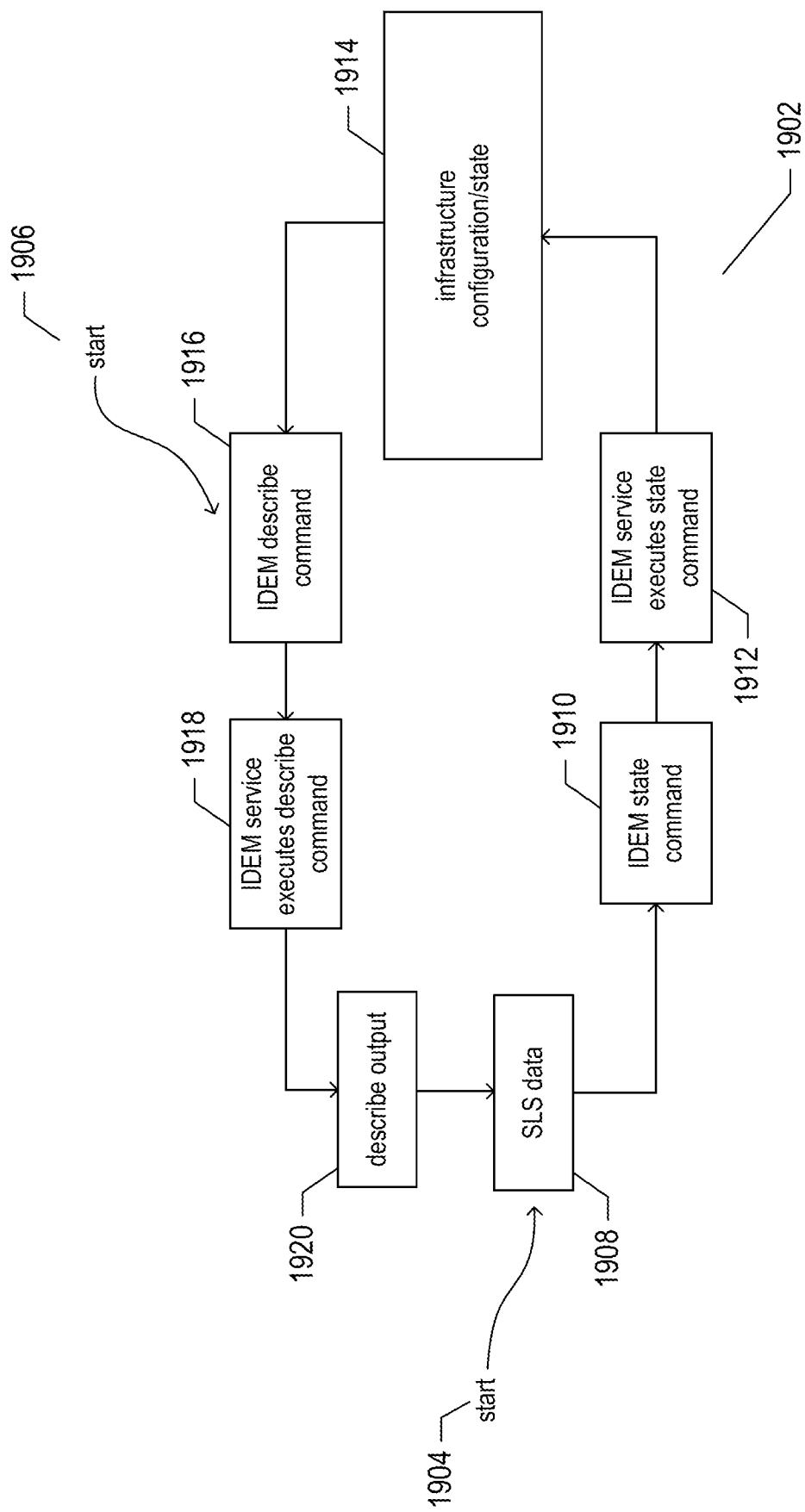
FIG. 19 illustrates a fundamental control loop involving the Idem service.

FIG. 19 illustrates a fundamental control loop involving the Idem service. This control loop involves the Idem-service state command, mentioned above, which applies an SLS-data blueprint or cloud template to a cloud-computing facility. In the case that no infrastructure has yet been deployed and configured within the cloud-computing facility on behalf of the individual or organization submitting the Idem-service state command to the management interface of the Idem service, the Idem service creates, deploys, and configures infrastructure on the cloud-computing facility according to the SLS-data blueprint or cloud template. When the resulting infrastructure is not subsequently altered by other commands or events, then, when the individual or organization again submits the same SLS-data blueprint or cloud template in a subsequent Idem-service state command to the management interface of the Idem service, the infrastructure is not changed by the subsequent Idem-service state command. However, in the case that the infrastructure has been altered by various events following the initial creation, deployment, and configuration of the infrastructure, submission of the same SLS-data blueprint or cloud template in a subsequent Idem-service state command to the management interface of the Idem service returns the infrastructure to the state that the infrastructure had upon initial creation, deployment, and configuration. Thus, the Idem-service state command associated with a particular SLS-data blueprint or cloud template is idempotent, and resubmission of an Idem-service state command associated with a particular SLS-data blueprint or cloud template can be used to control unintended departures of the state of cloud-based infrastructure, referred to as "enforcement," without the risk of causing unintended changes to the state of the infrastructure defined by the SLS-data blueprint or cloud template.

The idempotency of the Idem-service state command is reflected in the fundamental control loop 1902 illustrated in FIG. 19. There are two possible starting points 1904 and 1906 for the control loop 1902. Assuming that the loop begins at the starting point 1904, the loop begins with an SLS-data blueprint or cloud template 1908 that describes desired infrastructure to be created, deployed, and configured within a cloud-computing facility. The SLS-data blueprint or cloud template is referenced by an Idem-service state command 1910 which is submitted to the Idem service for execution 1912. Execution of the Idem-service state command 1910 produces deployed and configured infrastructure 1914 with a state corresponding to a desired state represented by the SLS-data blueprint or cloud template. Subsequent submission of an Idem-service describe command 1916 result in execution of the describe command by the Idem service 1918 which, in turn, produces Idem-service-describe-command output 1920 that represents the current state of the infrastructure. At this point, if the output from the Idem describe command does not reflect the desired state of the infrastructure, the original SLS data can be referenced by a resubmitted Idem-service state command to enforce the originally desired infrastructure state. This enforcement operation is used to correct infrastructure drift, where "infrastructure drift" means an unintended departure of the state of the infrastructure from the desired state due to intervening events or operations. By contrast, if the loop started at starting point 1906, then the output from the Idem-service describe command can be translated into SLS data that can be subsequently used to enforce the infrastructure state represented by the SLS data. Yet another possibility is that the infrastructure state represented by the describe-command output may be used to generate corresponding SLS data which can then be modified in order to generate a new infrastructure state. Thus, the fundamental control loop may continue to iterate in order to maintain the state of the infrastructure in a desired state, with modifications to the SLS-data blueprint or cloud template made to alter the infrastructure state in response to changing goals or conditions.

Figure 20:
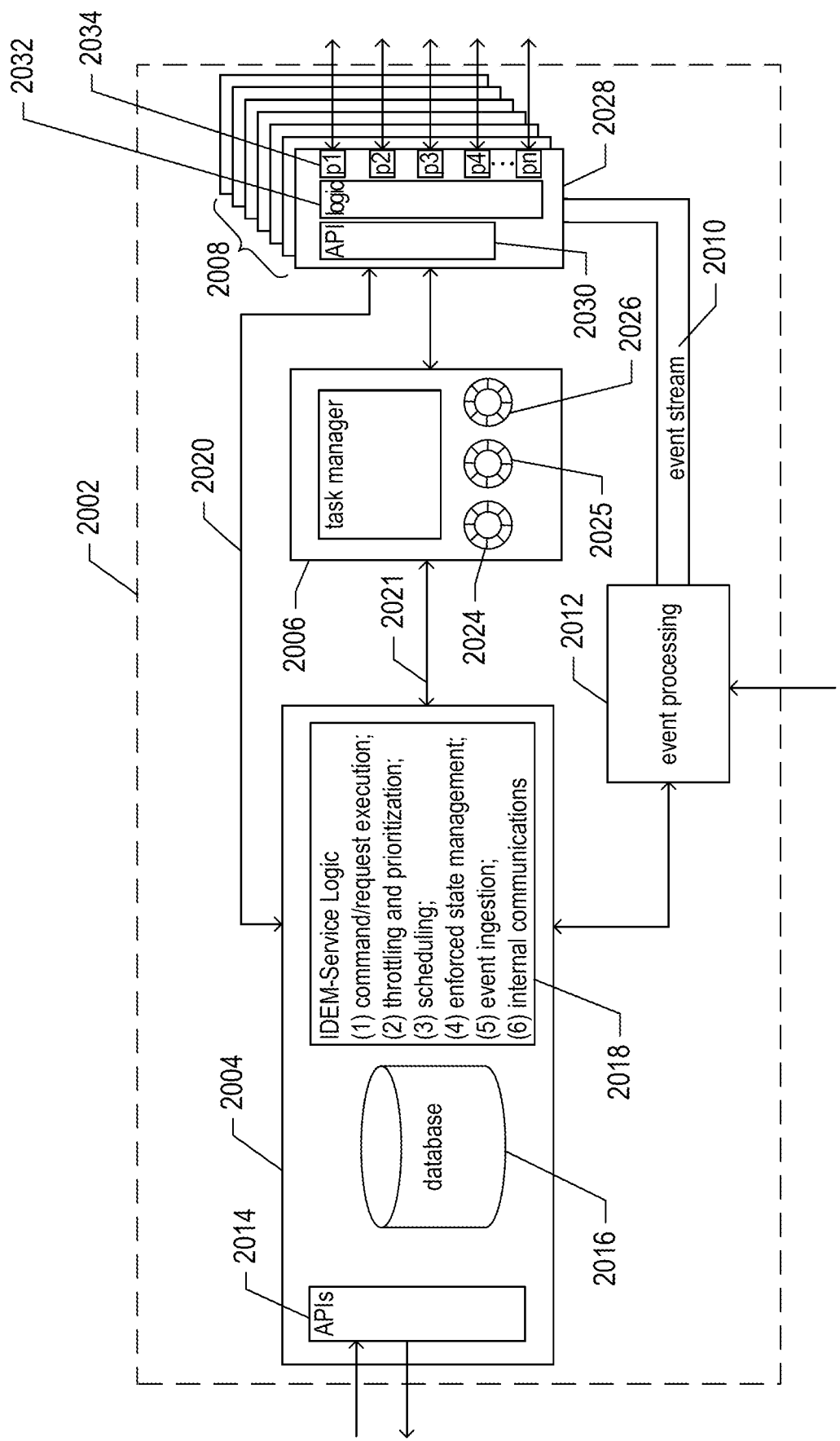
FIG. 20 illustrates one implementation of the Idem service.

FIG. 20 illustrates one implementation of the Idem service. The Idem service 2002 includes an Idem-service frontend 2004, a task manager 2006, multiple Idem-service workers 2008, with the number of Idem-service workers scalable to handle dynamic workloads, an event stream 2010, and an event-processing component 2012. The Idem-service frontend 2004 includes the previously discussed set of GraphQL APIs 2014 and a database 2016 for storing information related to managed infrastructure and received Idem requests and commands. The frontend additionally includes Idem-service logic 2018 that implements command/request execution, throttling and prioritization, scheduling, enforced-state management, event ingestion, and internal communications between the various components of the Idem service. Throttling involves managing the workload accepted by the Idem service to ensure that sufficient computational resources are available to execute received commands and requests. Prioritization involves prioritizing execution of received Idem commands and requests. Scheduling involves preemption of long-running Idem-command-and-request executions. Enforced state management involves maintaining a representation of the last enforced state of a particular infrastructure managed by the Idem service in order to facilitate subsequent command/request execution. Event ingestion involves receiving, storing, and acting on events input to the Idem-service frontend by the event-processing component 2012. The various components of the Idem service communicate by message passing, as indicated by double-headed arrows 2020-2022. The task manager 2006 coordinates various stages of execution of Idem commands and requests using numerous task queues 2024-2026. Each Idem-service worker, such as Idem-service worker 2028, presents an Idem-service worker API 2030 and includes logic 2032 that implements Idem-command-and-request execution. Each Idem-service worker includes a set of one or more plug-ins, such as plug-in 2034, allowing the Idem-service worker to access the management interfaces of cloud-computing facilities on which infrastructure managed by the Idem service is deployed and configured. As they execute commands and requests, Idem-service workers publish events to the event stream 2010. These events are monitored and processed by the event-processing component 2012, which filters the events and forwards processed events to the Idem-service frontend.

Although, as discussed above, the Idem service provides many advantages to those who manage and administer cloud infrastructure, it may be difficult for managers and administrators who are currently managing deployed cloud infrastructure using currently available, non-Idem management tools, to transition to using Idem. Although the above-described SLS-data blueprints or cloud templates allow cloud-infrastructure deployments and configurations to be easily and intuitively created for deployment and configuration of cloud infrastructure via the Idem-service state command, there is still a learning curve associated with adopting the SLS-data-cloud-template approach. This learning curve involves learning how to encode cloud-infrastructure deployment and configuration in a set of SLS data files that together comprise a parameterized cloud template, but also involves the potentially difficult task of determining the resources and associated resource attributes for cloud infrastructure already deployed in cloud-computing facilities. Quite often, the cloud infrastructure that was initially specified through other types of management interfaces has changed, over time, so that it no longer corresponds to original specifications, a phenomenon referred to as "drift." In order to transition already deployed cloud infrastructure to being managed by the Idem-service, a manager or administrator may need to spend significant amounts of time determining the resources and resource attributes for the already deployed cloud infrastructure through tedious and complex management-interface operations. Moreover, manual transitioning of already deployed and configured cloud infrastructure to management by the Idem-service may be error-prone. Because of problems associated with drift, submitting an SLS cloud template manually prepared from information obtained through another type of cloud-infrastructure management interface can result in the Idem service attempting to restore the deployment and configuration encoded in the SLS cloud template, which may result in unintended changes to the already deployed cloud infrastructure that, in turn, may result in operational anomalies and even system failures.

Figure 21:
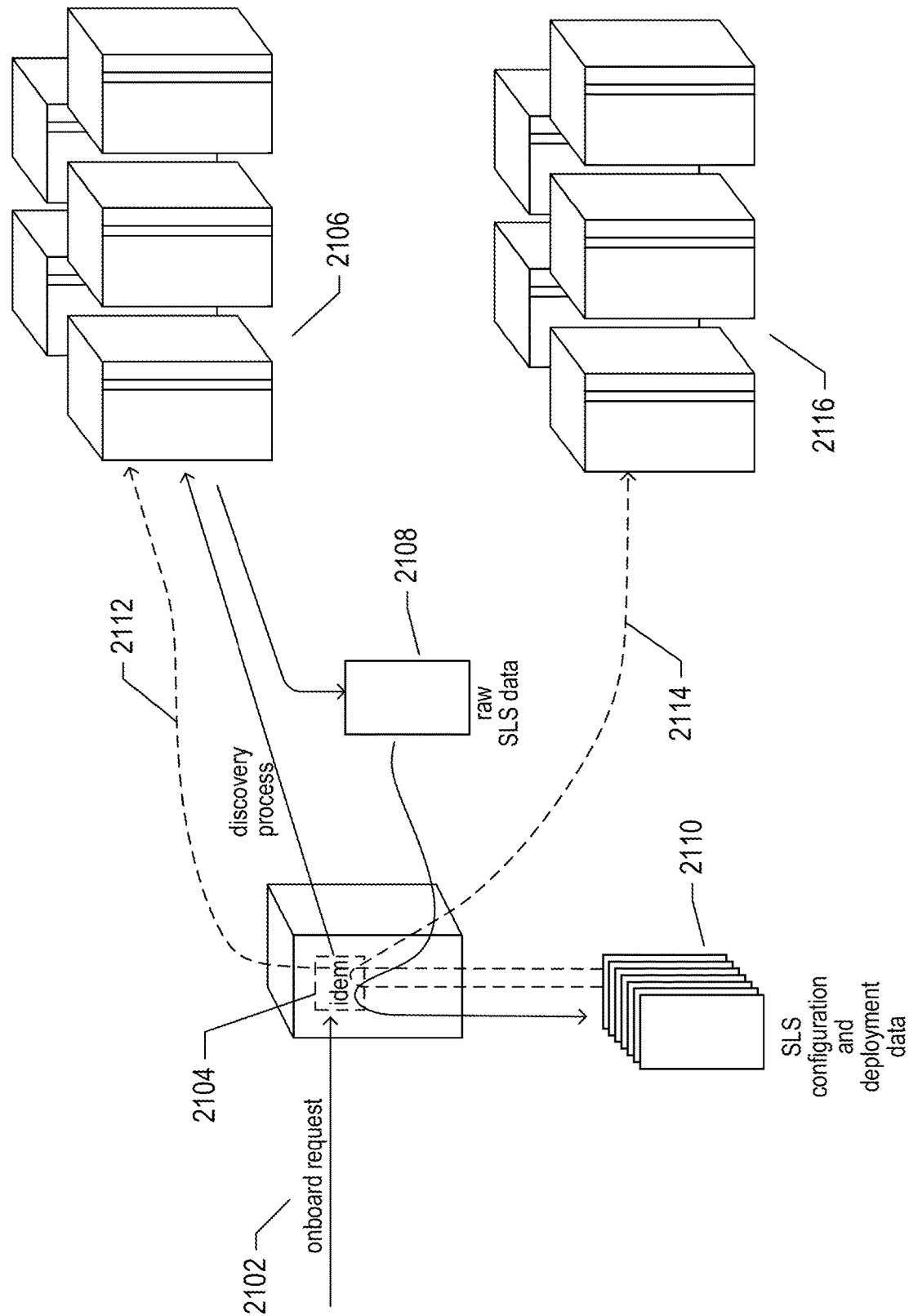
FIG. 21 illustrates the currently disclosed methods and systems that generate parameterized cloud templates corresponding to already deployed and configured cloud infrastructure.

To resolve the problems discussed in the preceding paragraph, an automated method for generating parameterized cloud templates corresponding to already deployed and configured cloud infrastructure has been developed and incorporated into the Idem service. FIG. 21 illustrates the currently disclosed methods and systems that generate parameterized cloud templates corresponding to already deployed and configured cloud infrastructure. The term "parameterized" indicates that the cloud templates include resource-id bindings and/or parameter function calls, discussed below. These currently disclosed methods and systems are invoked by an onboard request or command 2102 submitted to the Idem service 2104. The terms "onboard" and "onboarding" refer to the process of transitioning management of cloud infrastructure from a non-Idem management service or system to the Idem service. Upon receiving the onboard request or command, the Idem service connects to the cloud provider associated with the already deployed and configured cloud infrastructure 2106 and carries out a discovery process based on the above-described Idem describe command. This process results in generation of a YAML-like description 2108 of the already deployed and configured cloud infrastructure, discussed above with reference to FIGS. 18B-C. In alternative implementations, other types of data-representation languages can be used in place of YAML. The YAML-like description 2108 is referred to as "raw SLS data." The raw SLS data is then automatically processed by the Idem service to produce a parameterized cloud template 2110 that corresponds to the already deployed and configured cloud infrastructure, as discussed, in detail, below. The parameterized cloud template can then be immediately used for management of the already deployed and configured cloud infrastructure, as indicated by dashed arrow 2112, and/or can be used, as indicated by dashed arrow 2114, as a template for deploying equivalent cloud infrastructure in a new cloud-computing facility 2116. The onboard request allows an administrator or manager to quickly and accurately transition existing cloud infrastructure to being managed by the Idem service, without the risk of operational anomalies or system failures due to drift or to the administrator's or manager's failure to understand SLS-based cloud-infrastructure specification and/or failure to accurately emulate the already deployed cloud-infrastructure specification in a manually prepared cloud template, and thus represents a significant and important improvement to the Idem service and to general management and administration of cloud-based infrastructure. In essence, the currently disclosed methods and systems represent an improved computational system for management and administration of cloud-based infrastructure.

Figure 22:
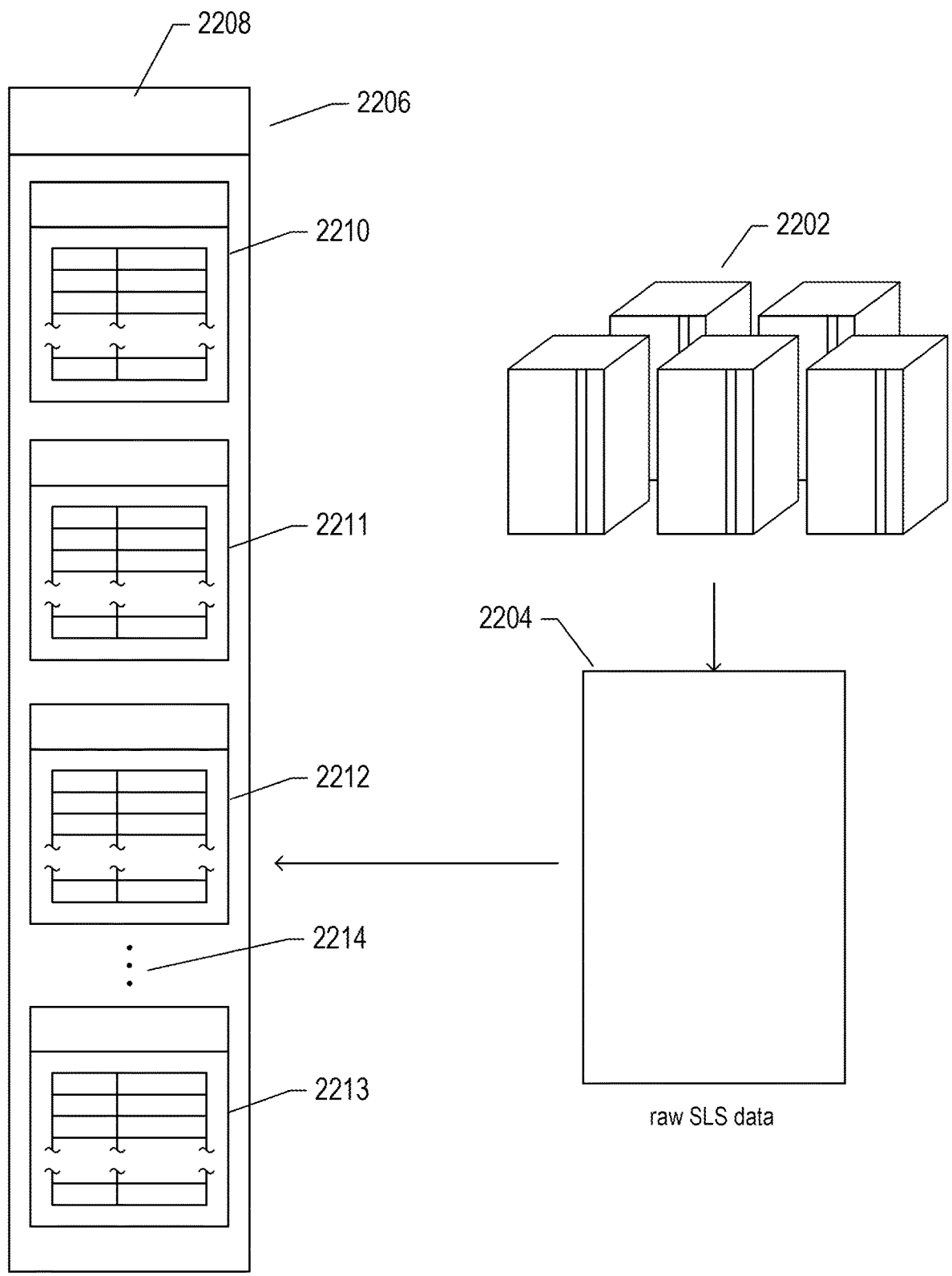
FIG. 22 illustrates a first step in the onboarding process introduced in the preceding paragraph.

FIG. 22 illustrates a first step in the onboarding process introduced in the preceding paragraph. Upon receiving the onboard request or command, including authorization and authentication information needed to connect to the management interface associated with the cloud provider and/or cloud-computing facility currently hosting the already deployed and configured cloud infrastructure 2202, the Idem service executes an Idem describe command to generate raw SLS data 2204 that describes the already deployed and configured cloud infrastructure. The Idem service then allocates an in-memory data structure 2206 into which the information contained in the raw SLS data is loaded. The in-memory data structure includes general information regarding the already deployed and configured cloud infrastructure 2208 along with a set of resource descriptors 2210-2213, alternatively referred to as "resource data structures," with ellipsis 2214 indicating that the set of resource descriptors shown in FIG. 22 may include many additional resource descriptors. The in-memory data structure thus contains the same information that is contained in the raw SLS data, but in a highly formatted data structure that allows for efficient computational processing. In addition, the in-memory data structure closely parallels the content and formatting of an SLS data file.

Figure 23A:
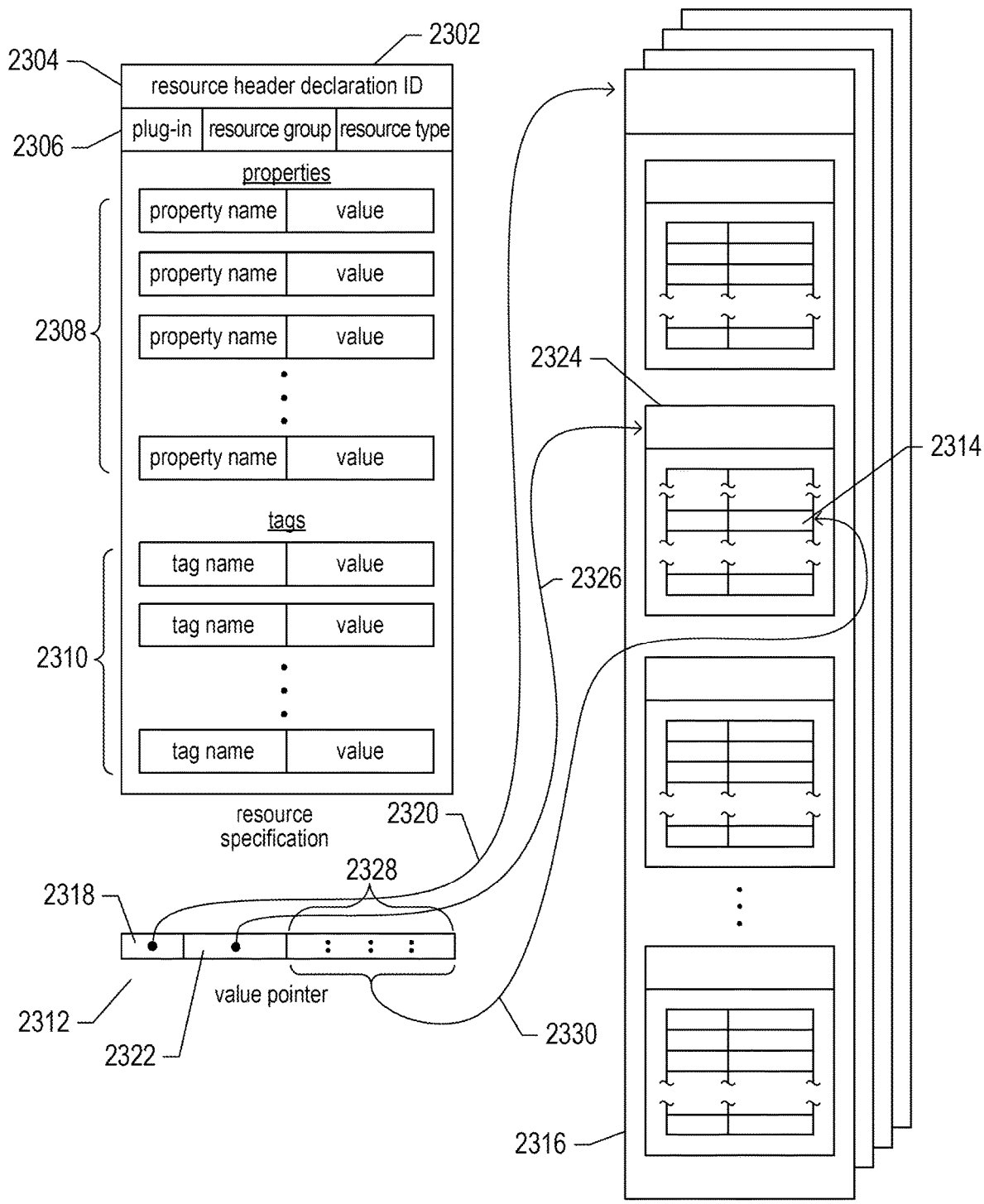
FIGS. 23A-B illustrate the concept of pointers to property and tag values in the in-memory data structure discussed above with reference to FIG. 22 and in an parameterized cloud template.
Figure 23B:
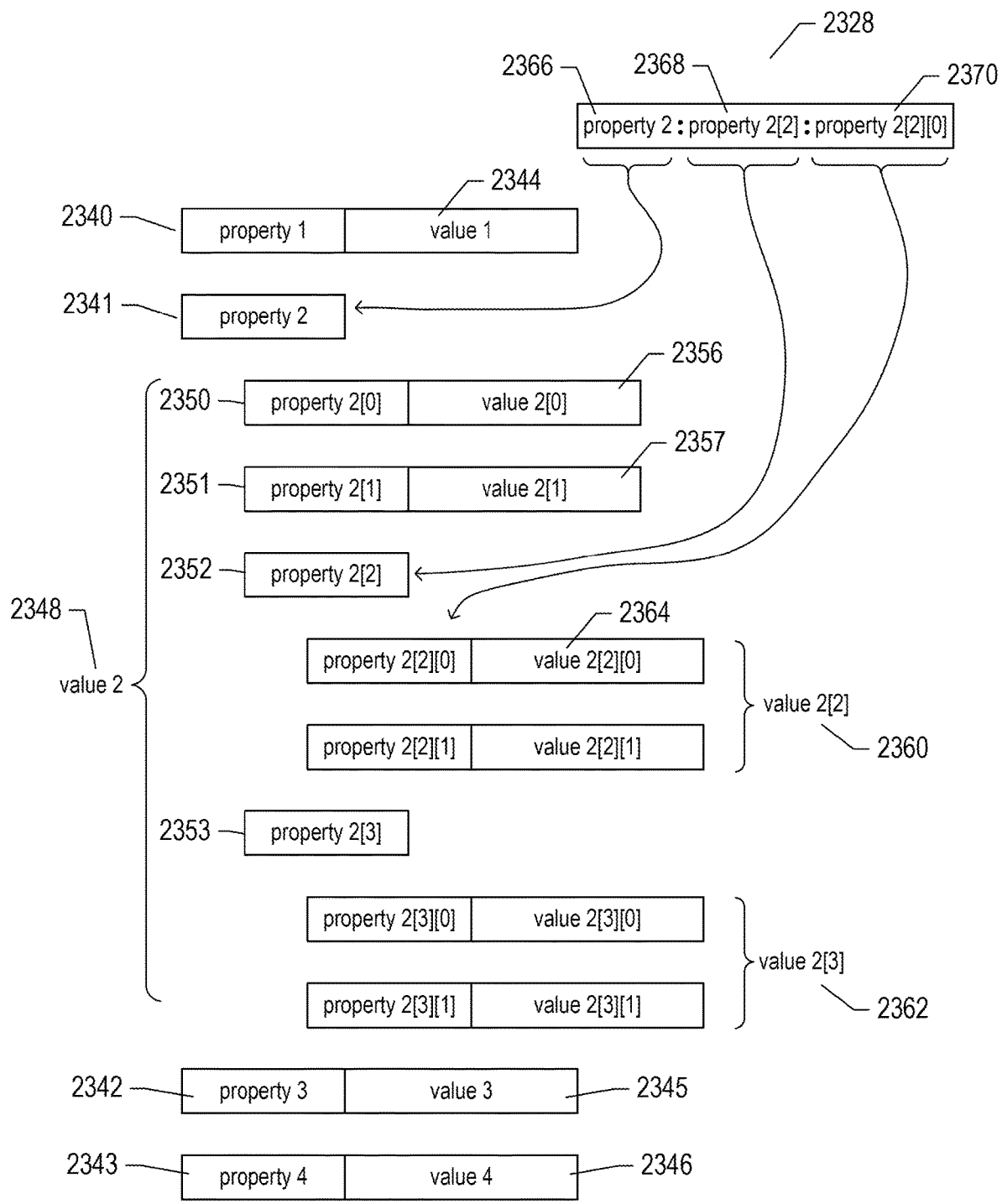

FIGS. 23A-B illustrate the concept of pointers to properties and tags in the in-memory data structure discussed above with reference to FIG. 22 and in SLS data files that together comprise a parameterized cloud template. FIG. 23A shows a resource descriptor 2302 within the above-discussed in-memory data structure, which also represents a resource specification in an SLS data file. The resource descriptor or resource specification includes a resource header declaration ID 2304 (1808 in FIG. 18A), referred to as a "state name" in the example SLS state file discussed in FIG. 18A, a plug-in/resource-group/resource-type tuple 2306 (for example, the plug-in/resource-group/resource-type tuple in directive 1810 in FIG. 18A), a list of property-name/property-value pairs 2308 (1812 in FIG. 18A), and a list of tag-name/tag-value pairs 2310 (1814 in FIG. 18A). In the following discussion, properties and tags are generally referred to as "attributes" and property and tag values are referred to as "attribute values," since the distinction between properties and tags is not particularly relevant to the currently disclosed methods and systems.

It is convenient to computationally generate a pointer, or reference, to a particular attribute in the in-memory data structure and in SLS data files. Such references may be used in argument bindings, for example, to refer to an attribute value. FIG. 23A shows the structure of an attribute pointer 2312 that points, or refers, to a particular attribute value 2314 in an SLS data file 2316. An attribute pointer can be, of course, used as a reference to either the attribute-name or attribute-value portion of an attribute. A first portion of the attribute pointer 2318 is a reference to the SLS data file 2316 or to an in-memory data structure, as indicated by curved arrow 2320. A second portion 2322 of the attribute pointer is a reference to the resource specification or descriptor 2324 that contains the attribute value 2314, as indicated by curved arrow 2326. A final portion of the attribute pointer 2328 is a reference to the attribute, including the attribute value field 2314, in the context of the resource specification or descriptor 2324 that contains the attribute value, as indicated by curved arrow 2330.

FIG. 23B illustrates the contents of the final portion 2328 of the attribute pointer 2312 shown in FIG. 23A. The attributes within a resource specification or descriptor may be hierarchically structured. FIG. 23B shows an example hierarchical structure of attributes. There are four highest-level attributes 2340-2343. Three of the highest-level attributes, attribute 1 (2340), attribute 3 (2342), and attribute 4 (2343), have simple values 2344-2346. However, attribute 2 (2341) has a complex value 2348 that includes four second-level attributes 2350-2353. Second-level attributes 2350 and 2351 both have simple values 2356-2357. However, second-level attributes 2352 and 2353 both have complex values consisting of a pair of third-level attributes 2360 and 2362. The final portion of the attribute pointer 2328 comprises a list of colon-separated subfields containing references to a first-level, second-level, and third-level attribute, with the third-level attribute referenced by the attribute pointer 2312 as a whole. A first subfield 2366 of the final portion of the attribute pointer references the first-level attribute 2341 in which value 2364 is contained. A second subfield 2368 of the final portion of the attribute pointer includes a reference to a second-level attribute 2352 in which value 2364 is contained. A third subfield 2370 of the final portion of the attribute pointer contains a reference to the third-level attribute 2364. Of course, the final portion of an attribute pointer contains only a sufficient number of colon-separated subfields to identify a particular attribute value, and may include a single subfield when the referenced value is that of a first-level attribute.

Different combinations of portions of the attribute pointer can be used as references to an in-memory data structure, an SLS data file, or a resource specification or descriptor. The first portion 2318 of an attribute pointer refers to either a specific SLS data file or to an in-memory data structure storing the contents of raw SLS data generated by execution of an Idem describe command. A combination of the first and second portions of an attribute pointer can be used as a reference to a particular resource descriptor or specification.

Figure 24:
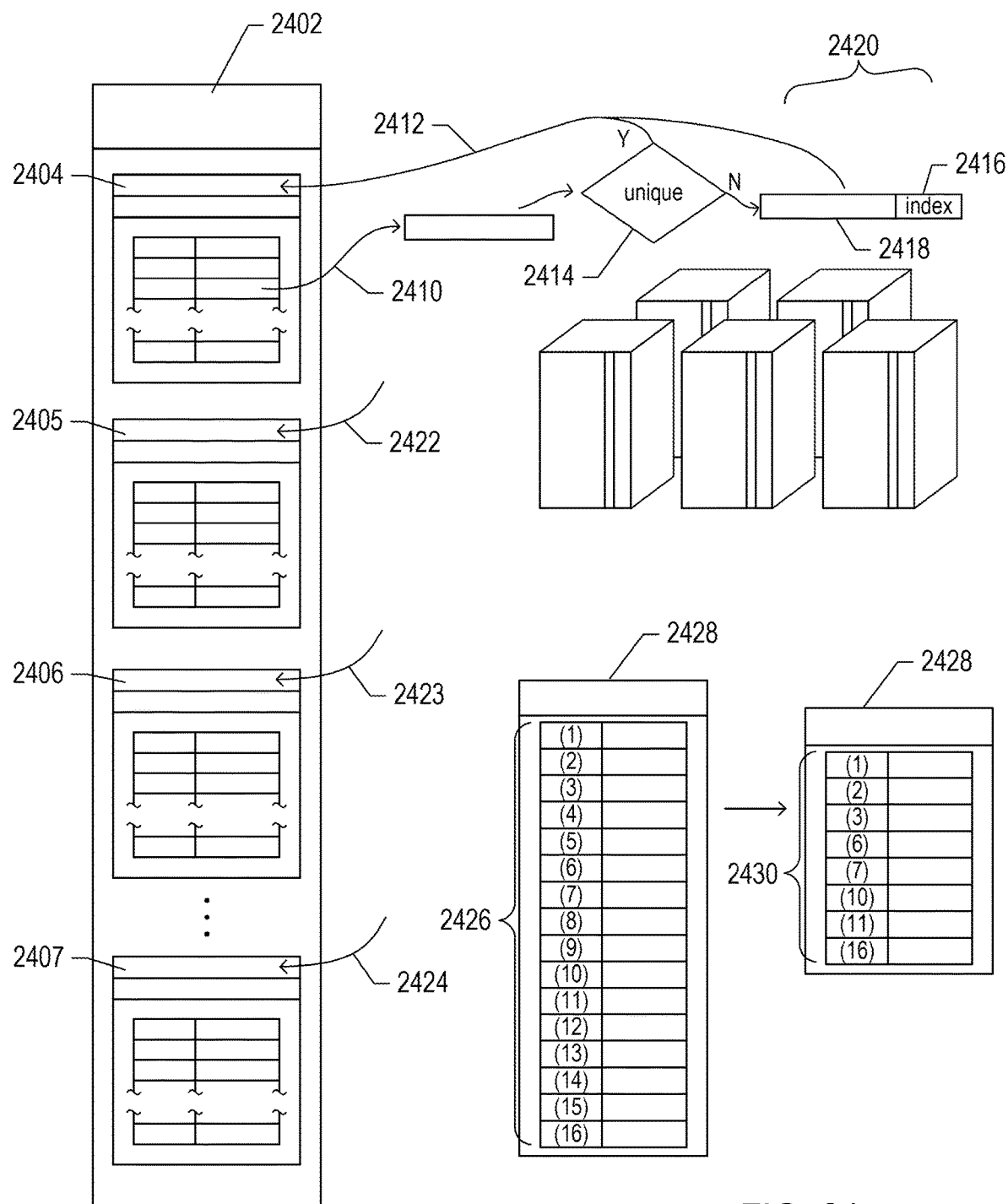
FIG. 24 illustrates a second step and a third step of the onboarding process that follow the first step, discussed above with reference to FIG. 22, in which raw SLS data is loaded into the in-memory data structure 2402.

FIG. 24 illustrates a second step and a third step of the onboarding process that follow the first step, discussed above with reference to FIG. 22, in which raw SLS data is loaded into the in-memory data structure 2402. In the second step, the resource header declaration IDs 2404-2407 in the resource descriptors of the in-memory data structure are replaced with user-friendly resource header declaration IDs. User-friendly resource header declaration IDs are resource header declaration IDs with readily understandable natural-language meanings. The resource header declaration IDs returned in the raw SLS data by execution of the describe command are generally alphanumeric resource identifiers, or include alphanumeric resource identifiers, generated by the cloud provider or a non-Idem management interface for the deployed resources. In the second step of the onboarding process, the Idem service extracts one or more attribute values from a resource descriptor, represented by arrow 2410, and uses them to produce a user-friendly resource header declaration ID that is then copied into the resource descriptor, as indicated by arrow 2412. Such attribute values may include, for example, natural-language resource names. When the initially generated user-friendly resource header declaration ID is unique with respect to all of the user-friendly resource header declaration IDs so far generated by the onboarding process, as determined in conditional step 2414, the initially generated user-friendly resource header declaration ID is copied into the resource-header-declaration-ID field of the resource descriptor. Otherwise, an index 2416 is appended or prepended to the initially generated user-friendly resource header declaration ID 2418 to produce a unique user-friendly resource header declaration ID 2420, which is then copied into the resource-header-declaration-ID field of the resource descriptor. The second step of the onboarding process replaces the cloud-provider-generated resource header declaration IDs with user-friendly resource header declaration IDs, as indicated by arrows 2412 and 2422-2424. In a third step of the onboarding process, the attributes in each resource descriptor, such as the attributes 2426 in resource descriptor 2428, are evaluated for inclusion in the parameterized cloud template. Only those attributes that are needed to specify and configure resources during execution of an Idem state command are retained. Thus, in the example shown in FIG. 24, only a subset of the attributes 2430 remain in resource descriptor 2428 following the third step of the onboarding process, which attributes from the resource descriptors in the in-memory data structure 2402.

Figure 25:
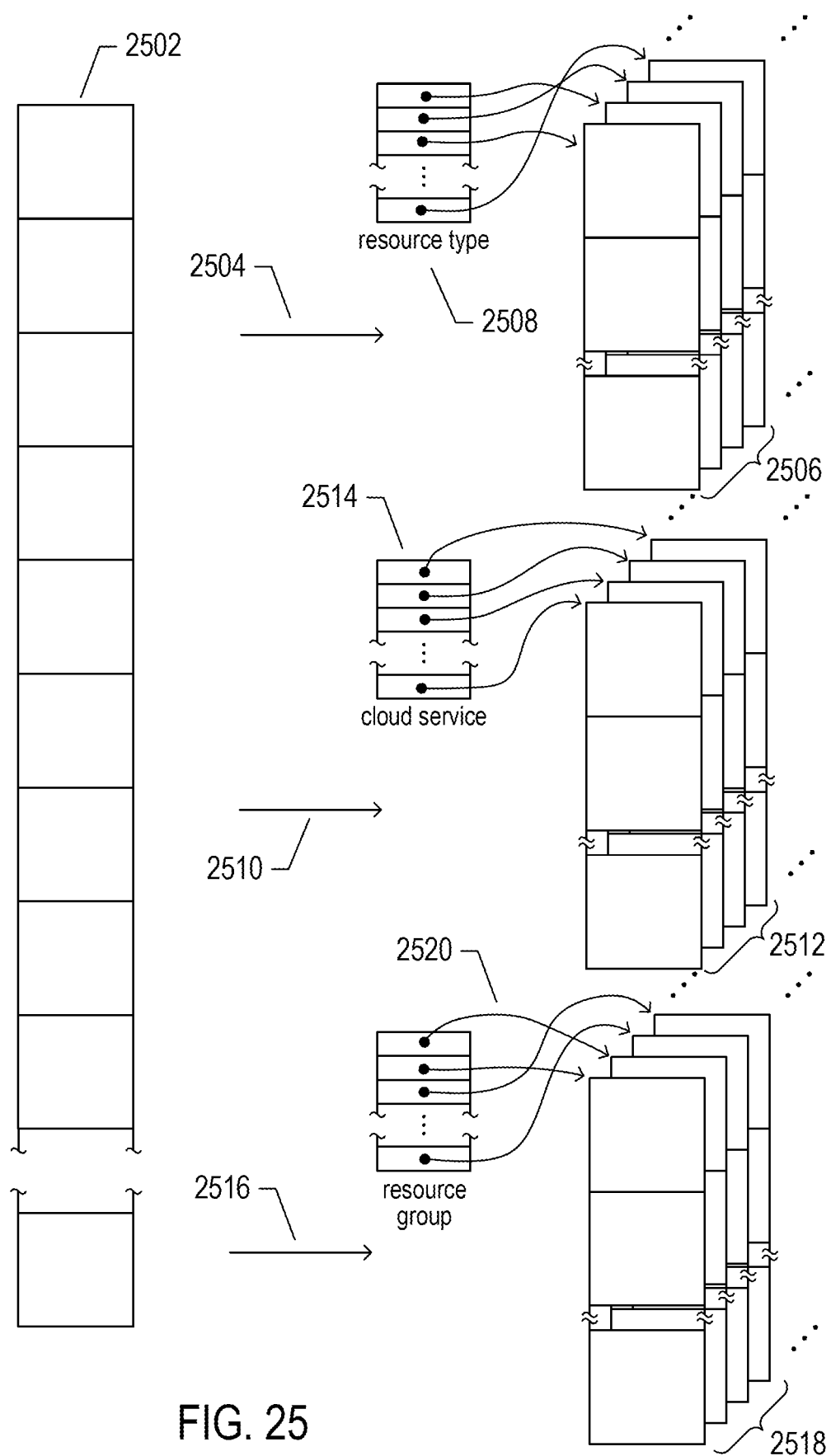
FIG. 25 illustrates a fourth step in the onboarding process.

FIG. 25 illustrates a fourth step in the onboarding process. In the fourth step, the contents of the in-memory data structure 2502 are output to a set of SLS data files. The fourth step can be carried out according to one of a number of different grouping options. A first grouping option, represented by arrow 2504, partitions the resource descriptors in the in-memory data structure 2502 by resource type, as encoded in the plug-in/resource-group/resource-type tuple (2306 in FIG. 23A and 1810 in FIG. 18A). The resource descriptors for each different type of resource are used to generate resource specifications included in a particular SLS data file which, together with other SLS data files, comprises a parameterized cloud template. In FIG. 25, the set of SLS data files 2506 that together comprise a parameterized cloud template are shown indexed by resource type 2508, with each SLS data file corresponding to a different resource type. In many implementations, this is the default option for generating a parameterized cloud template from the contents of the in-memory data structure. A second grouping option is represented by arrow 2510. This option partitions the resource descriptors according to the cloud service with which they are associated. For example, an online retail website may include a set of front-end servers, middle-tier servers that provide multiple middle-tier services, and back-end servers that provide multiple back-end services. In this case, resource specifications for virtual machines that implement the front-end servers may be placed into a first SLS data file, resource specifications for virtual machines that implement a first service provided by certain of the middle-tier servers may be placed into a second SLS data file, and so forth. The assignment of resources to cloud services is made using information contained in the resource descriptors of the in-memory data structure. FIG. 25 shows the SLS data files 2512 produced by the second grouping option indexed by cloud service 2514. A third grouping option is represented by arrow 2516. This option partitions the resource descriptors according to the resource groups to which they belong. Resource groups may be defined by the value in the resource-group field of the plug-in/resource-group/resource-type tuple (2306 in FIG. 23A and 1810 in FIG. 18A) that characterizes a resource. Resources may alternatively be hierarchically grouped via attribute-value references to other resources. The root-level resources in such hierarchies define resource groups. Each SLS data file contains resource specifications for all of the resources within a resource group, defined by the resource-group field of the plug-in/resource-group/resource-type tuples in resource descriptors or by hierarchies of attribute-value references. FIG. 25 shows the SLS data files 2518 produced by the third grouping option indexed by resource group 2520.

Figure 26A:
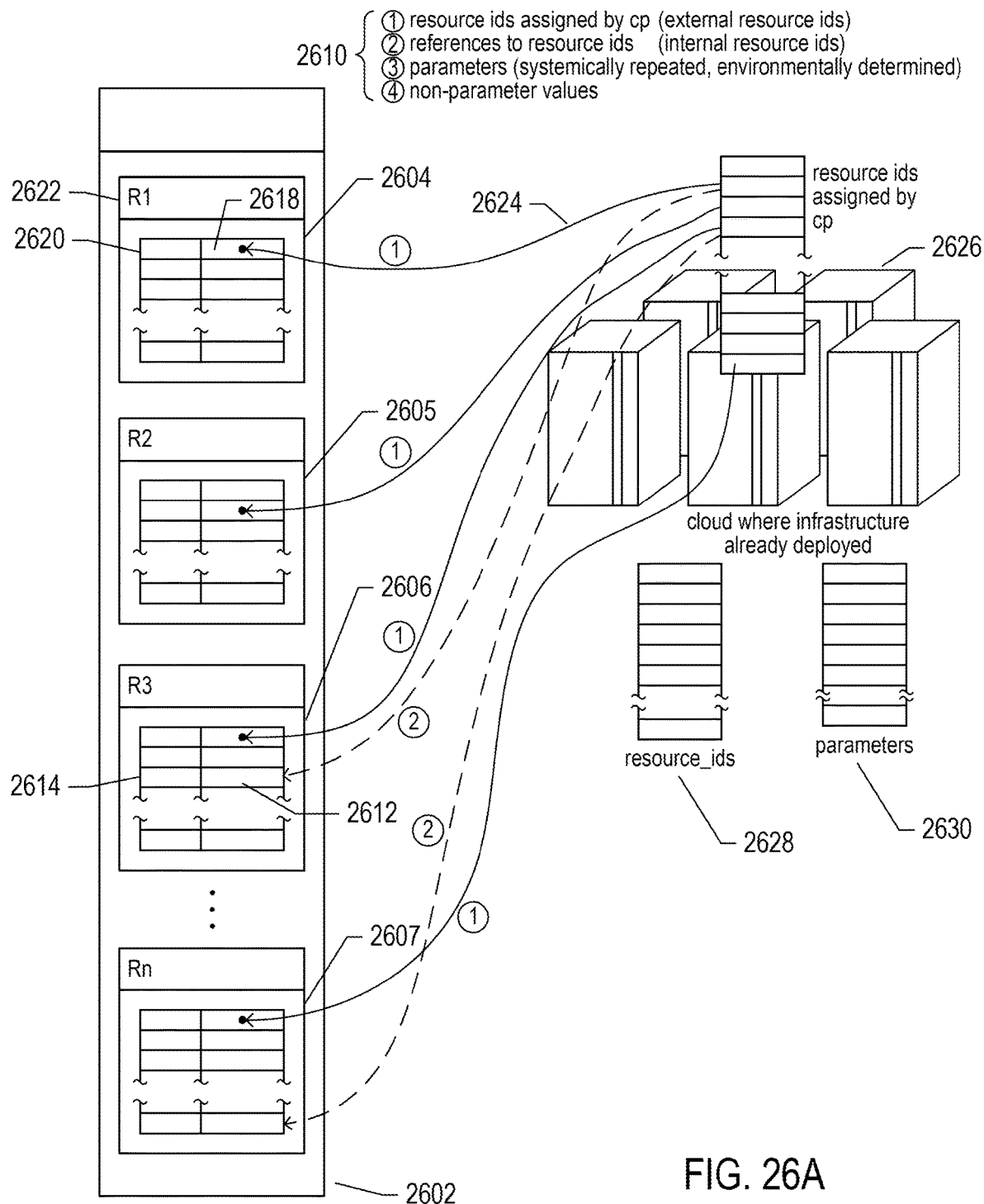
FIGS. 26A-E illustrate various types of attribute values.

FIGS. 26A-E illustrate various types of attribute values. FIG. 26A shows resource specifications 2604-2607 within an SLS data file 2602 that contains data input from the in-memory data structure following the above-described fourth step of the onboarding process. Four different types of attribute values 2610 are shown at the top of FIG. 26A, with each attribute-value type associated with a circled numerical label. The first type of attribute value is a cloud-provider-generated resource id included within the resource descriptor for the resource identified by the resource id. Each resource descriptor in the SLS data file 2602 shown in FIG. 26A includes a cloud-provider-generated resource id that names or identifies the resource. An attribute value of the first type, even though an alphanumeric resource id, is essentially an external reference to a resource id and is referred to as an "external resource-id reference," below, and is replaced by a resource function call, as further discussed below. A second type of attribute value is a resource id contained in an attribute-value field of a resource descriptor that acts as a reference to a resource id that names or identifies a resource in the same or another SLS data file. An attribute value of the second type is essentially an internal reference to a resource id and is referred to as an "internal resource-id reference" below. One example of an internal resource-id reference is the resource id contained in the value field 2612 of attribute 2614 in resource descriptor 2616. This resource id is the same as the resource id contained in the value field 2618 of attribute 2620 in resource descriptor 2622. Initially, as indicated by curved arrows, such as curved arrow 2624, the attribute values of the first and second types, referred to as external and internal resource-id references, are the alphanumeric resource ids assigned to the resources by the cloud provider 2626 containing the already deployed and configured infrastructure from which the data in the in-memory data structure was obtained via the Idem describe command. In FIG. 26A, solid curved arrows labeled with circled "1" symbols show the cloud-provider sources of attributes containing external resource-id references and dashed curved arrows labeled with circled "2" symbols show the cloud-provider sources of attributes containing internal resource-id references. FIG. 26A also shows a resource_ids data structure 2628 and a parameters data structure 2630. These two data structures are generated along with the one or more SLS files data files in the above-described fourth step of the onboarding process.

Figure 26B:
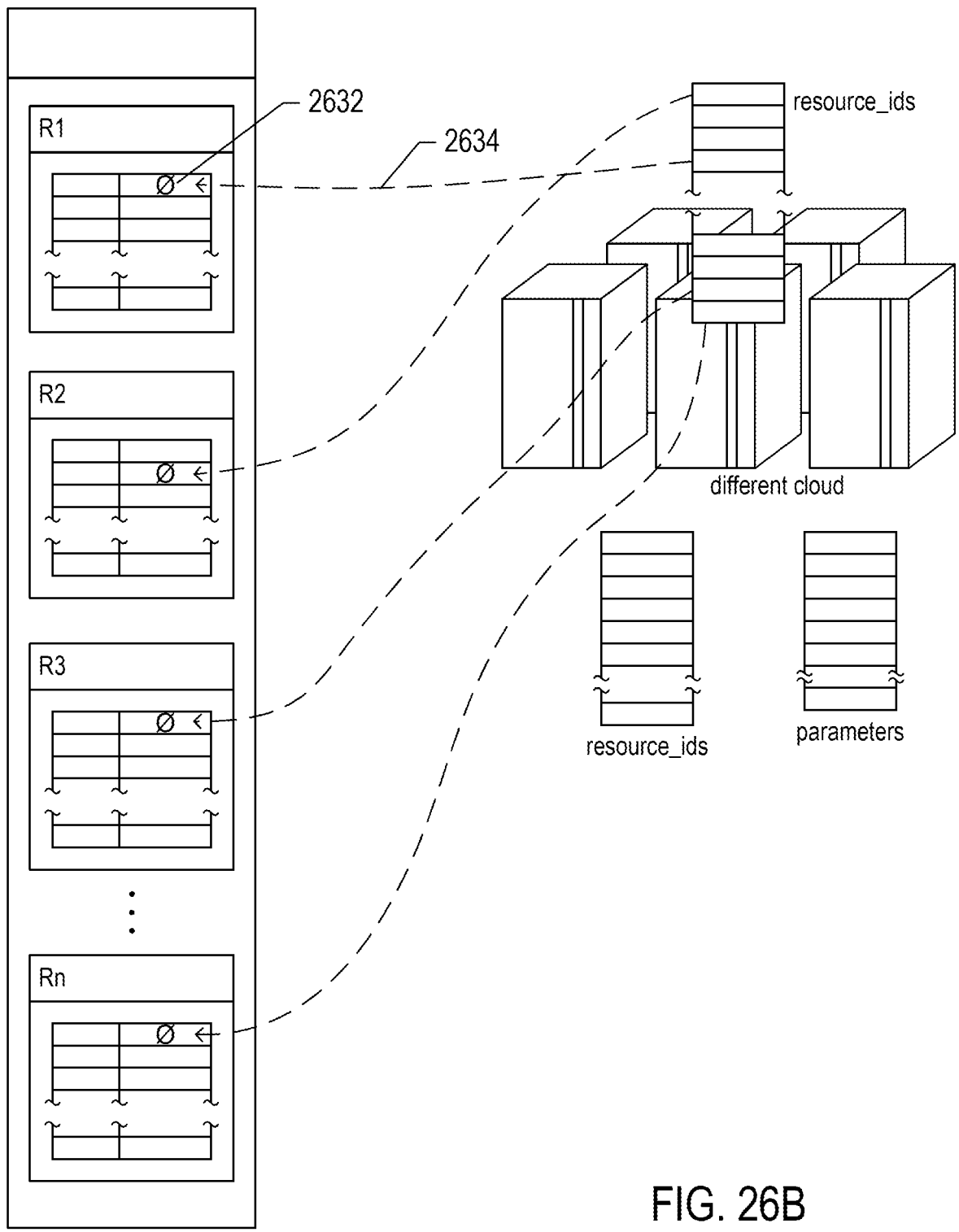
Figure 26C:
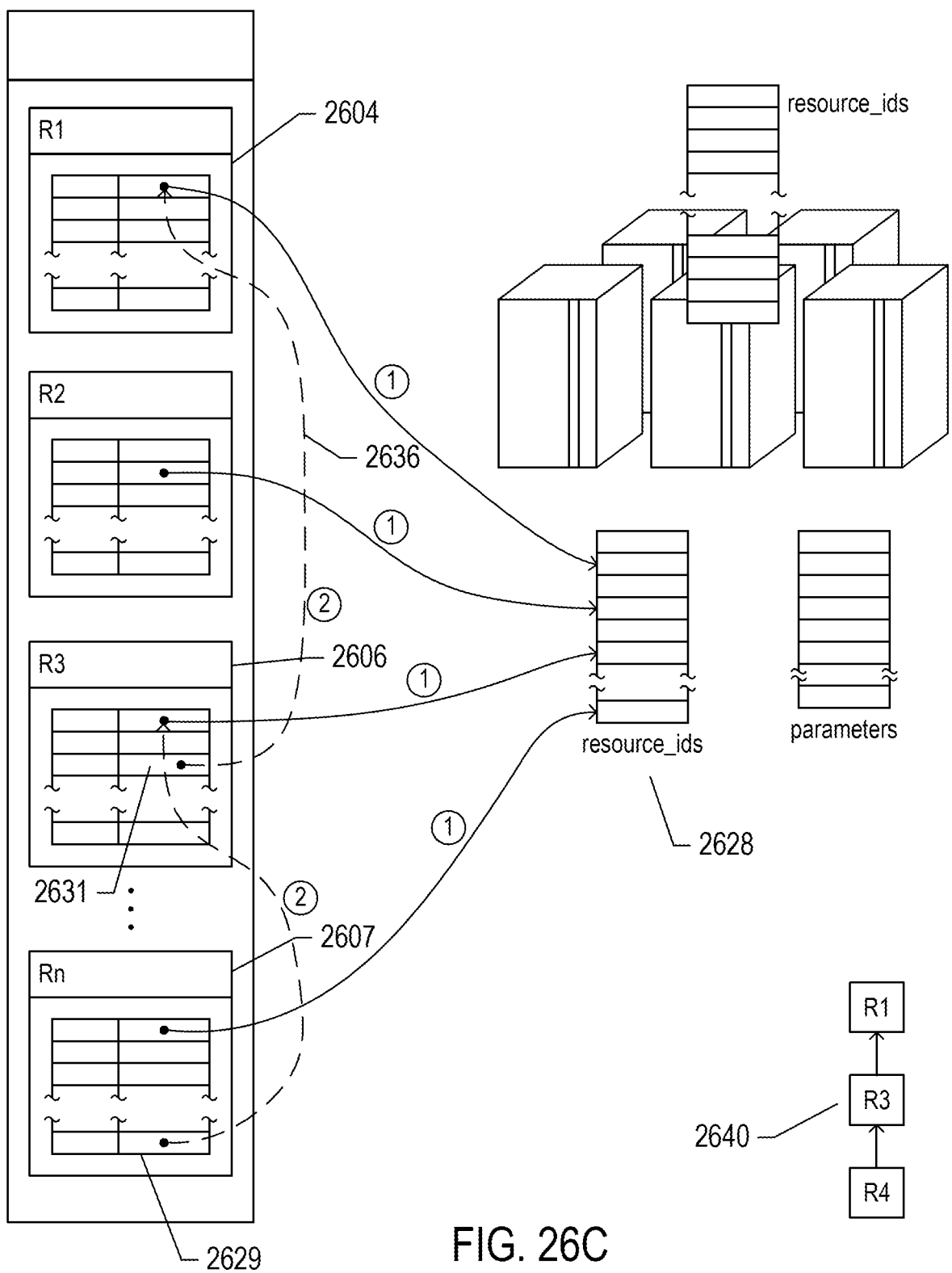

When the SLS data files are used as a cloud template for deploying equivalent infrastructure to a new cloud-computing facility/cloud provider (2114 in FIG. 21), the external resource-id references obtained via the Idem describe command from the cloud-computing facility/cloud provider containing the already deployed and configured infrastructure are not valid for the new cloud-computing facility/cloud provider. In this case, as indicated in FIG. 26B, the external resource-id references are removed, as indicated by the empty-set symbols, such as empty-set symbol 2632. Subsequently, as indicated by dashed arrows, such as dashed arrow 2634, following execution of a first Idem state command using the new cloud template, these blank attribute values are logically replaced with cloud-provider-generated resource ids used in the new cloud-computing facility. In the case that the SLS data files are used as a cloud template for the cloud-computing facility/cloud provider from which the initial external resource-id references are obtained via the Idem describe command (2112 in FIG. 21) and in the case that the SLS data files are used as a cloud template for deploying equivalent infrastructure to a new cloud-computing facility/cloud provider and the blank attribute values have been logically replaced by new resource ids, as discussed above, the new resource ids are stored in the resource_ids data structure 2628 and the attribute values containing external resource-id references in the SLS data files are replaced with resource function calls that act as references to the resource ids stored in the resource_ids data structure 2628, as shown in FIG. 18C. The internal resource-id references are replaced by argument bindings, discussed above with reference to 1828 in FIG. 18C, which are referred to as "resource-id bindings" in this discussion. The resource-id bindings are shown by dashed arrows, such as dashed arrow 2636 in FIG. 26C.

Figure 26D:
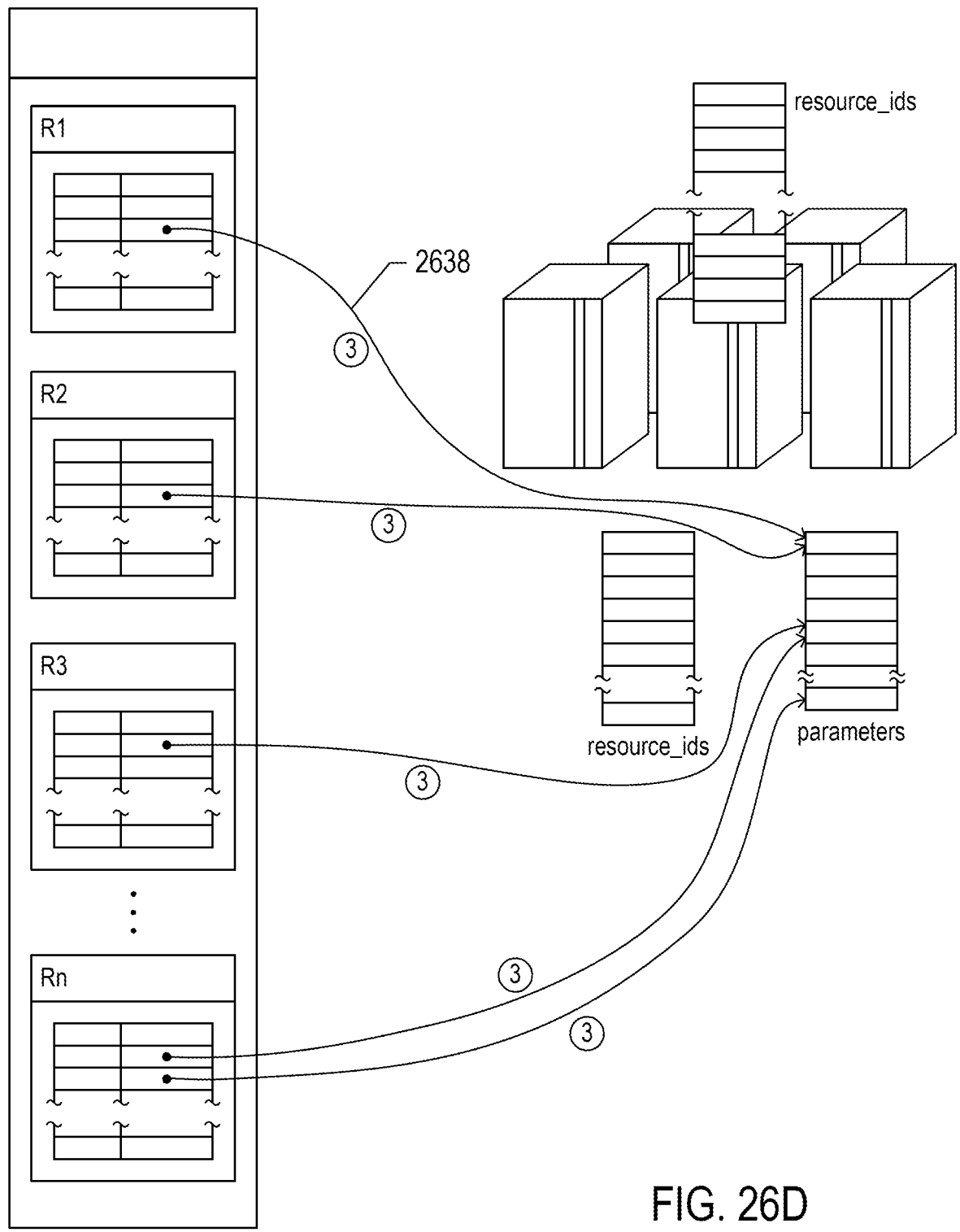

FIG. 26D illustrates parameter value, a third type of attribute value. Parameter values are attribute values that are environmentally determined. In general, parameter values occur multiple times in a parameterized cloud template. Examples of parameter values include the local virtual IP address or addresses associated with a virtual machine that may be encoded as one or more attribute values in the resource descriptor for the virtual machine. These local virtual IP addresses are assigned by the cloud provider, and are thus environmentally determined. The various different parameter values are contained in the parameters data structure 2630. Curved arrows, such as curved arrow 2638, map parameter values contained in resource-descriptor attribute values to the same parameter values contained in the parameters data structure or file. The attribute values containing parameter values are replaced with parameter function calls that act as references to the parameter values stored in the parameters data structure 2628. Finally, the fourth type of attribute values are the remaining attribute values that do not constitute either resource ids or parameter values. These attribute values generally specify desired characteristics of a resource.

Figure 26E:
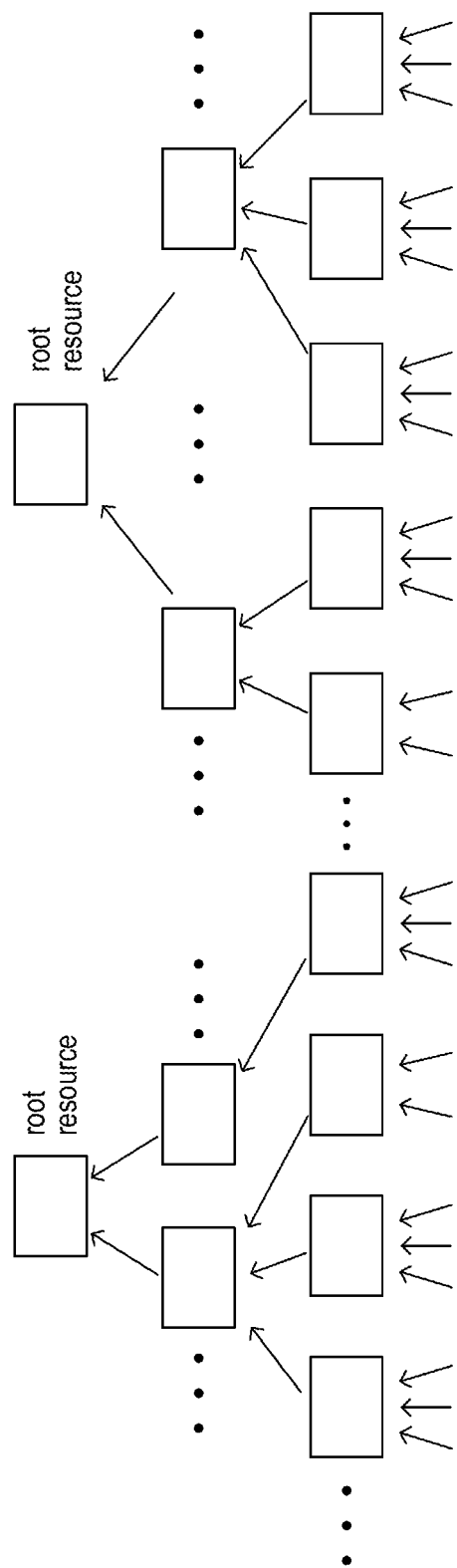

Internal resource-id references may encode the resource hierarchies discussed above with reference to FIG. 25. In the example shown in FIG. 26D, the resource specification 2607 for resource Rn includes an internal resource-id reference 2629 that references resource R3 specified by the resource specification 2606. The resource specification for resource R3, in turn, includes an internal resource-id reference 2631 that references resource RI specified by the resource specification 2604. In this example, the internal resource-id references encode a simple resource hierarchy 2640 in which resource RI is the root resource. Of course, the same hierarchy could alternatively be encoded by internal resource-id references that reference resource Rn from resource R3 and that reference resource R3 from resource RI. More complex examples of resource hierarchies are shown in FIG. 26E. Thus, internal resource-id references and may encode resource hierarchies that define resource groups. Alternatively, as discussed above, resource groups may instead be defined by the resource-group field of the plug-in/resource-group/resource-type tuples in resource descriptors.

Figure 27:
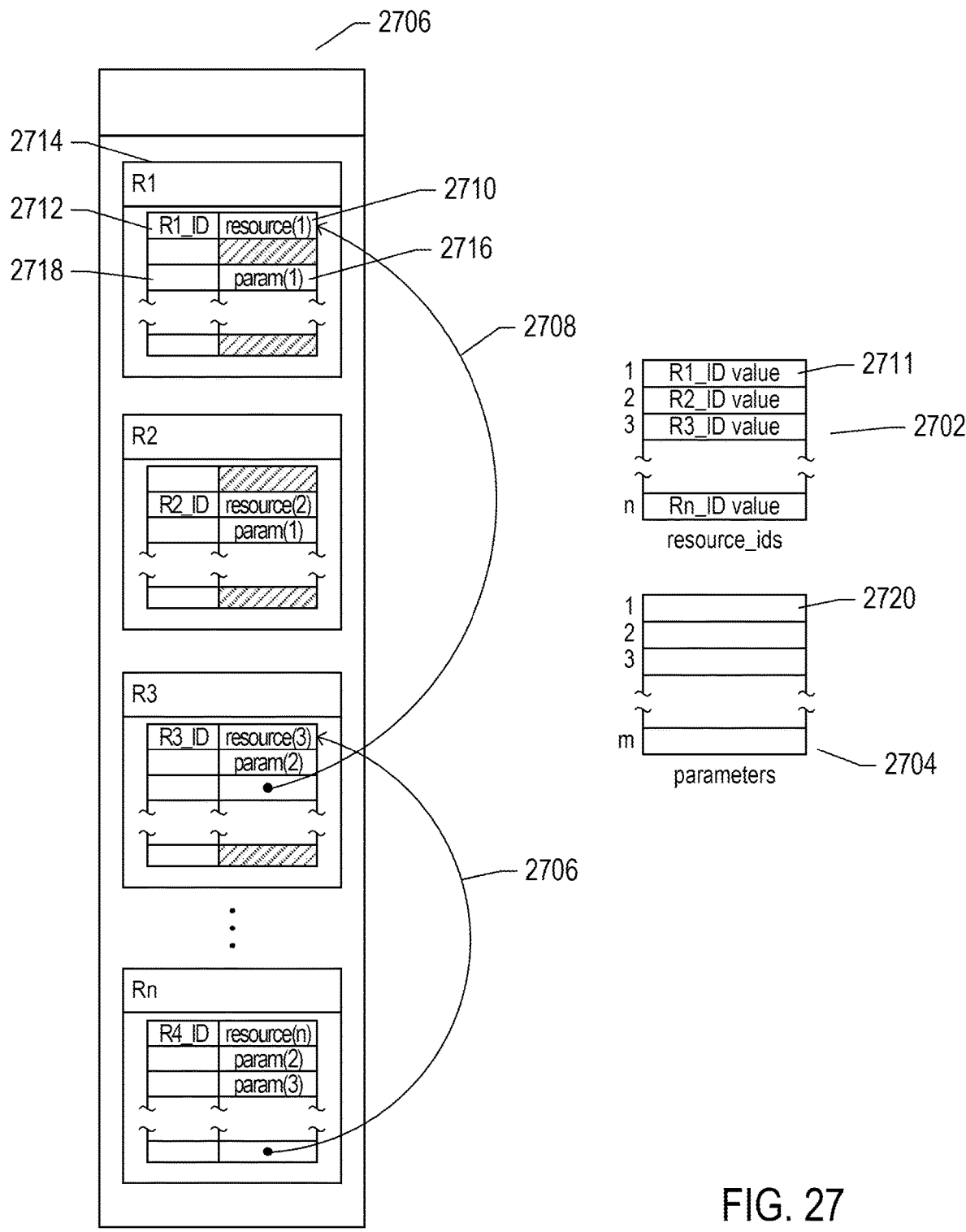
FIG. 27 illustrates fifth and six steps of the onboarding process.

FIG. 27 illustrates fifth and six steps of the onboarding process. In the fifth step, the set of unique resource-id attribute values that identify resources in the cloud infrastructure specified by a parameterized cloud template are collected and stored in a resource_ids file 2702 and the unique parameter values included in the value fields of attributes are collected and stored in a parameters file 2704. In each of the SLS data files that together comprise a parameterized cloud template, such as an SLS data file 2706, internal resource-id references, discussed in the preceding paragraph, are replaced by resource-id bindings. These resource-id bindings are represented by curved arrows 2706 and 2708 in FIG. 27. The external resource-id references are replaced by resource function calls that essentially bind the attribute values of the first type to resource ids in the resource_ids file 2702, such as the resource function call in value field 2710 of attribute 2712 in resource specification 2714 that returns resource id 2711. Similarly, the value fields containing parameter values are modified to contain calls to a parameter function that essentially bind these value fields to parameters in the parameters file 2704. For example, value field 2716 of attribute 2718 in resource specification 2714 contains a parameter function call that returns the parameter value 2720 in parameters file 2704.

By removing resource ids and parameter values from the parameterized cloud template, the parameterized cloud template is transformed into a multi-purpose cloud template that can be used both for transitioning already deployed and configured cloud infrastructure to Idem-service management (2112 in FIG. 21) and for deploying new, equivalent cloud infrastructure in a new cloud-computing system (2114 in FIG. 21). In the former case, the resource ids in the resource_ids file are those initially included in the in-memory data structure and remain valid following transition of management to the Idem service, and the parameter values in the parameters file are similarly valid. In the latter case, once the new, equivalent cloud infrastructure has been initially deployed, new resource ids and parameter values for inclusion in the resource_ids file and parameters file are obtained using the Idem describe command. In both cases, resource-id bindings need not be changed, since they bind attribute value fields to other attribute value fields within the parameterized cloud template.

FIGS. 28A-E provide control-flow diagrams that illustrate one implementation of the currently disclosed onboarding process and Idem-service onboard command. In step 2802, the routine "generate parameterized SLS configuration files," which represents an implementation of the onboarding process, receives information about a target cloud provider T, authorization and authentication credentials C, a target-infrastructure descriptor I, and a grouping-option indication G. In the current document, function and routine arguments may be passed by either value or a reference, depending on the size and subsequent use of the arguments within the function and routine. These details are generally not specified in the following discussion. In step 2803, the onboarding process establishes a connection to a management interface for the cloud provider T using the authorization and authentication credentials C. In step 2804, the onboarding process calls the Idem describe command, with command arguments obtained from T and I, to generate raw SLS data that describes cloud infrastructure for which the parameterized cloud template is to be generated. In step 2805, the onboarding process receives the raw SLS data R returned by the Idem describe command. In step 2806, the onboarding process generates the in-memory data structure D, discussed above with reference to FIG. 22, and loads information extracted from the raw SLS data R into the in-memory data structure D. Then, in the for-loop of steps 2807-2819, the onboarding process carries out the second and third steps discussed above with reference to FIG. 24. The for-loop of steps 2807-2819 considers each resource descriptor r in the in-memory data structure D. In step 2808, the onboarding process uses one or more attribute and/or tag values in the currently considered resource descriptor r to generate a user-friendly resource header declaration ID u for resource descriptor r. When u is not unique with respect to previously generated user-friendly resource header declaration IDs during the current onboarding process, as determined in step 2809, an index is added to u, in step 2010, to generate a unique user-friendly resource header declaration ID u. Continuing to FIG. 28B, the onboarding process, in step 2811, replaces the resource header declaration ID in resource data structure, or resource descriptor, r with u. In the inner for-loop of steps 2812-2817, the onboarding process considers each attribute, a, in resource descriptor r. In step 2813, the onboarding process calls the routine "useful" to determine whether or not to retain the currently considered attribute a. This routine may make the determination based on information required for the present directive in SLS state files, in one implementation. When the currently considered attribute a is indicated to not be retained by the routine "useful," as determined in step 2814, the attribute a is removed from resource descriptor r, in step 2815. When there is another attribute in r to consider, as determined in step 2816, a is set to the next attribute in r, in step 2817, and control returns to step 2013 for another iteration of the inner for-loop of steps 2812-2817. Otherwise, when there is another resource descriptor in D to consider, as determined in step 2818, r is set to the next resource descriptor in D, in step 2819, and control flows back to step 2808 in FIG. 28A for another iteration of the for-loop of steps 2807-2819.

In step 2822, the onboarding process calls the routine "identify resource-id references" to identify the value fields in resource descriptors in D that contain external resource-id references and internal resource-id references, discussed above with reference to FIG. 26A. The routine "identify resource-id references" returns a first list M1 that includes entries representing external resource-id references discussed above with reference to FIG. 26A and a second list M2 that includes entries representing internal resource-id references discussed above with reference to FIG. 26A. Next, the onboarding process carries out the generation of a set of SLS data files from the in-memory data structure, as discussed above with reference to FIG. 25, which represents the fourth step of the onboarding process. When the grouping-option indication G indicates grouping resources by resource type, as determined in step 2823, a routine "partition D by resource type" is called in step 2824 to generate SLS data files of a parameterized cloud template that each contains resources of a particular route type, as discussed above with reference to FIG. 25. Otherwise, when the grouping-option indication G indicates grouping resources by cloud-service, as also discussed above with reference to FIG. 25, the onboarding process calls the routine "partition D by cloud service" in step 2826 to generate a parameterized cloud template comprising SLS data files that each contains resources used to implement a particular cloud service.

Otherwise, the onboarding process calls the routine "partition by references" in step 2827 to generate a cloud template comprising SLS data files that each contains a particular resource group containing resources hierarchically related to a root resource, as discussed above with reference to FIG. 25. An implementation of the routine "partition by references" is discussed below. When resource groups are instead defined by the resource-group field of the plug-in/resource-group/resource-type tuple in each resource descriptor, as also discussed above with reference to FIG. 25, a routine "partition D by resource group" is instead called.

Figure 28A:
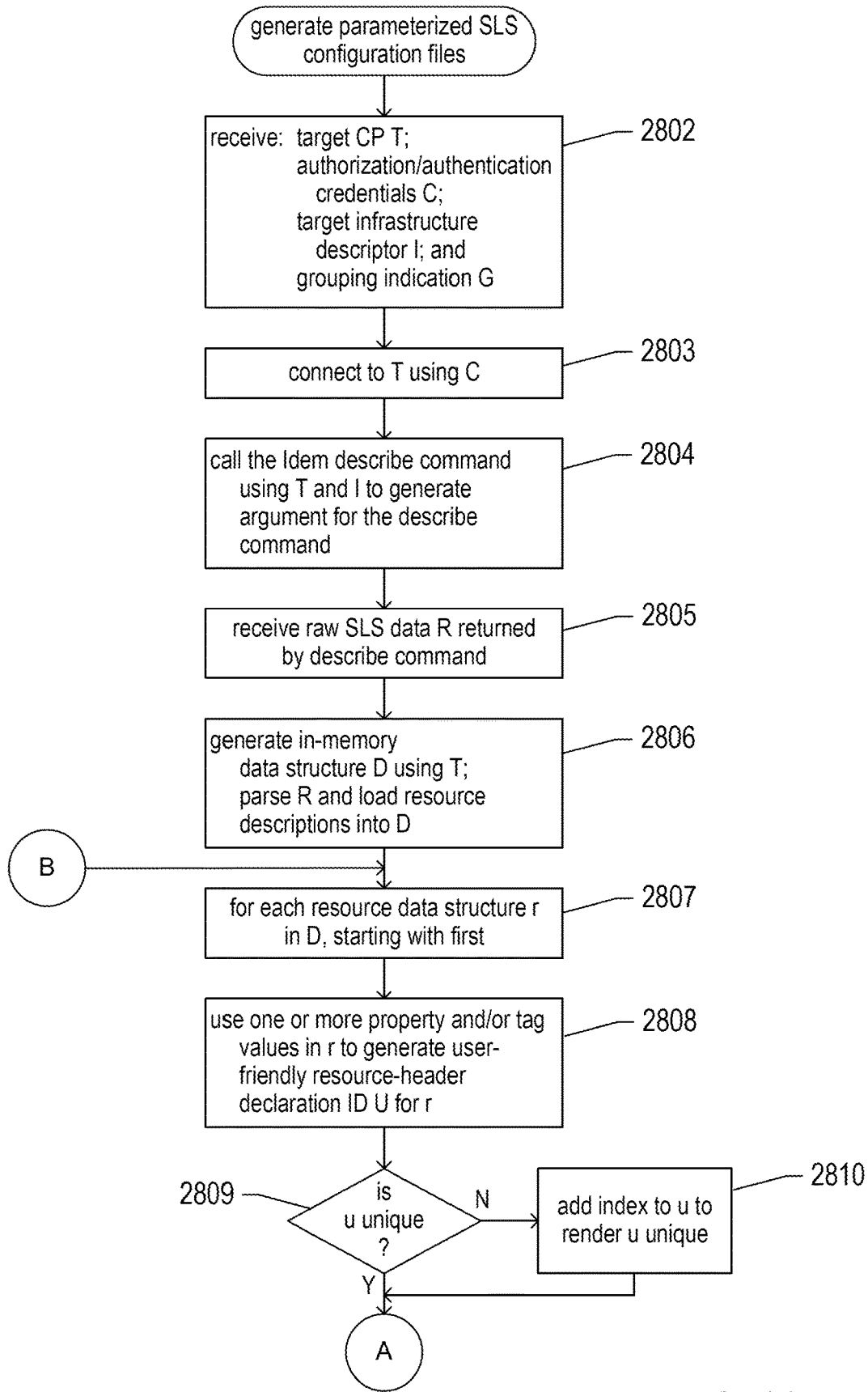
FIGS. 28A-E provide control-flow diagrams that illustrate one implementation of the currently disclosed onboarding process and Idem-service onboard command.
Figure 28B:
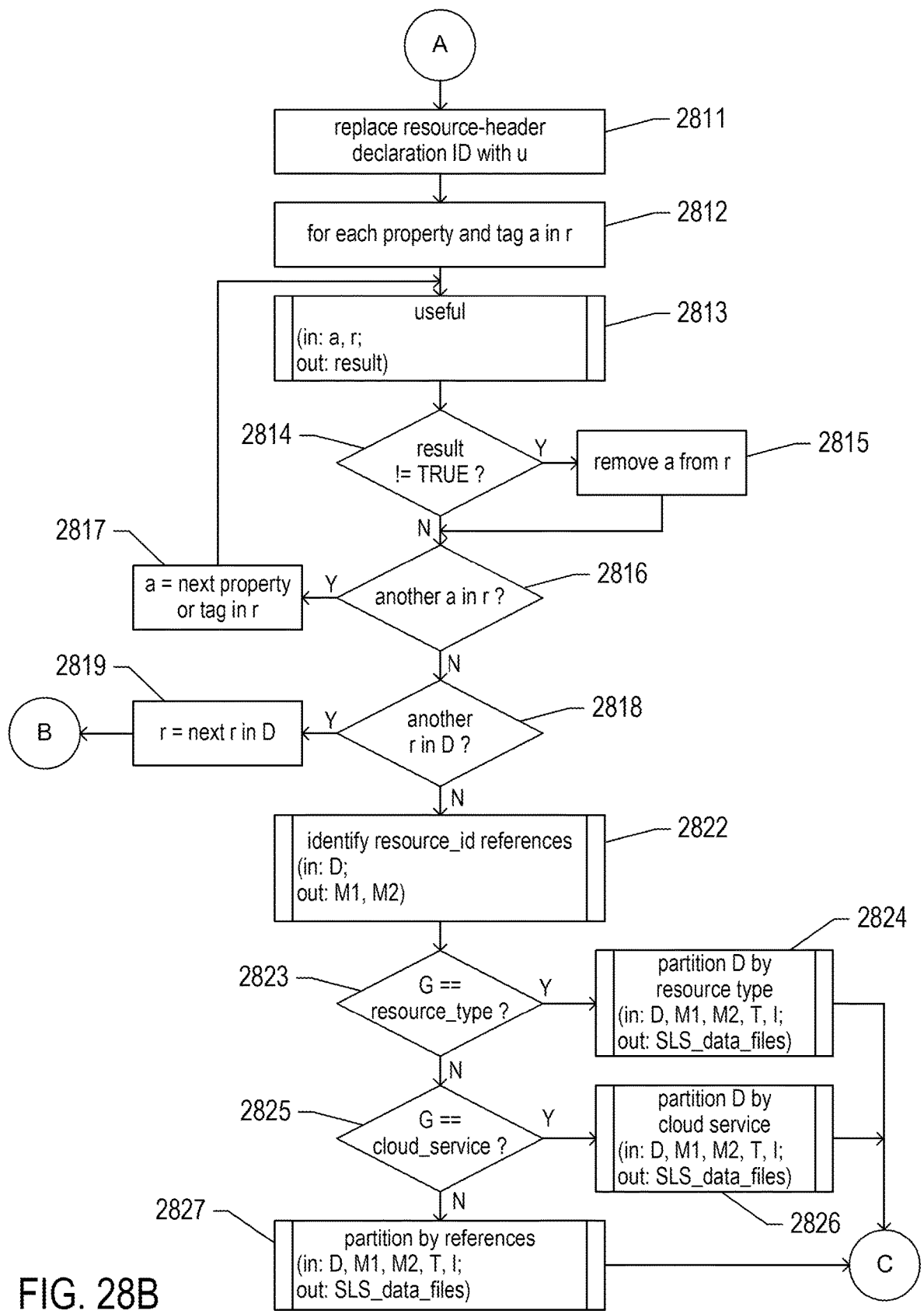
Figure 28C:
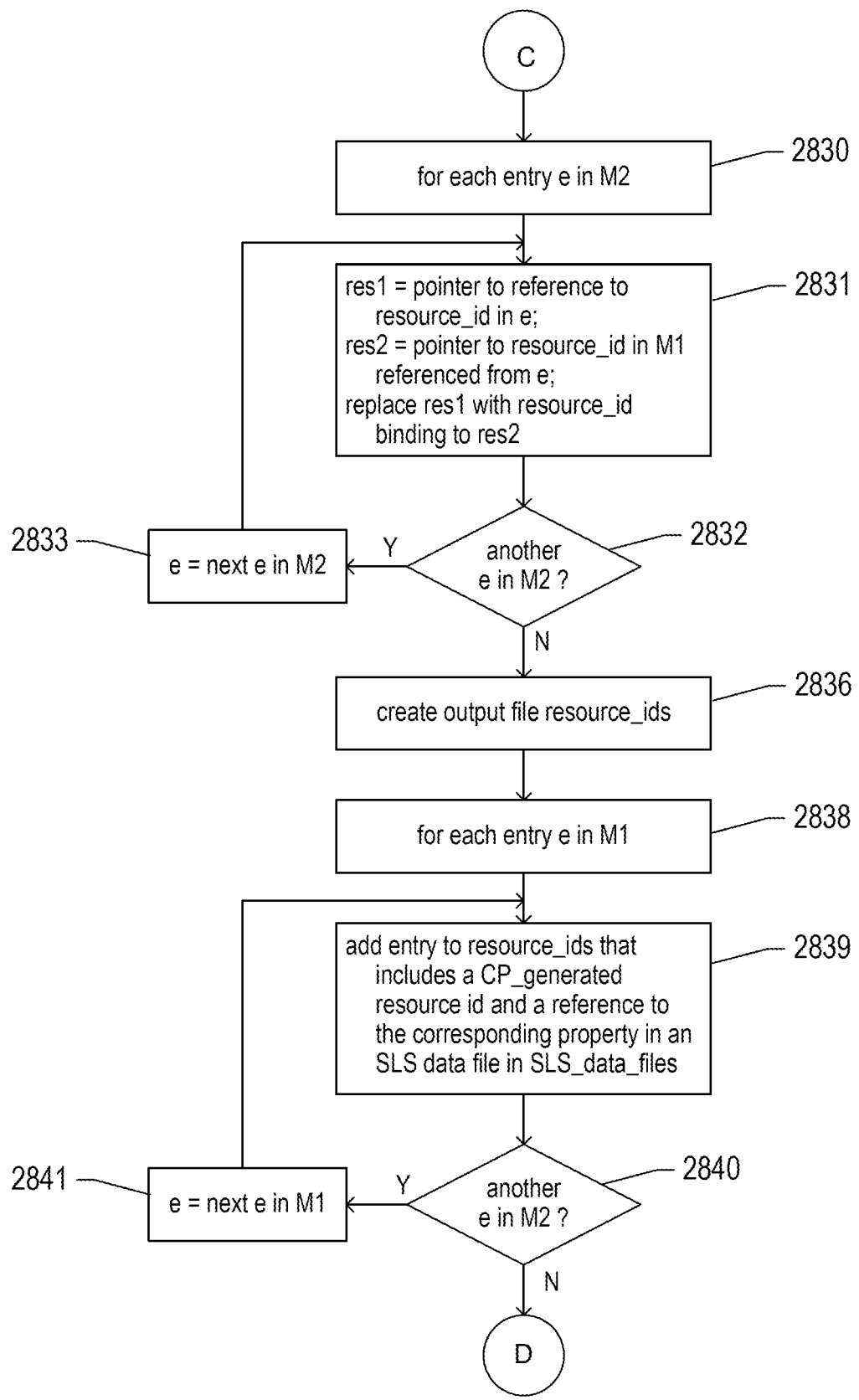

Turning to FIG. 28C, the onboarding process carries out the fifth step of the onboarding process, discussed above with reference to FIG. 27, in a first for-loop of steps 2830-2833 and a second for-loop of steps 2838-2841. In the first for-loop of steps 2830-2833, the onboarding process considers each entry in the list M2 generated by the call to the routine "identify resource-id references" in step 2822 of FIG. 28B. In step 2831, the onboarding process sets the attribute pointer res/to reference the attribute containing an internal resource-id reference represented by the currently considered entry e in the list M2 and sets the attribute pointer res2 to the attribute with a value containing an external resource-id reference pointed to by attribute pointer res1. The onboarding process then replaces the attribute value referenced by res/with an internal resource-id binding to the attribute value referenced by res2, similar to the internal resource-id references represented by curved arrows 2706 and 2708 in FIG. 27. In step 2836, the onboarding process creates a resource_ids output file (2702 in FIG. 27). In the second for-loop of steps 2838-2841, the onboarding process considers each entry in the list M1 generated by the call to the routine "identify resource-id references" in step 2822 of FIG. 28B. In step 2839, the onboarding process replaces a cloud-provider-generated resource id in the attribute value referenced from currently considered M1 entry e with a resource function call essentially binding the attribute to an entry in the file resource_ids containing the cloud-provider-generated resource id, such as resource function call 2710 in FIG. 27. Thus, following completion of the first and second for-loops shown in FIG. 28C, the resource-id bindings and resource function calls discussed above with reference to FIG. 27 are created.

Figure 28D:
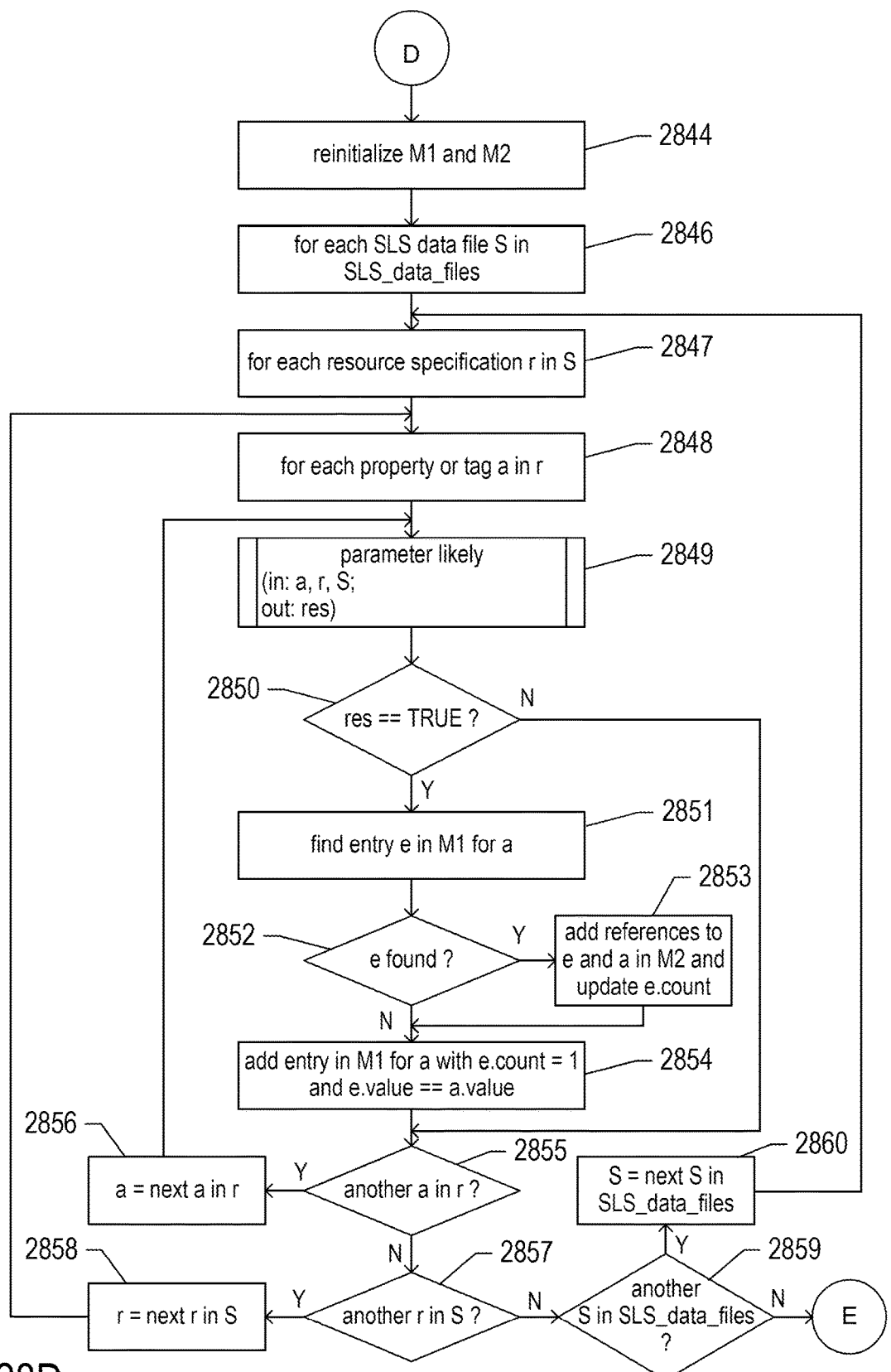

Turning to FIG. 28D, the onboarding process re-initializes the lists M1 and M2 in step 2844. In the outer for-loop of steps 2846-2860, the onboarding process considers each SLS data file S in the set of SLS data files SLS_data_files output by one of the three partition routines called in steps 2824, 2026, and 2027 in FIG. 28B. In a nested for-loop of steps 2847-2858, the onboarding process considers each resource specification r in the currently considered SLS data file S. In an innermost for-loop of steps 2848-2856, the onboarding process considers each attribute a in the currently considered resource specification r. In step 2849, a routine "parameter likely" is called to determine whether or not the currently considered attribute a contains a parameter value. The routine "parameter likely" evaluates the attribute and the associated attribute value by comparing the attribute value to patterns consistent with parameter values and compares the attribute to attributes commonly used to specify parameter values in resource specifications. Many other considerations may contribute to the determination. When the results returned by the routine "parameter likely" indicates that the currently considered attribute contains a parameter value, as determined in step 2850, the onboarding process, in step 2851, attempts to find an entry e in the list M1 that contains the value of the currently considered attribute a. When such an entry is found, as determined in step 2852, an entry is added to the list M2 containing a reference to the entry e in the list M1 as well as a reference to the value of the currently considered attribute a, in step 2853, and a count field in the currently considered entry e is incremented. Otherwise, a new entry is added to the list M1 for the attribute a with a field containing the value of the currently considered attribute a and with a count field containing the value 1.

Figure 28E:
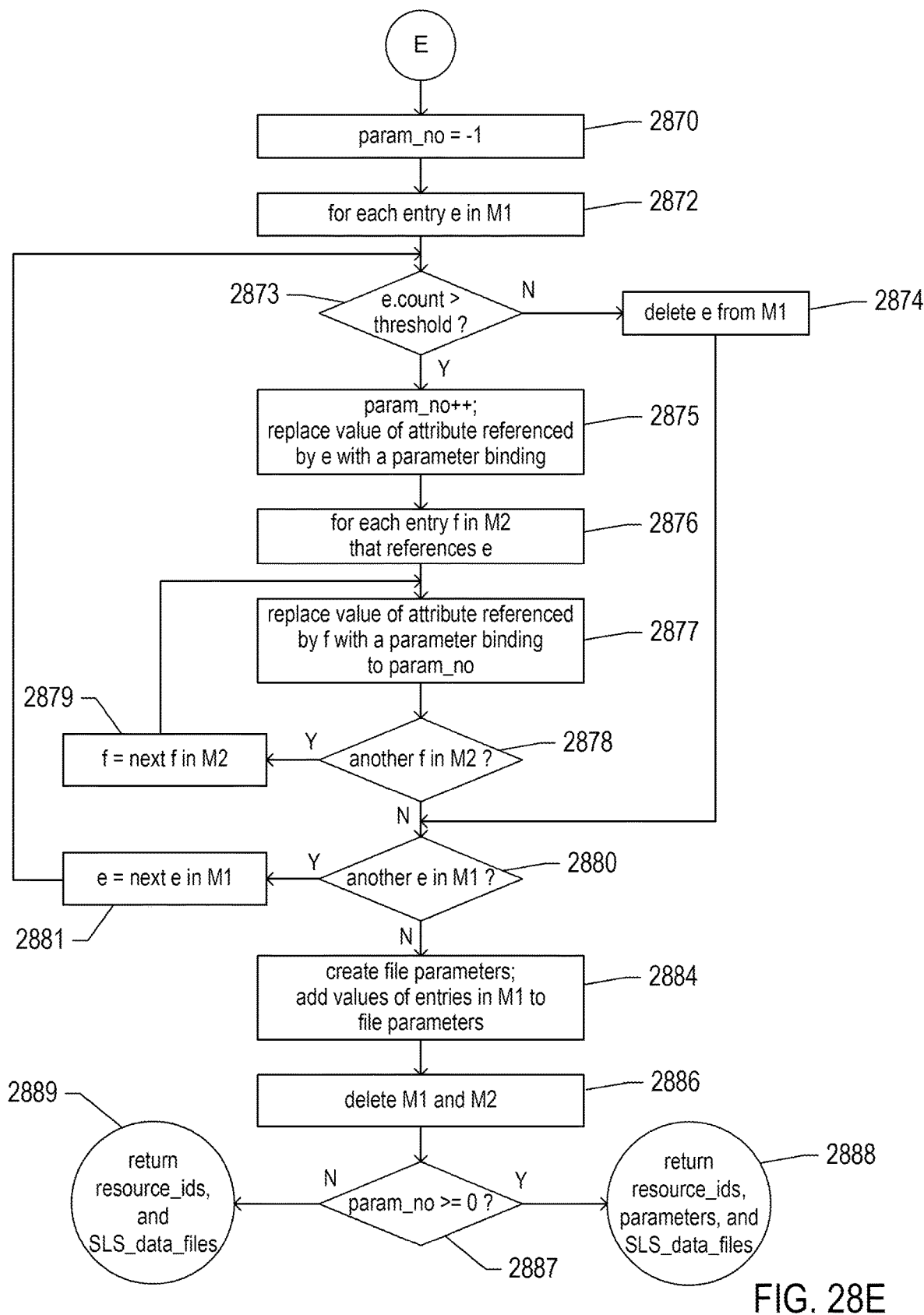

Turning to FIG. 28E, the onboarding process sets a local variable param_no to −1, in step 2870. In the outer for-loop of steps 2872, the onboarding process considers each entry e in the list M1. In step 2873, the onboarding process determines whether the count field in the currently considered entry contains a value greater than a threshold number. If not, the onboarding process deletes the currently considered entry from the list M1, in step 2874, with control flowing to step 2880. In this implementation, a parameter value must be observed in the cloud template at least a threshold number of times to be considered to be a parameter value. In step 2875, local variable param_no is incremented and a parameter binding for the attribute referenced in entry e is created by replacing the value of the attribute with a parameter function call that returns the value of the parameter in the parameters file with an argument equal to, or derived from, the value currently stored in local variable param_no. In the inner for-loop of steps 2876-2879, the onboarding process considers each entry f in the list M2 that references the currently considered M1-list entry e. In step 2877, the onboarding process replaces the value of the attribute referenced by M2-list entry f with a parameter binding to the parameter numbered by the value contained in the local variable param_no. Following completion of the outer for-loop of steps 2872-2881, the parameter bindings discussed in FIG. 27 have been created. In step 2884, the onboarding process creates the file parameters and adds the values of entries remaining in list M1 to the file parameters. In step 2886, the onboarding process deletes the lists M1 and M2. When the value stored in local variable param_no is greater than or equal to 0, as determined in step 2887, the onboarding process returns the resource_ids file, the parameters file, and the completed parameterized cloud template comprising the SLS the data files in the list SLS_data_files, in step 2888. Otherwise, in step 2889, the onboarding process returns the resource_ids file and the completed parameterized cloud template comprising the SLS the data files in the list SLS_data_files.

Figure 29:
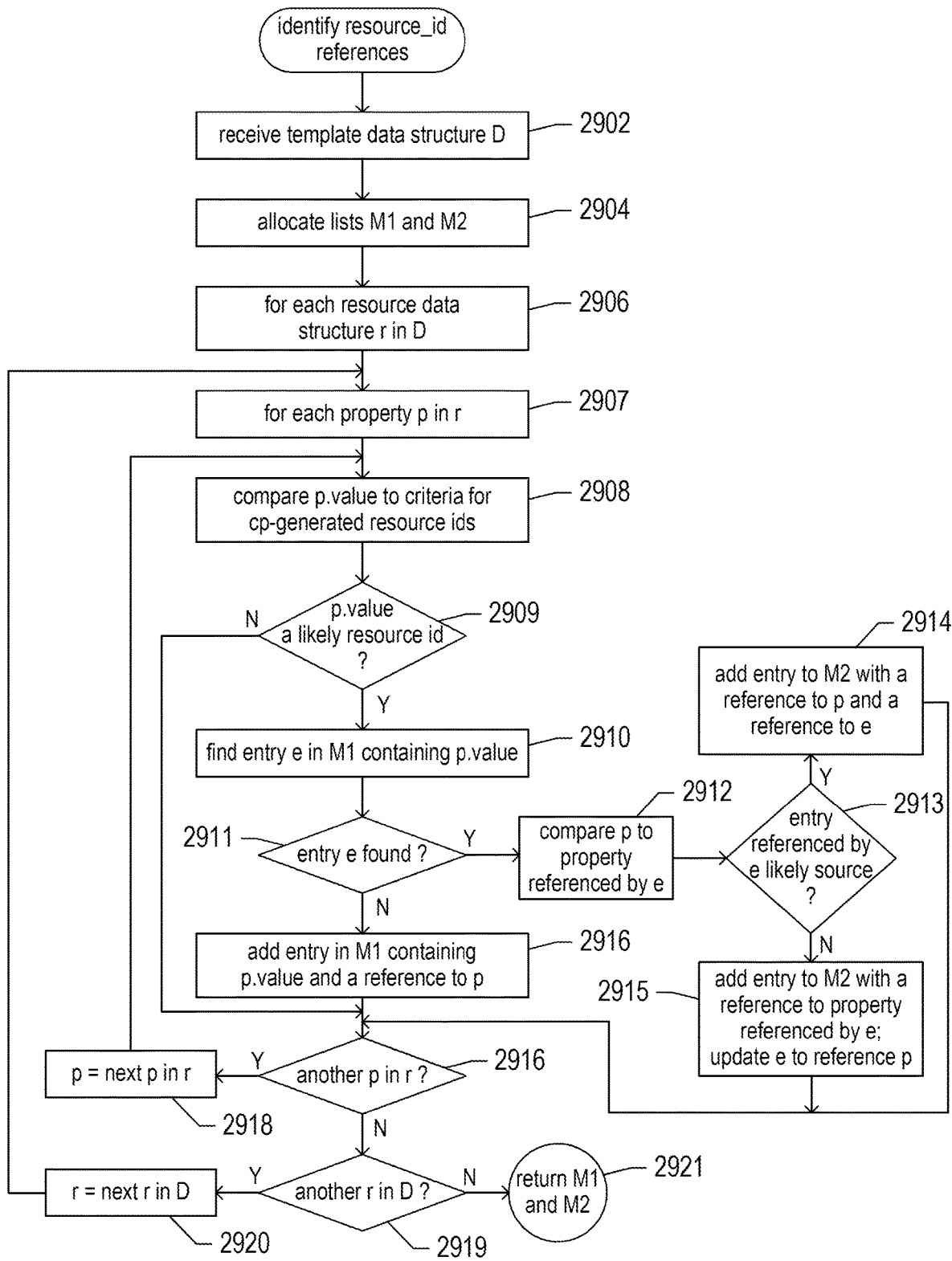
FIG. 29 provides a control-flow diagram for the routine "identify resource-id references" called in step 2822 of FIG. 28B.

FIG. 29 provides a control-flow diagram for the routine "identify resource-id references" called in step 2822 of FIG. 28B. In step 2902, the routine "identify resource-id references" receives a reference to the in-memory data structure D. In step 2904, the routine "identify resource-id references" allocates the lists M1 and M2. In the outer for-loop of steps 2906-2920, the onboarding process considers each resource descriptor r in the in-memory data structure D. In the inner for-loop of steps 2907-2918, the onboarding process considers each attribute p in the currently considered resource descriptor r. In step 2908, the onboarding process compares the value of the currently considered attribute to criteria for cloud-provider-generated resource ids. If the comparison reveals that the value of the currently considered attribute is likely a resource id, as determined in step 2909, the routine "identify resource-id references" attempts to find an entry e in the list M1 containing a value equal to the value of the currently considered attribute, in step 2910. If such an entry is found, as determined in step 2911, the onboarding process, in step 2912, compares the currently considered attribute to the attribute referenced by the entry e. If the comparison reveals that the attribute referenced by the entry e is likely the source resource id or, in other words, a resource id that names or identifies the resource represented by a resource specification containing the resource id, as determined in step 2913, the onboarding process adds an entry to the list M2 with a reference to the currently considered attribute and with a reference to entry e. Otherwise, the onboarding process adds an entry to list M2 for the attribute referenced by the entry e and updates the entry e to reference the currently considered attribute. When an entry e is not found in the list M1, as determined in step 2911, the onboarding process, in step 2916, adds a new entry to the list M1 containing a reference to the currently considered attribute as well as the value of the currently considered attribute. At the completion of the outer for-loop of steps 2906-2920, the routine "identify resource-id references" returns lists M1 and M2.

Figure 30A:
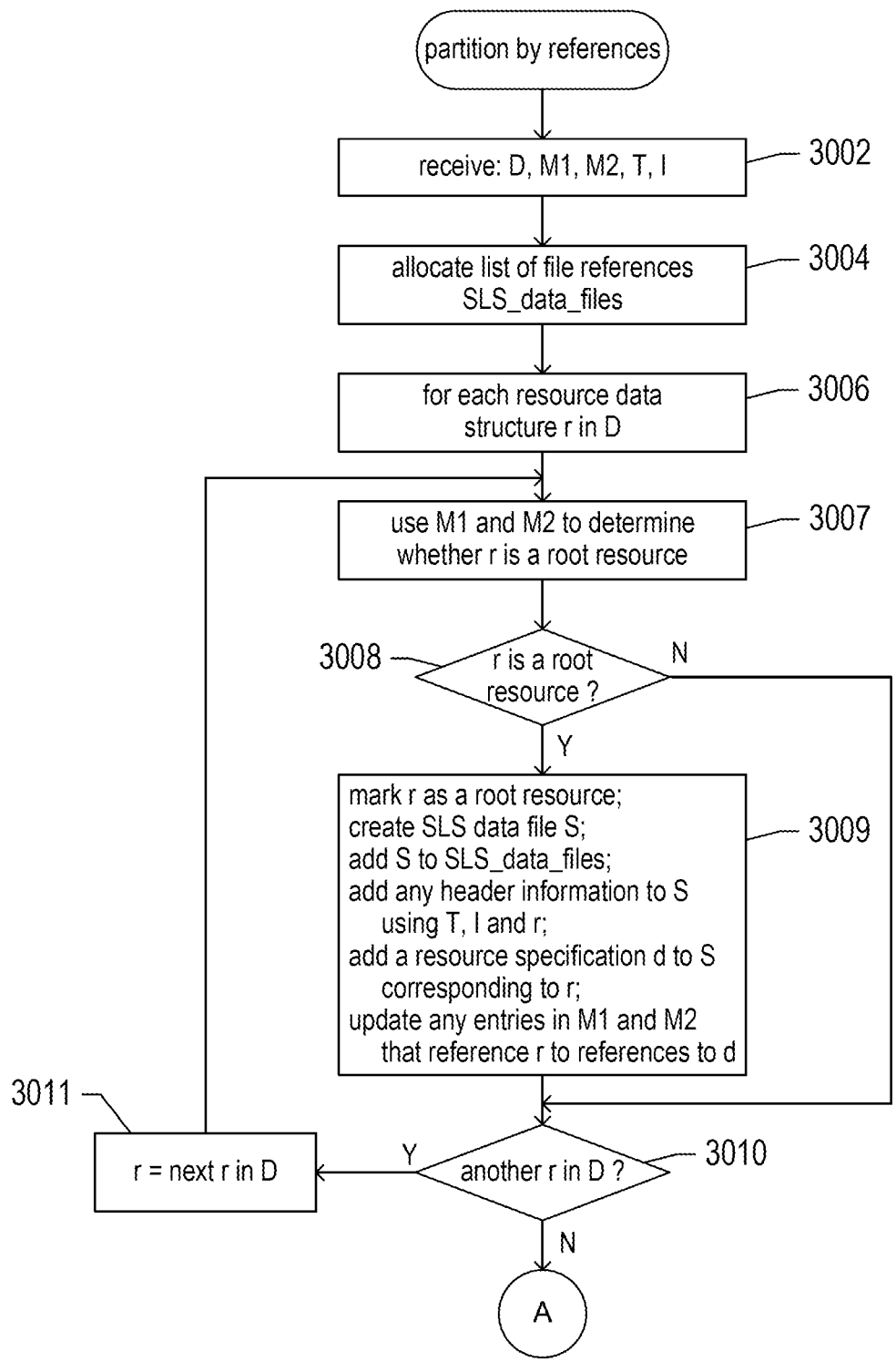
FIGS. 30A-B provide control-flow diagrams that illustrate one implementation of the routine "partition by references," called in step 2827 of FIG. 28B.
Figure 30B:
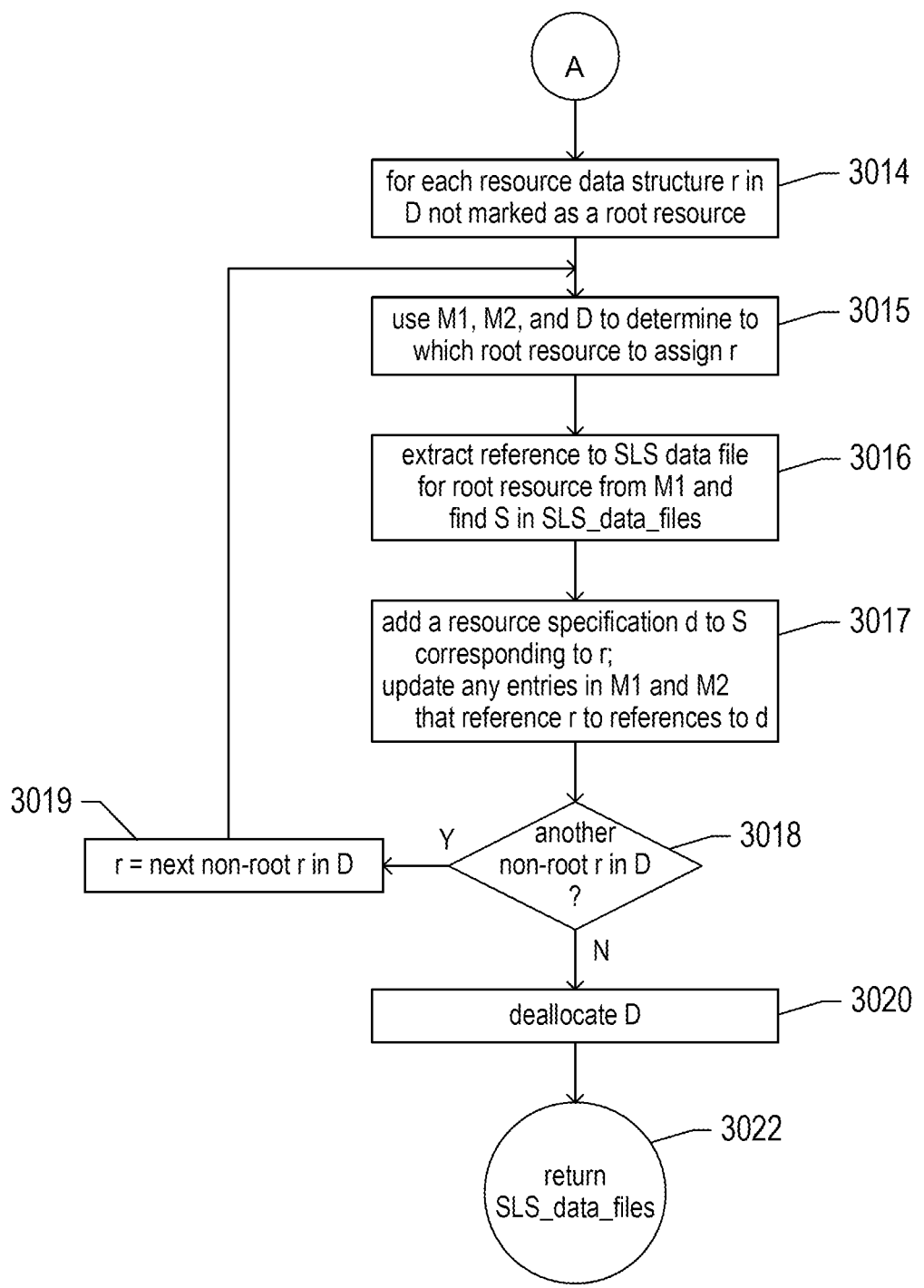

FIGS. 30A-B provide control-flow diagrams that illustrate one implementation of the routine "partition by references," called in step 2827 of FIG. 28B. In step 3002, the routine "partition by references" receives a reference to the in-memory data structure, references to the two lists M1 and M2, and information about the target cloud provider and target infrastructure. In step 3004, the routine "partition by references" allocates a list of file references SLS_data_files. In the for-loop of steps 3006-3011, the routine "partition by references" considers each resource descriptor r in the in-memory data structure D. In step 3007, the routine "partition by references" uses the lists M1 and M2 to determine whether the currently considered resource descriptor r represents a root resource. A root resource, as discussed above, is a resource that is the top-level resource in a hierarchically organized group of resources. The non-root resources in such a group are child resources of the root resource or direct or indirect descendants of the child resources of the root resource. When the currently considered resource descriptor r represents a root resource, as determined in step 3008, the routine "partition by references" marks r is a root resource, creates an SLS data file S to contain resource specifications for the root resource and resources that are descendants of the root resource, adds any required header information to S, adds a resource specification to S corresponding to the currently considered resource descriptor r, and updates entries in M1 and M2 that reference r to instead reference the newly added resource specification corresponding to r in S. Turning to FIG. 30B, in the for-loop of steps 3014-3019, the routine "partition by references" considers each resource descriptor in the in-memory data structure D that is not marked as a root resource. In step 3015, the routine "partition by references" uses the lists M1 and M2, along with the in-memory data structure D, to determine to which root resource to assign the currently considered resource descriptor r. In step 3016, the routine "partition by references" extracts the reference to the SLS data file that contains the root resource determined in step 3015. In step 3017, the routine "partition by references" adds a resource specification to S corresponding to the currently considered resource descriptor r and updates any entries in M1 and M2 that reference r to instead reference the resource specification added to S for the currently considered resource descriptor r. Following termination of the for-loop of steps 3014-3019, the routine "partition by references" deallocates the in-memory data structure D, in step 3020, and returns the list of SLS data files SLS_data_files in step 3022. The other portioning routines called in steps 2824, 2826, and 2827, discussed above, are similarly, but more simply, implemented.

The present invention has been described in terms of particular embodiments, it is not intended that the invention be limited to these embodiments. Modifications within the spirit of the invention will be apparent to those skilled in the art. For example, any of many different implementations of the currently disclosed methods and systems can be obtained by varying various design and implementation parameters, including modular organization, control structures, data structures, hardware, operating system, and virtualization layers, automated orchestration systems, virtualization-aggregation systems, and other such design and implementation parameters. While the parameterized cloud templates generated by the currently disclosed methods and systems are sets of SLS data files, the currently disclosed methods and systems may, in other implementations, produce other types of configuration files that together comprise a parameterized cloud template. Additional types of resource-grouping options may be provided in other implementations. Different implementations of the currently disclosed methods and systems may use different criteria for identifying parameter values, resource ids, and resource ids that represent references to other resource ids. The onboarding process may be implemented by either a single-threaded process, a multi-threaded process, multiple processes, by plugin-oriented-programming, and/or by cooperating microservices.

What is claimed is:

1. A automated infrastructure-as-code cloud-infrastructure manager comprising:
   one or more computer systems, each containing one or more processors, one or more memories, and one or more data-storage devices; and
   processor instructions, stored in one or more of the one or more memories that, when executed by one or more of the one or more processors, control the one or more computer systems to implement the automated infrastructure-as-code cloud-infrastructure manager, the automated infrastructure-as-code cloud-infrastructure-manager including
      a management interface that receives cloud-infrastructure-management commands and requests, including
         idempotent state commands that deploy and configure cloud infrastructure,
         describe commands that return deployment and configuration information about the already deployed and configured cloud infrastructure, and
         onboard commands that generate a parameterized cloud template from the already deployed and configured cloud infrastructure that is subsequently used to transfer management of the already deployed and configured cloud infrastructure to the cloud-infrastructure-manager and to deploy and configure a new cloud infrastructure, the generated parameterized cloud template comprising one or more data files containing resource specifications, a resource-id file; and a parameters file; and
      an execution engine that executes the received cloud-infrastructure-management commands and requests;
      wherein the generated parameterized cloud template is used to transition the already deployed and configured cloud infrastructure to management by the automated infrastructure-as-code cloud-infrastructure manager by:

replacing resource function calls within the data files of the generated parameterized cloud template with corresponding resource ids extracted from the resource-id file;

replacing function calls within the data files of the generated parameterized cloud template with corresponding parameter values extracted from the parameters file;

storing the data files of the generated parameterized cloud template as a cloud template; and using the cloud template for execution of automated infrastructure-as-code cloud-infrastructure manager commands.

2. The automated infrastructure-as-code cloud-infrastructure manager of claim 1 wherein the generated parameterized cloud template is used to deploy and configure cloud infrastructure by:

removing external resource-ids within the data files of the generated parameterized cloud template;

removing the corresponding parameter values from the data files of the generated parameterized cloud template;

storing the data files of the generated parameterized cloud template as a cloud template; and using the cloud template for execution of an infrastructure-as-code cloud-infrastructure-management-service state command.

3. The automated infrastructure-as-code cloud-infrastructure manager of claim 1 wherein an onboard command is carried out by:

accessing the management interface to the already deployed and configured cloud infrastructure to obtain information about the already deployed and configured cloud infrastructure;

loading the obtained information into an in-memory data structure that includes multiple resource descriptors;

replacing the initial resource header declaration ID in each resource descriptor with a user-friendly resource header declaration ID;

removing attributes that are not needed for deployment and configuration of a resource represented by the resource descriptor;

partitioning the multiple resource descriptors into groups of resource descriptors;

generating a data file for each group of resource descriptors;

for each of the corresponding group of resource descriptors, adding a resource specification corresponding to each resource descriptor in the corresponding group of resource descriptors to the data file generated for the groups of resources descriptors;

replacing resource identifiers in the resource specifications of the generated data files with one of
resource-id binds, and
resource function calls, and replacing the corresponding parameter values in the resource specifications of the generated data files with parameter function calls.

4. The automated infrastructure-as-code cloud-infrastructure manager of claim 3 wherein the in-memory data structure contains:

general information with regard to the already deployed and configured cloud infrastructure; and the multiple resource descriptors, each of the corresponding resource descriptor representing the resource in the already deployed and configured cloud infrastructure.

5. The automated infrastructure-as-code cloud-infrastructure manager of claim 3 wherein the user-friendly resource header declaration ID has an understandable natural-language meaning; and wherein the user-friendly resource header declaration ID is generated from one or more property values in the resource descriptor that contains the user-friendly resource header declaration ID.

6. The automated infrastructure-as-code cloud-infrastructure manager of claim 3 wherein removing the attributes that are not needed for the deployment and configuration of the resource represented by the resource descriptor further comprises:

for each resource descriptor of the multiple resource descriptors in the in-memory data structure, for each attribute in the corresponding resource descriptor, when the corresponding attribute is not used by the automated infrastructure-as-code cloud-infrastructure manager to deploy and configure the resource specified by the corresponding resource descriptor, remove the corresponding attribute from the corresponding resource descriptor.

7. The automated infrastructure-as-code cloud-infrastructure manager of claim 3 wherein partitioning the multiple resource descriptors into the groups of resource descriptors further comprises:

when the onboard command includes an indication to partition the multiple resource descriptors by resource type, for each type of resource specified by a resource descriptor in the in-memory data structure, placing the resource descriptors that specify the type of resource into a resource-descriptor group associated with the type of resource;

when the onboard command includes the indication to partition the multiple resource descriptors by cloud service, for each type of cloud service implemented by the cloud infrastructure defined by the resource descriptors in the in-memory data structure, placing the resource descriptors that implement the cloud service into to a resource-descriptor group associated with the cloud service; and when the onboard command includes the indication to partition the multiple resource descriptors by resource group, for each resource group comprising a set of related resources, placing the resources descriptors specifying resources in the resource group into a resource-descriptor group associated with the resource group.

8. The automated infrastructure-as-code cloud-infrastructure manager of claim 3 wherein replacing the resource identifiers in the resource specifications of the generated data files with resource-identifier bindings further comprises:

identifying attributes with values that contain external resource-id references, adding the attribute values to the resource-id file, and replacing the external resource-id references with the resource function calls; and identifying attributes with values that contain internal resource-id references and replacing the internal resource-id references with resource-id bindings.

9. The automated infrastructure-as-code cloud-infrastructure manager of claim 3 wherein replacing the corresponding parameter values in the resource specifications of the generated data files with parameter binding further comprises:

identifying the attributes with values that contain the corresponding parameter values;

adding each different parameter value to the parameters file; and replacing the attribute values that contain the corresponding parameter values with the parameter function calls.

10. A method that transitions already deployed and configured cloud infrastructure to management by an automated infrastructure-as-code cloud-infrastructure manager and that deploys and configures the cloud infrastructure for management by the automated infrastructure-as-code cloud-infrastructure manager equivalent to the already deployed and configured cloud infrastructure, the method comprising:

generating a parameterized cloud template for the already deployed and configured cloud infrastructure, the generated parameterized cloud template comprising one or more data files containing resource specifications, a resource-id file; and a parameters file;

using the generated parameterized cloud template to transition the already deployed and configured cloud infrastructure to management by the automated infrastructure-as-code cloud-infrastructure manager; and using the generated parameterized cloud template to deploy and configure the cloud infrastructure for management by the automated infrastructure-as-code cloud-infrastructure manager equivalent to the already deployed and configured cloud infrastructure;

wherein the generated parameterized cloud template is used to transition the already deployed and configured cloud infrastructure to management by the automated infrastructure-as-code cloud-infrastructure manager by:

replacing resource function calls within the data files of the generated parameterized cloud template with corresponding resource ids extracted from the resource-id file;

replacing function calls within the data files of the generated parameterized cloud template with corresponding parameter values extracted from the parameters file;

storing the data files of the generated parameterized cloud template as a cloud template; and using the cloud template for execution of automated infrastructure-as-code cloud-infrastructure manager commands.

11. The method of claim 10 wherein generating the parameterized cloud template further comprises:

accessing a management interface to the already deployed and configured cloud infrastructure to obtain information about the already deployed and configured cloud infrastructure;

loading the obtained information into an in-memory data structure that includes multiple resource descriptors;

replacing the initial resource header declaration ID in each resource descriptor with a user-friendly resource header declaration ID;

removing attributes that are not needed for deployment and configuration of a resource represented by the resource descriptor;

partitioning the multiple resource descriptors into groups of resource descriptors;

generating a data file for each group of resource descriptors;

for each of the corresponding group of resource descriptors, adding a resource specification corresponding to each resource descriptor in the corresponding group of resource descriptors to the data file generated for the group of resources descriptors;

replacing resource identifiers in the resource specifications of the generated data files with one of resource-id binds, and resource function calls, and replacing the corresponding parameter values in the resource specifications of the generated data files with parameter function calls.

12. The method of claim 11 wherein the in-memory data structure contains:

general information with regard to the already deployed and configured cloud infrastructure; and the multiple resource descriptors, each of the corresponding resource descriptor representing the resource in the already deployed and configured cloud infrastructure.

13. The method of claim 11 wherein the user-friendly resource header declaration ID has an understandable natural-language meaning; and wherein the user-friendly resource header declaration ID is generated from one or more property values in the resource descriptor that contains the user-friendly resource header declaration ID.

14. The method of claim 11 wherein removing attributes that are not needed for deployment and configuration of the resource represented by the resource descriptor further comprises:

for each of the resource descriptor of the multiple resource descriptors in the in-memory data structure, for each attribute in the corresponding resource descriptor, when the corresponding attribute is not used by the automated infrastructure-as-code cloud-infrastructure manager to deploy and configure the resource specified by the corresponding resource descriptor, remove the corresponding attribute from the corresponding resource descriptor.

15. The method of claim 11 wherein partitioning the multiple resource descriptors into the groups of resource descriptors further comprises:

when the onboard command includes an indication to partition the multiple resource descriptors by resource type, for each type of resource specified by a resource descriptor in the in-memory data structure, placing the resource descriptors that specify the type of resource into a resource-descriptor group associated with the type of resource;

when the onboard command includes the indication to partition the multiple resource descriptors by cloud service, for each type of cloud service implemented by the cloud infrastructure defined by the resource descriptors in the in-memory data structure, placing the resource descriptors that implement the cloud service into to a resource-descriptor group associated with the cloud service; and when the onboard command includes the indication to partition the multiple resource descriptors by resource group, for each resource group comprising a set of related resources, placing the resources descriptors specifying resources in the resource group into a resource-descriptor group associated with the resource group.

16. The method of claim 11 wherein replacing the resource identifiers in the resource specifications of the generated data files with resource-identifier bindings further comprises:
identifying attributes with values that contain external resource-id references, adding the attribute values to the resource-id file, and replacing the external resource-id references with resource calls; and
identifying attributes with values that contain internal resource-id references and replacing the internal resource-id references with internal resource-id bindings.

17. The method of claim 11 wherein replacing the corresponding parameter values in the resource specifications of the generated data files with parameter binding further comprises:
identifying the attributes with values that contain the corresponding parameter values;
adding each different parameter value to the parameters file; and
replacing the attribute values that contain the corresponding parameter values with the parameter function calls.

18. A physical data-storage device encoded with processor instructions that, when executed by one or more processors within one or more computer systems, each containing one or more processors, one or more memories, and one or more data-storage devices, control the one or more computer systems to implement an automated infrastructure-as-code cloud-infrastructure manager, the automated infrastructure-as-code cloud-infrastructure manager comprising:
a management interface that receives cloud-infrastructure-management commands and requests, including idempotent state commands that deploy and configure cloud infrastructure,
describe commands that return deployment and configuration information about already deployed and configured cloud infrastructure, and
onboard commands that generate a parameterized cloud template from the already deployed and configured cloud infrastructure that is subsequently used to transfer management of the already deployed and configured cloud infrastructure to the cloud-infrastructure-manager and to deploy and configure a new cloud infrastructure, the generated parameterized cloud template comprising one or more data files containing resource specifications, a resource-id file; and a parameters file; and
an execution engine that executes the received cloud-infrastructure-management commands and requests;
wherein the generated parameterized cloud template is used to transition the already deployed and configured cloud infrastructure to management by the automated infrastructure-as-code cloud-infrastructure manager by:
replacing resource function calls within the data files of the generated parameterized cloud template with corresponding resource ids extracted from the resource-id file;
replacing function calls within the data files of the generated parameterized cloud template with corresponding parameter values extracted from the parameters file;
storing the data files of the generated parameterized cloud template as a cloud template; and
using the cloud template for execution of automated infrastructure-as-code cloud-infrastructure manager commands.

* * * * *